United States Patent
Ogawa (12)

(10) Patent No.: US 8,391,551 B2
(45) Date of Patent: Mar. 5, 2013

(54) OBJECT DETECTING DEVICE, LEARNING DEVICE, OBJECT DETECTING METHOD, AND PROGRAM

(75) Inventor: Kaname Ogawa, Kanagawa (JP)

(73) Assignee: Sony Corporation (JP)

( * ) Notice: Subject to any disclaimer, the term of this patent is extended or adjusted under 35 U.S.C. 154(b) by 500 days.

(21) Appl. No.: 12/655,911

(22) Filed: Jan. 8, 2010

(65) Prior Publication Data

US 2010/0177957 A1 Jul. 15, 2010

(30) Foreign Application Priority Data

Jan. 9, 2009 (JP) ................................ 2009-003870

(51) Int. Cl.
*G06K 9/00* (2006.01)

(52) U.S. Cl. ........................................ 382/103; 348/135

(58) Field of Classification Search .................. 382/100, 382/103, 115, 117, 118, 170, 172, 181, 190–192, 382/195, 201; 707/708, 713, 769; 348/135, 348/161, 169–172, 208.14, 370
See application file for complete search history.

(56) References Cited

U.S. PATENT DOCUMENTS

| 5,629,752 | A | * | 5/1997 | Kinjo | 355/35 |
| 5,859,921 | A | * | 1/1999 | Suzuki | 382/118 |
| 5,864,630 | A | * | 1/1999 | Cosatto et al. | 382/103 |
| 5,990,973 | A | * | 11/1999 | Sakamoto | 348/576 |
| 7,574,037 | B2 | * | 8/2009 | Hidai et al. | 382/159 |
| 2004/0179719 | A1 | * | 9/2004 | Chen et al. | 382/118 |
| 2006/0115157 | A1 | * | 6/2006 | Mori et al. | 382/190 |
| 2006/0193520 | A1 | * | 8/2006 | Mita et al. | 382/190 |

FOREIGN PATENT DOCUMENTS

| JP | 2005-157679 A | 6/2005 |
| JP | 2005284348 A | 10/2005 |
| JP | 2006031387 A | 2/2006 |
| JP | 2007047975 A | 2/2007 |
| JP | 2008305342 A | 12/2008 |

OTHER PUBLICATIONS

Office Action from Japanese Application No. 2009-003870, dated Dec. 7, 2010.

* cited by examiner

*Primary Examiner* — Anand Bhatnagar
(74) *Attorney, Agent, or Firm* — Lerner, David, Littenberg, Krumholz & Mentlik, LLP

(57) ABSTRACT

An object detecting device includes a comparing unit to extract feature amounts for two regions on a determining object image and compare a feature amount based on the two feature amounts extracted; and a computing unit to select one of two values having different absolute values according to the comparison result, and compute an evaluation value to determine whether or not an object is included in the determining object image, by performing computation with the selected value.

5 Claims, 37 Drawing Sheets

| t | POSITION 1 | | POSITION 2 | | THRESHOLD (θ) | WEIGHTING (α) | |
|---|---|---|---|---|---|---|---|
| | u1 | v1 | u2 | v2 | | H | L |
| 1 | ... | ... | ... | ... | ... | ... | ... |
| 2 | ... | ... | ... | ... | ... | ... | ... |
| ⋮ | ⋮ | ⋮ | ⋮ | ⋮ | ⋮ | ⋮ | ⋮ |
| T | ... | ... | ... | ... | ... | ... | ... |

| LEARNING OBJECT IMAGE DISTINGUISHING INFORMATION $(x_i)$ | WEIGHT $(W_{i,cj}^t)$ | FACE IMAGE/ NON-FACE IMAGE IDENTIFYING INFORMATION $(y_i)$ | CLASS INFORMATION $(c_j)$ |
|---|---|---|---|
| $x_1$ | $W_{1,c1}^t$ | 1 | $c_1$ |
| ⋮ | ⋮ | ⋮ | ⋮ |
| ⋮ | ⋮ | ⋮ | ⋮ |
| $x_K$ | $W_{K,c1}^t$ | −1 | $c_1$ |
| $x_1$ | $W_{1,c2}^t$ | 1 | $c_2$ |
| ⋮ | ⋮ | ⋮ | ⋮ |
| ⋮ | ⋮ | ⋮ | ⋮ |
| $x_K$ | $W_{K,c2}^t$ | −1 | $c_2$ |

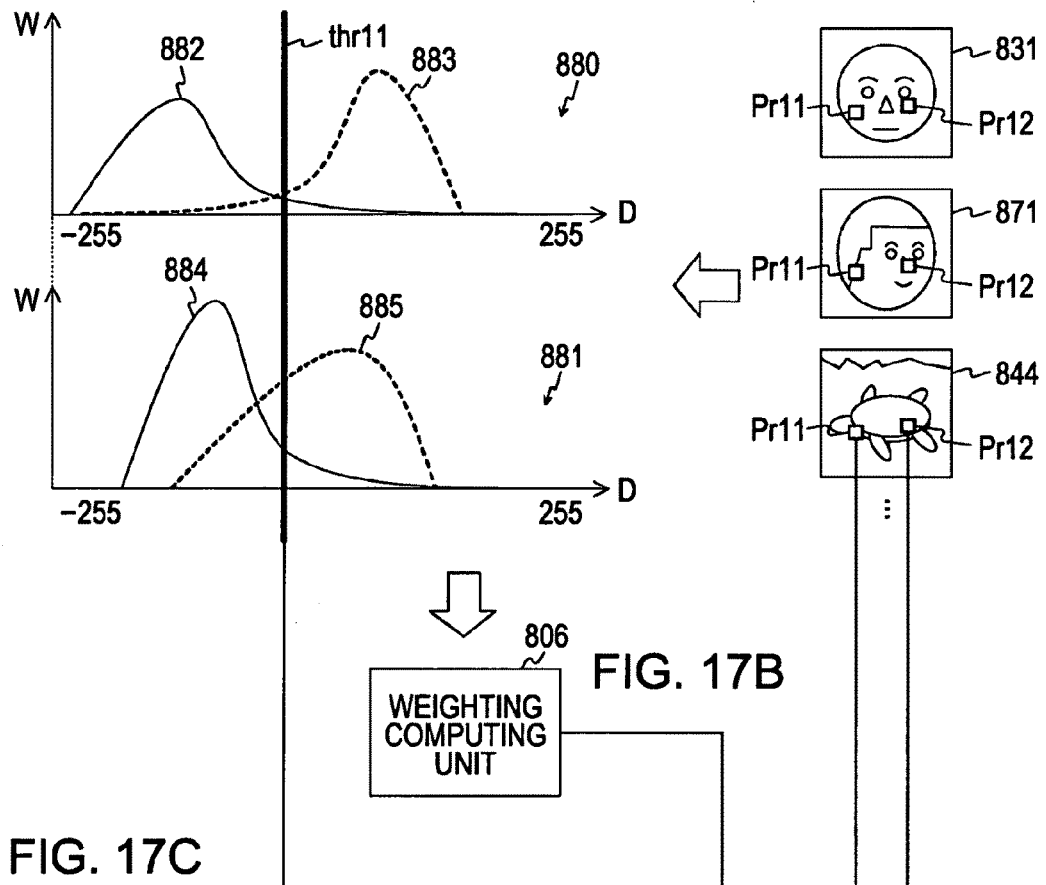

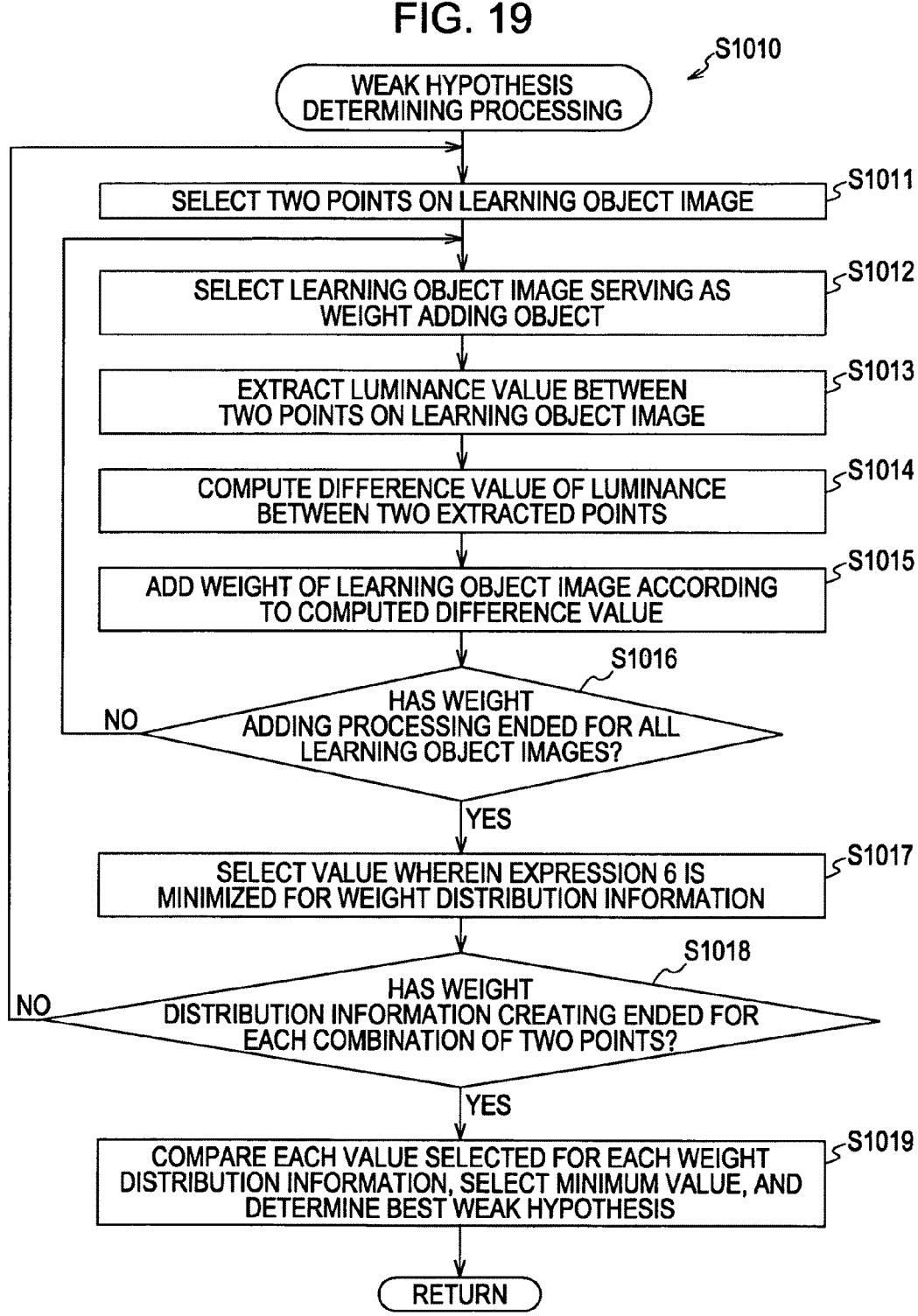

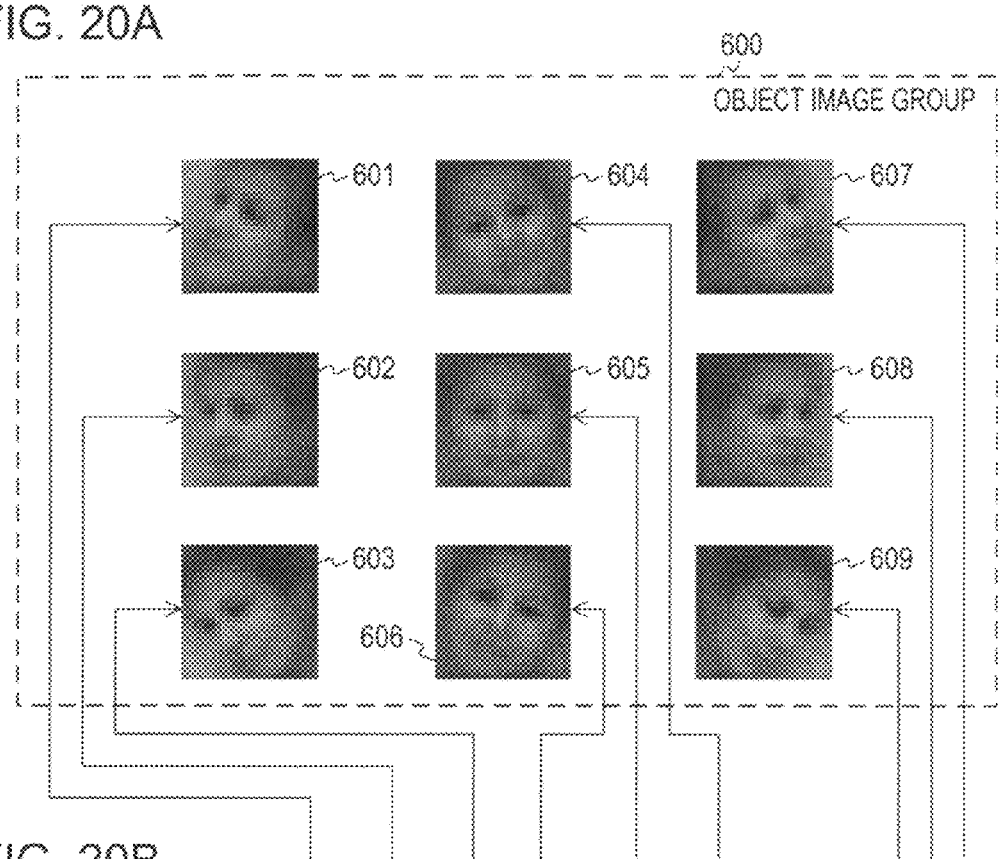

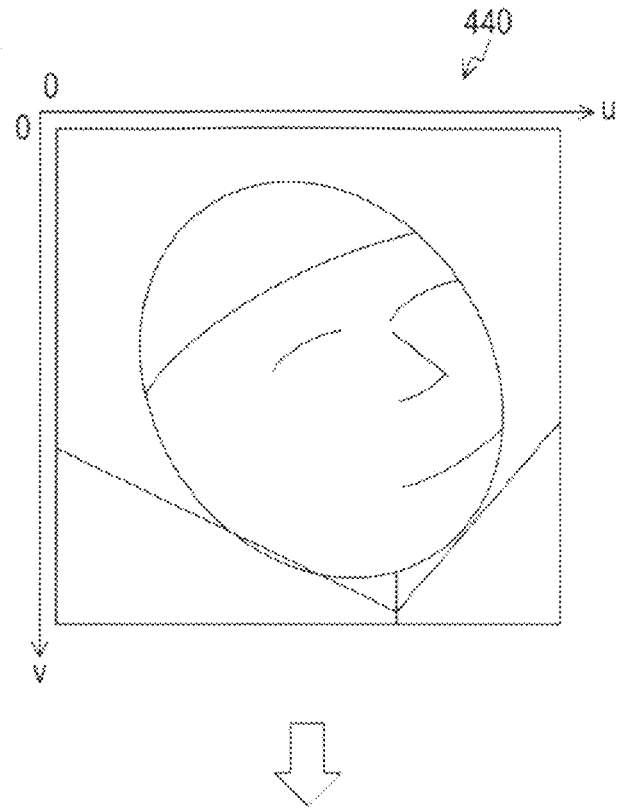

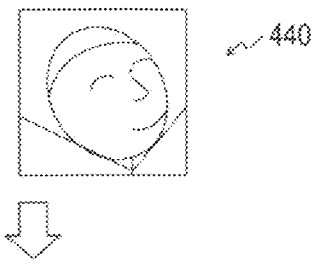

500

502

ROTATE 90 DEGREES TO THE RIGHT

ROTATE 90 DEGREES TO THE LEFT

ROTATE 180 DEGREES

501

503

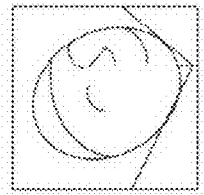
FIG. 35A
FIG. 35B
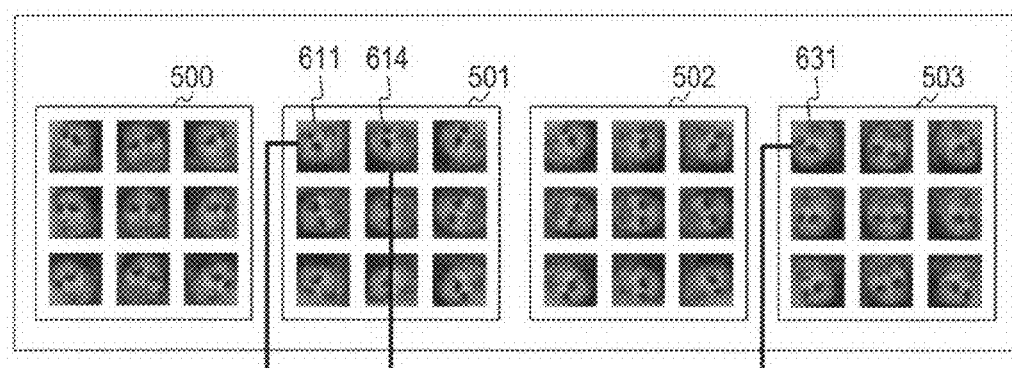
FIG. 35C    FIG. 35D    FIG. 35E
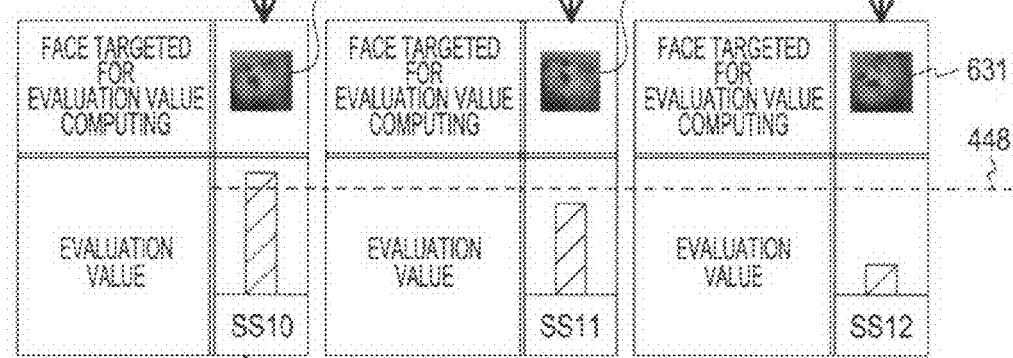

OBJECT DETECTING DEVICE, LEARNING DEVICE, OBJECT DETECTING METHOD, AND PROGRAM

CROSS-REFERENCE TO RELATED APPLICATION

The present application claims priority from Japanese Patent Application No. JP 2009-003870 filed in the Japanese Patent Office on Jan. 9, 2009, the entire content of which is incorporated herein by reference.

BACKGROUND OF THE INVENTION

1. Field of the Invention

The present invention relates to an object detecting device, and in particular relates to an object detecting device that detects an object such as the face of a person from an image, a learning device that creates data used for the detection thereof, and the processing method thereof and a program to cause a computer to execute such method.

2. Description of the Related Art

Heretofore, a subject recognizing technique that recognizes what subject is included in an imaging image, such imaging image being generated by an imaging device such as a digital still camera, digital video camera (e.g. camera-integrated recorder) or the like, has been proposed. As a subject recognizing technique, for example a face detecting technique to detect the face of a person from an imaging image by imaging processing using feature amounts such as luminance, color, and so forth, has been proposed.

For example, a weighted majority value is determined based on whether or not the difference value of the luminance between two points on an image is a threshold value or greater, and this weighted majority value is sequentially added for every combination of two points, thereby computing an evaluation value. An object detecting device that determines whether or not the object is included in the image thereof, based on the computed evaluation value (e.g. see Japanese Unexamined Patent Application Publication No. 2005-157679 (FIG. 1)).

SUMMARY OF THE INVENTION

With the related art as described above, a combination of two points on an image and a combination of a weighted majority vote value and threshold are obtained beforehand by a learning device, and these are correlated and stored. According to whether or not the difference value of the luminance between the two points on the determining object image is at or greater than the threshold, the positive/negative sign of the weighted majority corresponding to the two points is determined, and the evaluation value is computed by sequentially adding the weighted majority value having the determined signs for each combination of two points.

In the case of computing a weighted majority value for distinguishing between an object and a non-object with a learning device, distribution information of difference values of the luminance between the two points on multiple sample images including objects or non-objects are created for each combination of two points. With this distribution information, we can see for example a first bell of the distribution curve showing the distribution state of the difference value of the luminance between the two points on the sample image including an object, and a second bell of the distribution curve showing the distribution state of the difference value of the luminance between the two points on the sample image including a non-object.

For example, a weighted majority value computed by the learning device in the case that the first bell of the distribution curve corresponding to the object and the second bell of the distribution curve corresponding to the non-object are relatively far apart, we can say that the relative reliability is high. Conversely, a weighted majority value computed by the learning device in the case that the first bell of the distribution curve corresponding to the object and the second bell of the distribution curve corresponding to the non-object are largely overlapping, we can say that the relative reliability is low.

However, for example, even in the case that the first bell of the distribution curve corresponding to the object and the second bell of the distribution curve corresponding to the non-object are largely overlapping, there may be a feature in a range of some sort. For example, in a certain range, the two bells are largely overlapping, there is no feature distribution change, and distinguishing between the object and non-object is difficult (i.e. reliability is low). Conversely, in another range, of the two bells one bell may be distributed so as to be dominant, whereby distinguishing the two is easy (e.g. reliability is high).

Thus, in order to improve the detection accuracy of objects, setting an appropriate weighed majority value according to the distribution information of the feature amount distribution values in the multiple sample images including objects or non-objects becomes important.

It has been recognized that there is demand to improve the detection accuracy of objects.

According to an embodiment of the present invention is an object detecting device including a comparing unit to extract feature amounts for two regions on a determining object image and compare a feature amount based on the two feature amounts extracted with a threshold; and a computing unit to select one of two values having different absolute values according to the comparison result, and compute an evaluation value to determine whether or not an object is included in the determining object image, by performing computation with the selected, value, a processing method thereof, and a program to cause a computer to execute the method.

This acts to extract feature amounts for two regions on the determining object, compare the extracted two feature amounts and a threshold value, select one of two values according to the comparison result, and perform calculations of the selected values, thereby computing an evaluation value.

The object detecting device further may include a determining information storage unit to store determining information including multiple combinations of two positions on the determining object image, the threshold, and the two values, wherein the comparing unit compares the two extracted features amounts for the two regions on the determining object image identified by the two positions, and the threshold, for each of the combinations, and wherein the computing unit selects one of the two values according to the comparison results and computes the evaluation values by sequentially performing computations of the selected values.

This acts to compare a feature amount based on the two feature amounts extracted for the two regions in the determining object image and the threshold value for each combination, select one of the two values for each combination depending on the comparison results, and sequentially perform calculations of the selected values, thereby computing evaluation values.

The computing unit may compute the evaluation values for each of the objects, in order to select one of the two values correlated to each of multiple objects, for each of the object and perform calculations of the values selected for each object for each of the objects, thereby determining whether or not one of the plurality of objects is included in the determining object image.

This acts to select one of the two values correlated for each of multiple objects depending on the comparison results, and perform calculations for each object of the values selected for each object, thereby computing an evaluation value for each object.

The object detecting device further may include a determining information storage unit to store determining information including multiple combinations of two positions on the determining object image, the threshold, and the two values that are correlated for each of the multiple objects, wherein the comparing unit compares the two extracted features amounts for the two regions on the determining object image identified by the two positions, and the threshold, for each of the combinations, and wherein the computing unit computes the selected values for each of the objects of the plurality of combinations for each of the objects, thereby computing the evaluation values for each of the objects.

This acts to compare the two extracted feature amounts for the two regions on the determining object image and the threshold value for each combination, and perform calculations for each object of the values selected for each object, thereby computing an evaluation value for each object.

Also, the feature amount may be a luminance value at the positions of two points on the determining object image, with the comparing unit computing the difference value between the two extracted luminance values and comparing the difference value and the threshold value.

This acts to compute the difference value of the two luminance values extracted for the two regions in the determining object image, and compare the difference value and threshold value.

Also, with an embodiment of the present invention, a learning device, a processing method thereof, and program to cause a computer to execute the method, the learning device includes a weighting unit to weight multiple learning object images including one of an object and a non-object; a difference value computing unit to extract features amounts for two regions on the learning object image and compute a difference value of the two extracted feature amounts for each combination of the two regions on the learning object image for each of the learning object images; a distribution information creating unit to create distribution information showing the distribution state of the weight weighted to the learning object image as to the computed difference value, for each of the combinations for each learning object image including the object and each learning object image including the non-object; a determining unit to determine one combination out of the each combination used in the event of computing an evaluation value for determining whether or not the object is included, based on object distribution information which is distribution information created for a learning object image including the object and non-object distribution information which is distribution information created for a learning object including the non-object, and a threshold corresponding to the difference value relating to the combination; and a weighting computing unit to compute a value used in the event of computing the evaluation value according to the two ranges, based on the object distribution information relating to the determined combination included in a lower range of two ranges that are higher and lower than the determined threshold, and the object distribution information and the non-object distribution information relating to the determined combination included in a higher range of the two ranges.

This acts to compute the difference value of the two extracted feature amount for the two regions on the learning object image for each combination for each learning object image, create distribution information for each combination for each learning object image including an object and each learning object image including a non-object, determine the combinations and threshold used in the event of computing the evaluation values based on the object distribution information and non-object distribution information, and compute the value as two values having different absolute values depending on the two ranges, based on object distribution information and non-object distribution information relating to combinations included in two ranges below the determined threshold, and on the object distribution information and non-object distribution information relating to the combinations included in a range thereabove.

Also, the determining unit may determine the combination and the threshold based on the object distribution information and the non-object distribution information included in the lower range of the two ranges that are upper and lower than the standard value, wherein one value of a level corresponding to the difference value is a standard value, and the object distribution information and the non-object distribution information included in the higher range of the two ranges that are higher and lower than the standard value.

This acts to determine combinations and a threshold, based on the object distribution information and non-object distribution information included in the lower range of two ranges that are higher and lower than a standard value, and the object distribution information and non-object distribution information included in the higher range.

Also, the weighting unit may select one of the computed two values for each of the learning object images depending on whether the learning object image is affiliated with the lower range of the two ranges or affiliated with the higher range, and uses the value selected for each learning object image to compute and update the weight for each of the learning object images.

This acts to select one of the two values for each learning object image, depending on whether the learning object image is affiliated with the lower range or is affiliated with the higher range, and uses the values selected for each learning object image to compute and update the weight for each learning object image.

Also, the object may be made up of a first object and a second object which are different from one another; wherein the distribution information creating unit may create the distribution information for each of the combinations for a learning object image including the first object and a learning object image including the second object and a learning object image including the non-object; wherein the determining unit may determine one of the combinations out of the each combination used in the event of computing an evaluation value for determining whether or not either one of the first object and the second object are included, based on first object distribution information which is distribution information created for a learning object image including the first object, second object distribution information which is distribution information created for a learning object image including the second object, and the non-object distribution information, and the threshold value relating to the combination; and wherein the weighting computing unit may compute the value for each of the first object and the second object serving as two values wherein the absolute value differs depending on the two ranges, based on the various information of the first object distribution information and the second object distribution information and the non-object distribution information relating to the determined combination included in a lower range of two ranges that are higher and lower than the determined threshold, and on the various information of the first object distribution information and the second object distribution information and the non-object distribution information relating to the determined combination included in a higher range of the two ranges.

This acts to create distribution information for each combination of a learning object image including the first object, a learning object image including the second object, and a learning object image including a non-object, and determines the threshold value and the combinations used in the event of the evaluation value, based on the first object distribution information and second object distribution information and non-object distribution information, and computes the values of the values for each of the first object and second object as two values having different absolute values according to the two ranges, based on the various information of the first object distribution information and second object distribution information and non-object distribution information relating to the combinations included in the range below the determined threshold, and on the various information of the first object distribution information and second object distribution information and non-object distribution information relating to the combinations included in the range above the determined threshold.

According to the above configurations, an excellent advantage of improving detection accuracy of objects can be gained.

BRIEF DESCRIPTION OF THE DRAWINGS

FIGS. 10A through 10C are drawings illustrating an overview of a recording method to record values corresponding to a weak assumption determined by a weak assumption determining unit in a face detecting dictionary according to the first embodiment of the present invention;

FIGS. 17A through 17C are drawings illustrating an overview of a recording method to record values corresponding to a weak assumption determined by a weak assumption determining unit in a face detecting dictionary according to the first embodiment of the present invention;

FIG. 19 is a flowchart describing weak hypothesis determining processing procedures out of the processing procedures of the object detecting dictionary creating processing by the learning device 800 according to the first embodiment of the present invention;

FIGS. 20A and 20B are drawings illustrating an example of the evaluation value computing dictionary for computing multiple evaluation values for a determining object image according to the first embodiment of the present invention;

FIGS. 24A through 24D are drawings illustrating an example of the determining object image extracted from the image extracting unit and the evaluation value computed by the face determining unit for the determining object image, according to the first embodiment of the present invention;

FIGS. 25A through 25C are drawings schematically illustrating the flow in the case of performing face detecting with the face detecting unit, according to the first embodiment of the present invention;

FIGS. 35A through 35E are drawings schematically illustrating the flow in the case of performing face detecting by the face detecting unit according to the second embodiment of the present invention;

DESCRIPTION OF THE PREFERRED EMBODIMENTS

Preferred embodiments (hereafter referred to as embodiments) to carry out the present invention will be described below. The description will be made in the following order.

1. First embodiment (Face detecting control: example to detect a face from an image and a creation example of dictionary information used for face detecting)

2. Second embodiment (Face detecting control: Modified example to detect a face from an image)

First Embodiment

Configuration Example of Imaging Device

Figure 1:
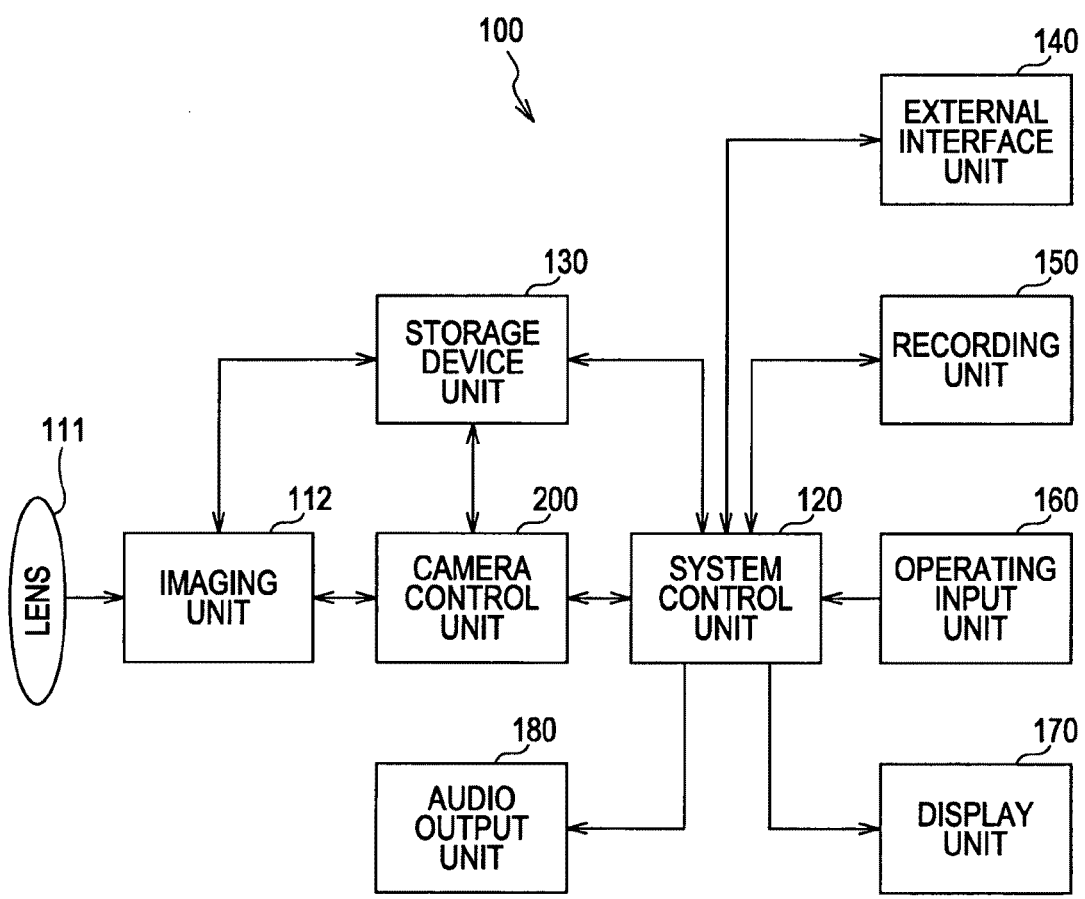
FIG. 1 is a block drawing illustrating a functional configuration example of an imaging device according to a first embodiment of the present invention.

FIG. 1 is a block drawing illustrating a functional configuration example of an imaging device 100 according to a first embodiment of the present invention. The imaging device 100 has a lens 111, imaging unit 112, system control unit 120, storage device unit 130, external interface unit 140, recording unit 150, operating input unit 160, display unit 170, audio output unit 180, and camera control unit 200. The imaging device 100 can be realized by a digital still camera, for example, that images a subject and generates image data, extracts each feature amount by the image analysis for the image data, and performs various types of image processing using the extracted feature amounts.

The lens 111 is made up of multiple lens (zoom lens, focus lens, etc) that condenses light from a subject, and the input light from the subject is supplied via these lenses to the imaging unit 112.

The imaging unit 112 has an imaging device (not shown) which has an electronic shutter function and a signal processing unit (not shown) which processes the output signal of the imaging device and generates an imaging image (image data). That is to say, with the imaging unit 112, an input optical image of the subject is imaged-formed on the imaging face of the imaging device via the lens 111, the imaging device performs imaging operations in this state, and the signal processing unit performs signal processing as to the imaging signal, whereby an imaging image is generated. The generated imaging image is then supplied and stored in the storage device unit 130. Note that the camera parameters (imaging parameters) used to generate the imaging image are sequentially determined by the camera control unit 200.

The camera control unit 200 controls the imaging unit 112 based on the imaging image supplied from the imaging unit 112 via the storage device unit 130 and the control from the system control unit 120. Note that the camera control unit 200 will be described in detail with reference to FIG. 2.

The system control unit 120 performs overall control of the imaging device 100. For example, the system control unit 120 performs control in accordance with operation input from the user accepted by the operating input unit 160. Also, the system control unit 120 controls the display of menu images and so forth displayed on the display unit 170, recording and reading of the imaging image as to the recording unit 150, communication with an external computer and network performed via the external interface unit 140, and so forth. Further, the system control unit 120 performs control to display the imaging image generated by the imaging unit 112 on the display unit 170 at the time of monitoring during image operating.

The storage device unit 130 is a primary storage device in order to temporarily save the imaging image and the like on the imaging device 100 system, and for example, is made up with a DRAM (Dynamic Random Access Memory). That is to say, the exchange of imaging images between various units within the imaging device 100 is performed primarily via the storage device unit 130.

The external interface unit 140 is an external interface that has an input/output terminal such as USB (Universal Serial Bus) or the like, and provides an interface for a connection with an external computer and network connection.

The recording unit 150 records the imaging image generated by the imaging unit 112 based on control by the system control unit 120. Also, the recording unit 150 reads the recorded imaging image and supplies this to the system control unit 120, based on control by the system control unit 120. A recording medium such as a flash memory or the like, for example, can be used as the recording unit 150. Also, the recording unit 150 may be built in to the imaging device 100, or may be mounted on the imaging device 100 so as to be detachable.

The operating input unit 160 is an operating input unit that receives operating input from the user, and outputs the signals according to accepted operating input to the system control unit 120. For example, upon the shutter button to instruct the recording of the imaging image being pressed, the signal according to pressing the shutter button is output to the system control unit 120.

The display unit 170 is a display unit to display various types of images based on control by the system control unit 120. For example, the display unit 170 displays imaging images generated by the imaging unit 112, imaging images read from the recording unit 150, and menu screens provided to the user and so forth.

The audio output unit 180 outputs various types of audio information based on control by the system control unit 120. The audio output unit 180 can be realized with a speaker, for example.

Figure 2:
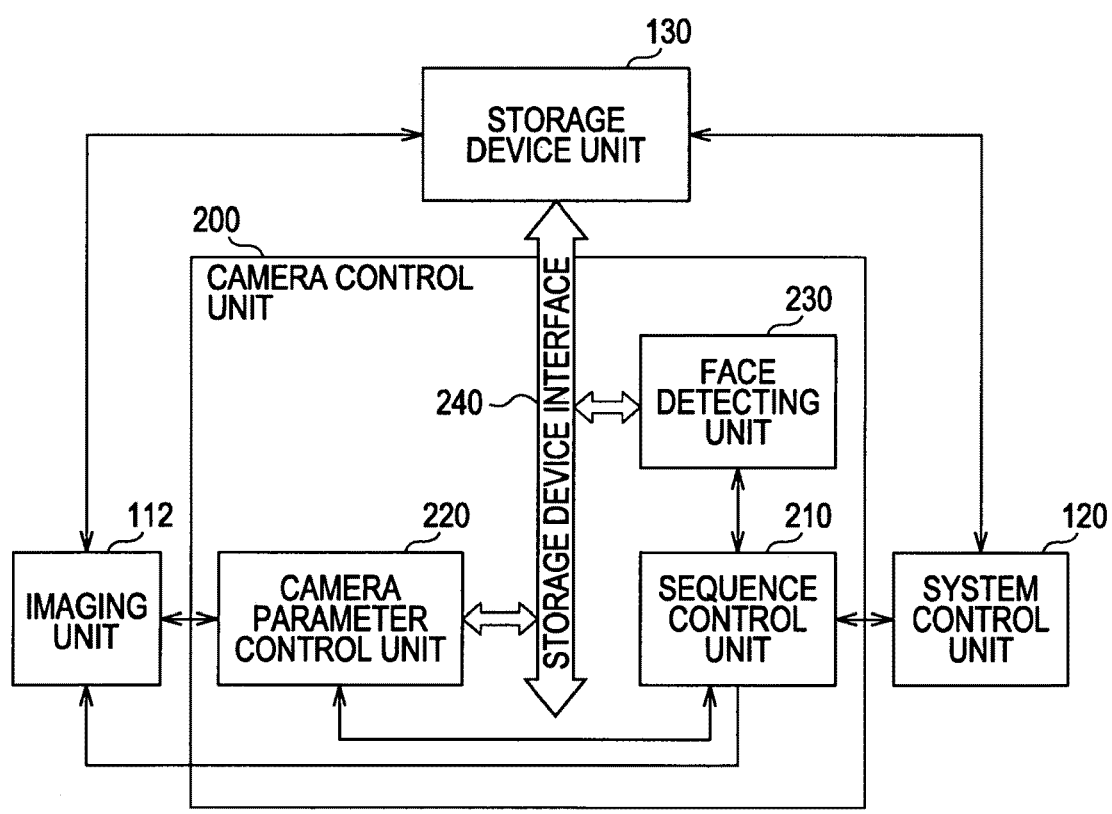
FIG. 2 is a block drawing illustrating a functional configuration example of a camera control unit according to the first embodiment of the present invention.

FIG. 2 is a block drawing illustrating a function configuration example of a camera control unit 200 according to the first embodiment of the present invention. In FIG. 2, along with the functional configuration example of the camera control unit 200, the configuration of the imaging unit 112, system control unit 120, and storage device unit 130 shown in FIG. 1 are also shown. The camera control unit 200 has a sequence control unit 210, camera parameter control unit 220, face detecting unit 230, and storage device interface 240. The exchange of imaging images performed between the storage device unit 130 and camera parameter control unit 220, and between the storage device unit 130 and face detecting unit 230 are performed via the storage device interface 240.

The sequence control unit 210 is started with an imaging image recording awaiting command from the system control unit 120, and maintains a state wherein the imaging image generated by the imaging unit 112 can be recorded. In this imaging image recording awaiting state, the imaging images generated by the imaging unit 112 are sequentially recorded in the recording device unit 130. For example, the imaging images stored in the storage device unit 130 are sequentially updated in 1/60 second increments. Also, the sequence control unit 210 performs control so that the camera parameter control unit 220 determines the camera parameters, based on the current imaging image (the newest imaging image generated by the imaging unit 112) stored in the storage device unit 130. Also, the sequence control unit 210 performs control for the face detecting unit 230 to perform face detecting processing for the current imaging image stored in the storage device unit 130. In the case that the face detecting information showing that a face has been detected is output from the face detecting unit 230, the sequence control unit 210 outputs information to the effect that a face has been detected to the system control unit 120 and camera parameter control unit 220.

The camera parameter control unit 220 determines the camera parameters relating to imaging images, and performs imaging control as to the imaging unit 112 using the determined camera parameters. Specifically, the camera parameter control unit 220 obtains the current imaging image stored in the storage device unit 130 via the storage device interface 240, based on a trigger from the sequence control unit 210. The current imaging image is evaluated, and camera parameters such as shutter speed, exposure, white balance and so forth are determined. Also, in the case that a face is detected in the current imaging image, the camera parameter control unit 220 camera parameters such as shutter speed, exposure, white balance and so forth are determined based on the detected face and the current imaging image evaluation. For example, in the case that a face is detected, camera parameters optimal for the detected face are determined based on the position and size of the detected face in the imaging image.

The face detecting unit 230 subjects the current imaging image stored in the storage device unit 130 to face detecting processing, and in the case that a face is detected, the face detection information is output to the sequence control unit 210. Specifically, based on a trigger from the sequence control unit 210, the face detecting unit 230 obtains the current imaging image stored in the storage device unit 130, via the storage device interface 240 and subjects the current imaging image to face detecting processing. The face detecting information is information relating to the detected face, and for example, is information including a score expressing the position of the detected face in the imaging image, the size, type (facing direction of the face, etc), and the degree of the face. Note that face detecting unit 230 will be described in detail with reference to FIG. 3.

Figure 3:
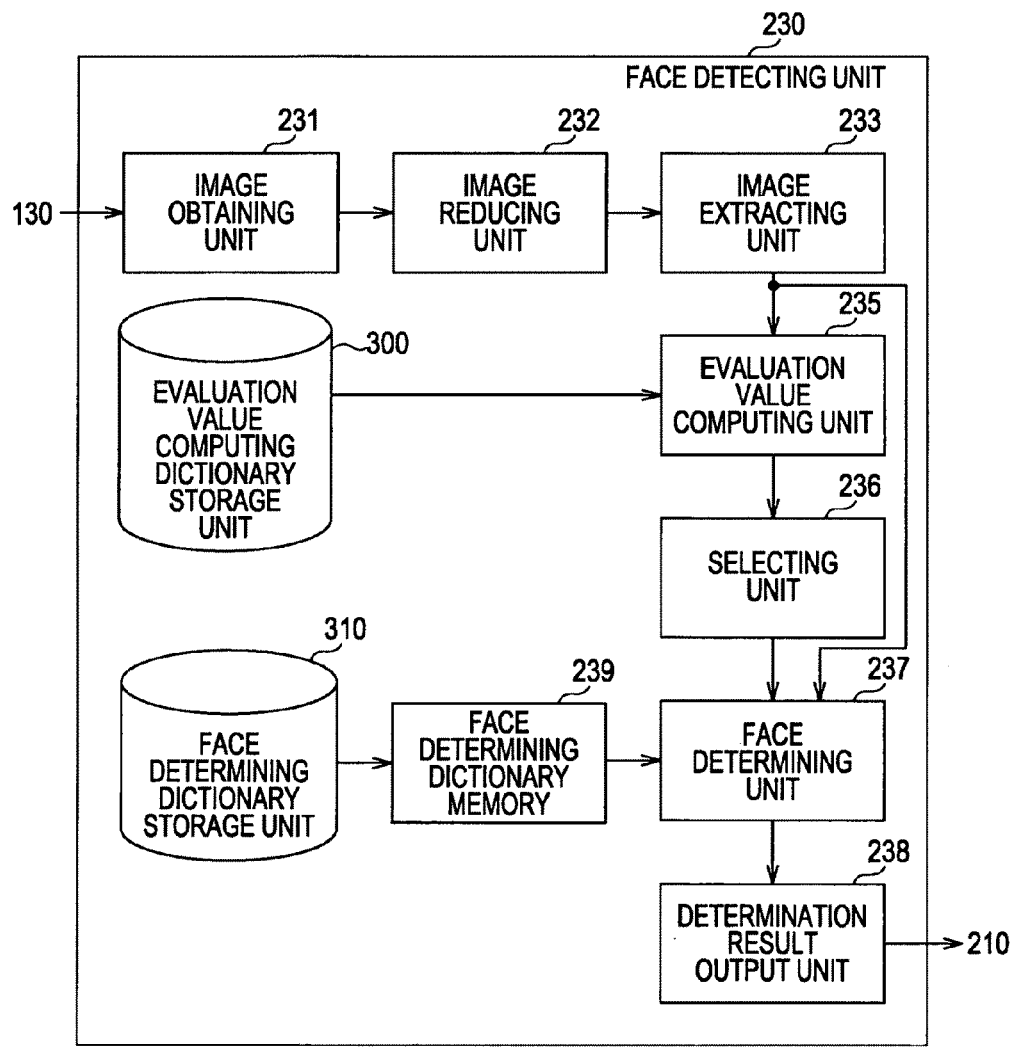
FIG. 3 is a block drawing, illustrating a functional configuration example of a face detecting unit according to the first embodiment of the present invention.

FIG. 3 is a block drawing illustrating a functional configuration example of the face detecting unit 230 according to the first embodiment of the present invention. The face detecting unit 230 has an image obtaining unit 231, image reducing unit 232, an image extracting unit 233, an evaluation value computing unit 235, a selecting unit 236, a face determining unit 237, a determination result output unit 238, an evaluation value computing dictionary storage unit 300, and a face determining dictionary storage unit 310.

The image obtaining unit 231 obtains the imaging image stored in the storage device unit 130 via the storage device interface 240, and outputs the obtained imaging image to the image reducing unit 232.

The image reducing unit 232 generates multiple images of different sizes by sequentially reducing the imaging images output from the image obtaining unit 231 at a predetermined ratio, and sequentially outputs the generated images to the image extracting unit 233. Note that the reduction of the imaging images will be described in detail with reference to FIGS. 22A through 22D.

The image extracting unit 233 sequentially extracts the images included in a predetermined region for each image, for each image output from the image reducing unit 232, and outputs the extracted image (determining object image) to the evaluation computing unit 235 and face determining unit 237. Note that the extracting of this image will be described in detail with reference to FIGS. 22A through 22D.

The evaluation value computing dictionary storage unit 300 stores an evaluation value computing dictionary for computing evaluation values to evaluate which of multiple objects are included in the image output from the image extracting unit 233, for each object. The stored evaluation value computing dictionary is supplied to the evaluation value computing unit 235. The first embodiment of the present invention is described to exemplify the multiple objects as multiple faces that are facing different directions. Note that the creating method of the evaluation value computing dictionary will be described in detail with reference to FIGS. 5A through 17C and so forth. Also, the storage content of the evaluation value computing dictionary will be described in detail with reference to FIGS. 20A and 20B. Note that the evaluation value computing dictionary storage unit 300 is an example of the determining information storage unit referred to in the Summary of the Invention.

The face determining dictionary storage unit 310 correlates the face determining dictionary for determining whether or not an identified object is included in the image output from the image extracting unit 233, for every object. The stored face determining dictionary is supplied to the face determining dictionary memory 239. For each of the multiple objects corresponding to the evaluation values calculated using the evaluation value calculating dictionary stored in the evaluation value computing dictionary storage unit 300, a face determining dictionary is stored in the face determining dictionary storage unit 310. Note that the creating method of the face determining dictionary will be described in detail with reference to FIGS. 5A through 17C and so forth. Also, the storage content of the face determining dictionary will be described in detail with reference to FIGS. 21A and 21B. Note that the face determining dictionary storage unit 310 is an example of the determining information storage unit referred to in the Summary of the Invention.

The face determining dictionary memory 239 is work memory to store one or multiple face determining dictionaries out of the multiple face determining dictionaries stored in the face determining dictionary storage unit 310, and supplies the content in the stored face determining dictionaries to the face determining unit 237.

The evaluation value computing unit 235 extracts a feature amount from multiple regions in the determining object image output from the image extracting unit 233, and compares two feature amounts of the various feature amounts extracted, thereby simultaneously computing evaluation values for multiple objects. The evaluation value for each calculated object is output to the selecting unit 236. The evaluation value computing dictionary stored in the evaluation value computing dictionary storage unit 300 is used for the computing of the evaluation values. Note that the computing of the evaluation values by the evaluation value computing unit 235 will be described in detail with reference to FIGS. 23A through 25C. Also, the evaluation value computing unit 235 is an example of the comparing unit and computing unit referred to in the Summary of the Invention.

The selecting unit 236 selects an evaluation value that satisfies certain conditions from the evaluation values for each object output from the evaluation value computing unit 235, and outputs information (selection object information) relating to the object relating to the selected evaluation value, to the face determining unit 237. A certain condition, for example, may be a predetermined number of evaluation values having high values out of the evaluation values for each object. Also, a certain condition may be, for example, an evaluation value exceeding a defined value out of the predetermined number of evaluation values. Note that the selection method of the evaluation values by the selecting unit 236 will be described in detail with reference to FIGS. 23A through 25C.

The face determining unit 237 performs face determining processing to determine whether or not a face is included in the determining object image output from the image extracting unit 233. The determination result is output to the determination result output unit 238. As determination results, for example, the position and size of the detected face in the imaging image, the type (facing direction of the face, etc), and a score expressing the degree of the face are output. Specifically, the face determining unit 237 correlates the object relating to the evaluation value selected by the selecting unit 236 and holds the face determining dictionary stored in the face determining dictionary storage unit 310 in the face determining dictionary memory 239. Using the face determining dictionary held in the face determining dictionary memory 239, feature amounts are extracted from multiple regions in the determining object image output from the image extracting unit 233, and two feature amounts out of the various feature amounts extracted are compared, whereby the evaluation value is computed for each face determining dictionary. Based on the evaluation value herein, determination is made as to whether or not a face is included in the determining object image output from the image extracting unit 233. Note that the face determining processing by the face determining unit 237 will be described in detail with reference to FIGS. 23A through 25C. Also, the face determining unit 237 is an example of the comparing unit and computing unit referred to in the Summary of the Invention.

In the case that a determination result of a determination that a face is included in the determining object image output from the image extracting unit 233 is output from the face determining unit 237, the determination result output unit 238 outputs the face detecting information indicating information to the effect that a face has been detected from the imaging image is output to the sequence control unit 210. The face detecting information includes, for example, the position and size of the detected face in the imaging image, the type (facing direction of the face, etc), and a score expressing the degree of the face.

Configuration Example of Learning Device

Next, a learning device to create an evaluation value computing dictionary and face determining dictionary used in the face detecting processing according to the first embodiment of the present invention will be described in detail with reference to the drawings. Note that the learning shown in the embodiments of the present invention means that, based on a large amount of data, the regularity that is behind the data is discovered.

Figure 4:
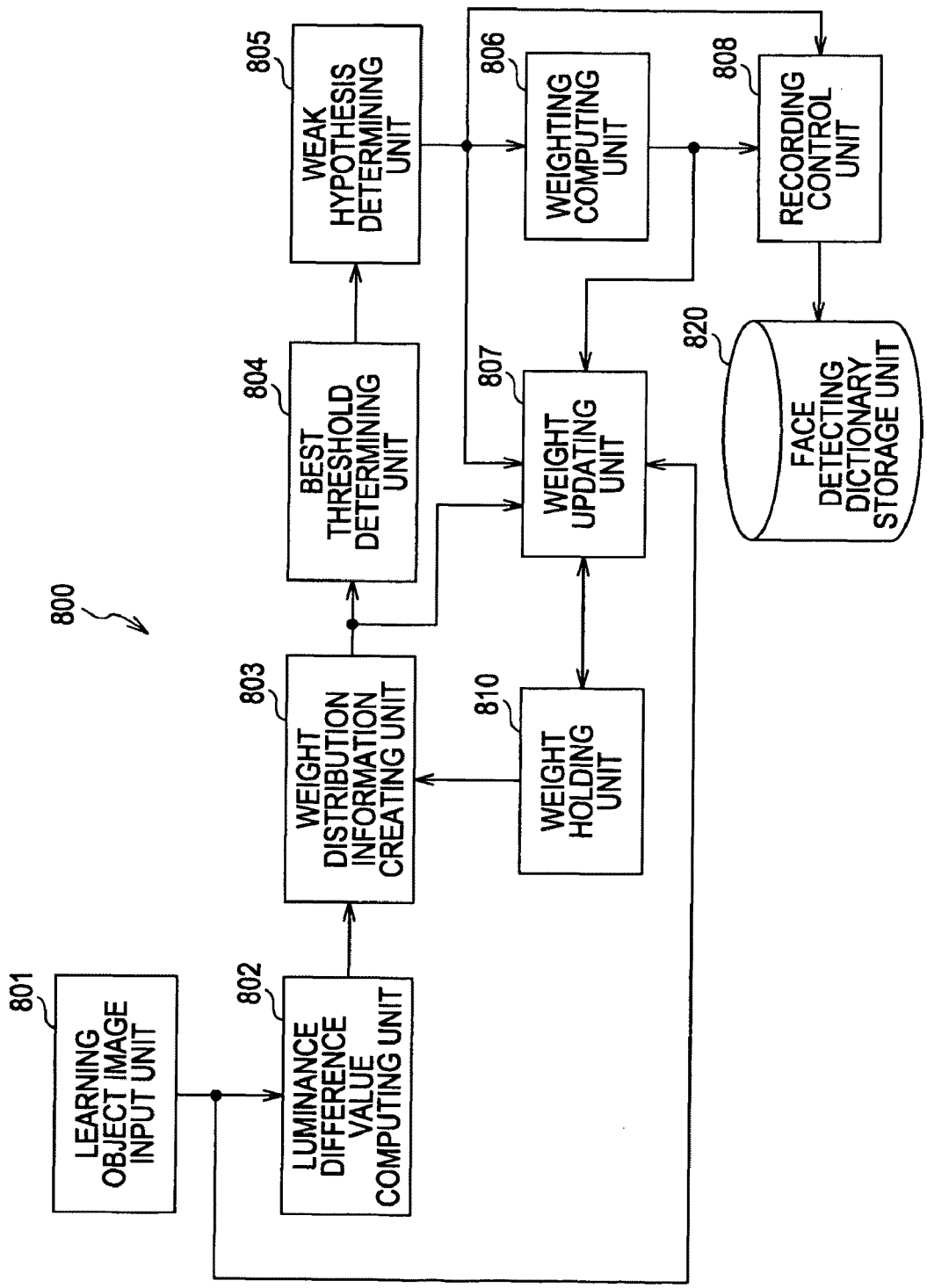
FIG. 4 is a block drawing illustrating a functional configuration example of a learning device according to the first embodiment of the present invention.

FIG. 4 is a block drawing showing a functional configuration example of a learning device 800 according to the first embodiment of the present invention. The learning device 800 has a learning object image input unit 801, luminance difference value computing unit 802, weight distribution information creating unit 803, optimal threshold determining unit 804, weak hypothesis (Weak Learner) determining unit 805, and weighting computing unit 806. Also, the learning device 800 has a weight updating unit 807, recording control unit 808, weight holding unit 810, and face detecting dictionary storage unit 820. In this example, an example of creating a face detecting dictionary for detecting the face of a person will be described. The face detecting dictionary corresponds to an evaluation value computing dictionary stored in the evaluation value computing dictionary storage unit 300 shown in FIG. 3 and a face determining dictionary stored in the face determining dictionary storage unit 310. Note that the learning device 800 is realized with a learning algorithm such as Real AdaBoost or the like.

The learning object image input unit 801 inputs a learning object image that serves as a learning sample, and the input learning object image is output to the luminance difference value computing unit 802 and weight updating unit 807, for every type thereof. According to the first embodiment of the present invention, an example is shown using an image that has been normalized to 24 pixels×24 pixels as a learning object image input to the learning object image input unit 801. Also, in the case of creating a face detecting dictionary for detecting the face of a person, a sample image including the face of a person (learning object forward-facing face image) and a sample image not including the face of a person (learning object non-face image) are input as learning object images in the learning object image input unit 801. In this case, as a learning object forward-facing face image, for example an image can be used that has been normalized so that the positions of both eyes of the face are in the same position in each learning object image. Also, for example, roughly 10,000 images are input as learning object forward-facing face images, and roughly 100,000 images are input as learning object non-face images. These image examples will be described in detail with reference to FIGS. 5A and 5B and 12A through 12C.

The luminance difference value computing unit 802 computes the difference value of luminance between two points on the learning object image output from the learning object image input unit 801, for each learning object image. The computed difference value is correlated to the learning object image subjected to computing and the position between two points, and output to the weight distribution information creating unit 803. In two ways of calculations at the same two point on the learning object image (e.g. "A−B", "B−A" in the case that the luminance values of the two points are A and B), only the positive/negative sign differs, and the absolute value is the same value. Therefore, of the two ways of calculating, one calculation is performed, and the other calculation can be omitted. That is to say, the luminance difference value computing unit 802 computes a difference value of the luminance for each combination ($_{576}C_2$=165,600 ways) between two points of the pixels making up the learning object image output from the learning object image input unit 801. Note that the luminance difference value computing unit 802 is an example of the difference value computing unit referred to in the Summary of the Invention.

The weight distribution information creating unit 803 creates weight distribution information indicating the distribution state of the weight given to the learning object image that is subjected to computing as to the difference value of the luminance between the two points output from the luminance difference value computing unit 802, for every combination of two points. Note that the weight distribution information is categorized into learning object forward-facing face images and learning object non-face images, and created. The computed weight distribution information is correlated to combinations of two points that are subjected to creation and output to the optimal threshold determining unit 804 and weight updating unit 807. Note that the weight given to the learning imaging image is held in the weight holding unit 810. Also, the creation of weight distribution information will be described in detail with reference to FIGS. 7A through 8B, and 14A through 15B. Note that the weight distribution information creating unit 803 is an example of the distribution information creating unit referred to in the Summary of the Invention.

The optimal threshold determining unit 804 determines an optimal threshold for each combination of two point, based on the weight distribution information output from the weight distribution information creating unit 803. The determined optimal threshold and the weight distribution information subjected to determining are correlated with the combinations of the two points, and output to the weak hypothesis determining unit 805. The determining of the optimal threshold will be described in detail with reference to FIGS. 8A and 8B and 15A through 15C.

The weak hypothesis determining unit 805 determines the best weak hypothesis based on the weight distribution information created by the weight distribution information creating unit 803. Specifically, the weak hypothesis determining unit 805 determines one threshold from each optimal threshold output from the optimal threshold determining unit 804, and determines the weak hypothesis of the weight distribution information corresponding to this threshold as the best weak hypothesis. The determined threshold, and best weak hypothesis, and the weight distribution information corresponding to this weak hypothesis are correlated, and output to the weighting computing unit 806, weight updating unit 807, and recording control unit 808. The determining of the weak hypothesis will be described in detail with reference to FIGS. 9A through 9C and 16A and 16B. Note that the weak hypothesis determining unit 805 is an example of the determining unit referred to in the Summary of the Invention.

The weighting computing unit 806 computes weighting (weighted majority value) using the weight distribution information corresponding to the best weak hypothesis output from the weak hypothesis determining unit 805, and outputs the computed weighting value to the recording control unit 808. The computing of this weighting will be described in detail with reference to FIGS. 10A through 10C and 17A through 17C.

The weight updating unit 807 updates the weight corresponding to each learning object image held in the weight holding unit 810. Specifically, the weight updating unit 807 updates each weight, based on the weight distribution information from the weight distribution information creating unit 803, the optimal threshold corresponding to the best weak hypothesis from the weak hypothesis determining unit 805, and the weighting value from the weighting computing unit 806. The updating of the weight will be described in detail with reference to FIGS. 10A through 10C and 17A through 17C.

The recording control unit 808 correlates the weighting value output from the weighting computing unit 806 and the threshold and best weak hypothesis output from the weak hypothesis determining unit 805, and records this in the face detecting dictionary storage unit 820. This face detecting dictionary will be described in detail with reference to FIGS. 10A through 10C and 17A through 17C.

The weight holding unit 810 holds the weight given to each learning object image output from the learning object image input unit 801, and supplies the held weight to the weight distribution information creating unit 803. Also, the weight held in the weight holding unit 810 is updated with the weight updating unit 807. Note that the holding content of the weight holding unit 810 will be described in detail with reference to FIGS. 6A and 6B and 13A and 13B.

Figure 5A:
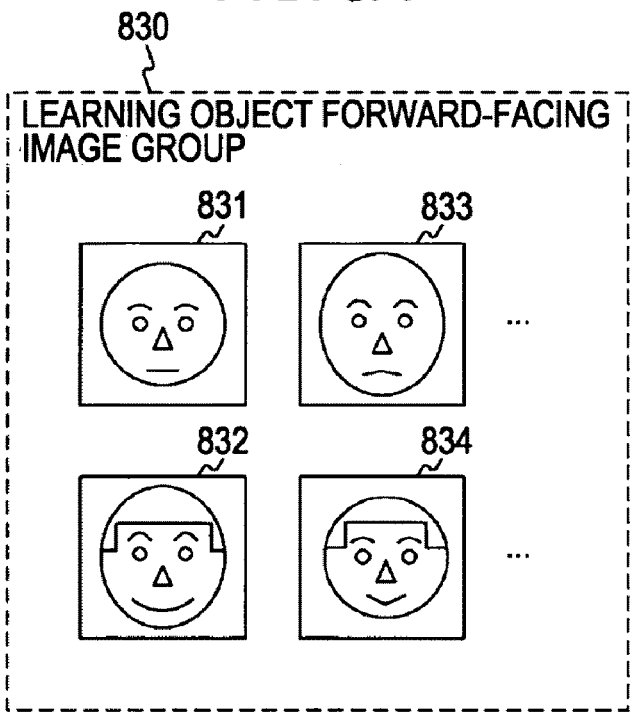
FIGS. 5A and 5B are drawings illustrating an example of a learning object image serving as an object of learning by the learning device according to the first embodiment of the present invention.
Figure 5B:
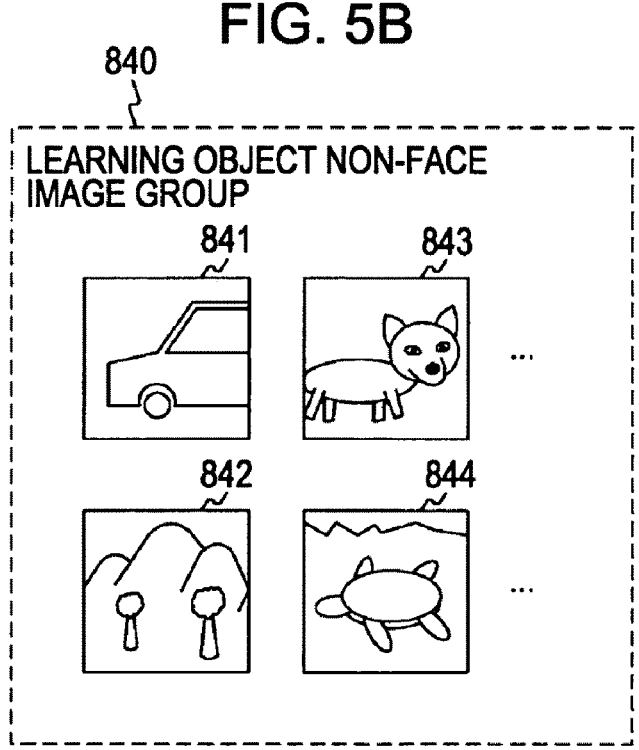

FIGS. 5A and 5B are drawings illustrating an example of a learning object image serving as a learning object by the learning device 800 according to the first embodiment of the present invention. FIG. 5A shows a learning object forward-facing face image group 830 made up of multiple learning object forward-facing face images, and FIG. 5B shows a learning object non-face image group 840 made up of multiple learning object non-face images. Note that in the example shown in FIGS. 5A and 5B, simplified images are shows as the learning object images, for ease of description.

A large number of sample images including a face (forward-facing face) of a person are used as the learning object forward-facing face images, for example, as in the learning object forward-facing face images 831 through 834 shown in FIG. 5A. Also, a large number of sample images not including the face of a person are used as the learning object non-face images, as with the learning object non-face images 841 through 844, as shown in FIG. 5B. Note that with this example, an example will be described in the case of creating a face detecting dictionary, using roughly 10,000 learning object forward-facing images and roughly 100,000 learning object non-face images. Each learning object image is sequentially input, by type, in the learning object image input unit 801.

Figures 6A, 6B:
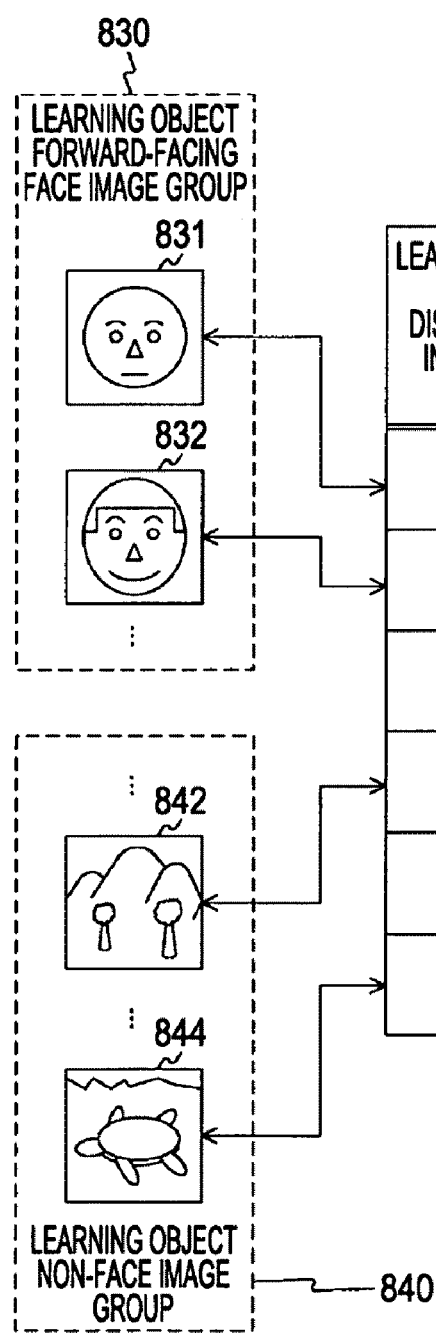
FIGS. 6A and 6B are drawings schematically illustrating holding content of a weight holding unit according to the first embodiment of the present invention.

FIGS. 6A and 6B are drawings schematically showing the holding content of the weight holding unit 810 according to the first embodiment of the present invention. FIG. 6A shows a learning object image wherein a weight is held in the weight holding unit 810, and FIG. 6B shows the holding content of the weight holding unit 810 corresponding to the learning object images. Also, the correlation of FIGS. 6A and 6B are shown tied together by arrows. Note that a portion of the learning object images shown in FIGS. 5A and 5B are shown as learning object images included in the learning object forward-facing face image group 830 and learning object non-face image group 840 shown in FIG. 6A, and the same reference numerals are appended where the learning object image is the same.

Learning object image distinguishing information ($x_i$) 811, weight ($W_i^t$) 812, and face image/non-face image identifying information ($y_i$) 813 are held in the weight holding unit 810. The various information herein are stored by the weight updating unit 807 for each learning object image output from the learning object image input unit 801, and are updated.

The learning object image distinguishing information ($x_i$) 811 is distinguishing information to distinguish the learning object images input in the learning object image input unit 801, and for example, $x_i$ (i is an integer satisfying $1 \leq i \leq K$) is correlated to the learning object image and held. In the example shown in FIG. 6B, a case is shown wherein K learning object images are input in the learning object image input unit 801. For example, we can say that K=110,000.

The weight ($W_i^t$) 812 is a weight given for each learning object image input in the learning object image input unit 801, and is sequentially updated by the weight updating unit 807. The weight ($W_i^t$) 812 is a value normalized so as to satisfy the following Expression 1. Also, the same value (1/K) is given as weight ($W_i^1$) to each learning object image immediately following input into the learning object image input unit 801. Now, i corresponds to the i of the learning object image distinguishing information ($x_i$) 811, and t is a loop counter in the event of boosting, for example, we can say that t=2,000 to 3,000.

$$\sum_{i=1}^{K} W_i^t = 1 \quad \text{Expression 1}$$

The face image/non-face image identifying information ($y_i$) 813 is information that identifies the types of learning object images input in the learning object image input unit 801, and for example, "1" is held in the learning object forward-facing face image, and "−1" is held in the learning object non-face image. This face image/non-face image identifying information is stored with the weight updating unit 807 according to the types of learning object images output from the learning object image input unit 801.

Creation Example of Face Detecting Dictionary

Figure 7A:
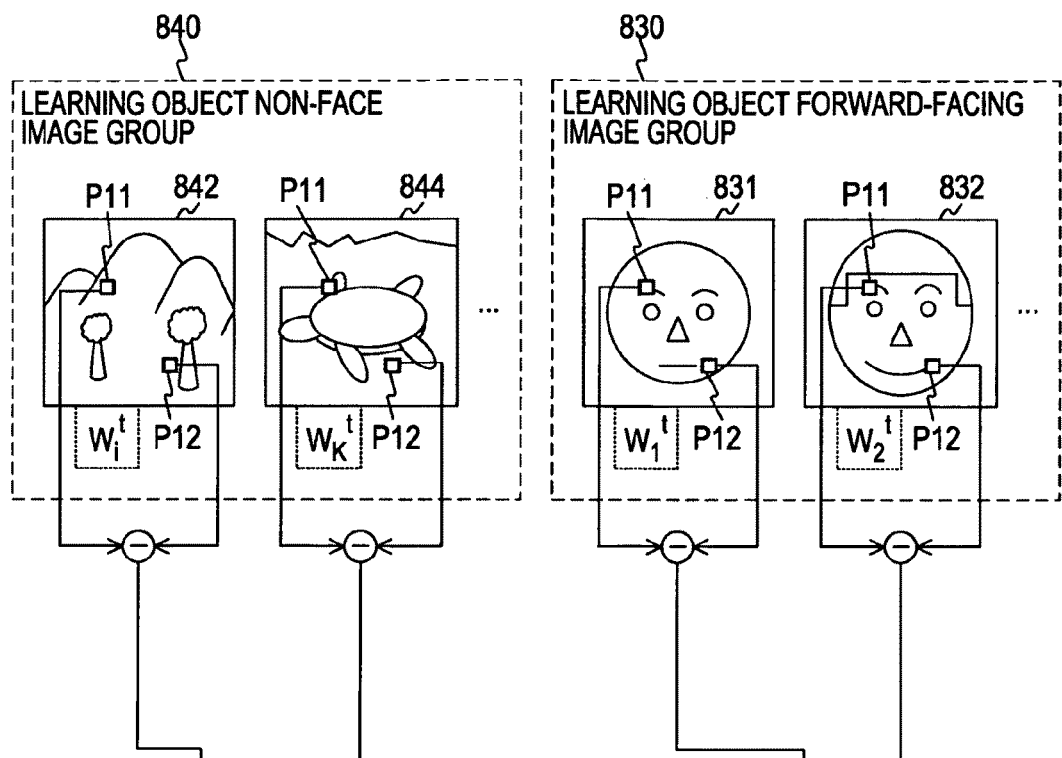
FIGS. 7A and 7B are drawings illustrating an overview of a creating method for weight distribution information by a weight distribution information creating unit according to the first embodiment of the present invention.
Figure 7B:
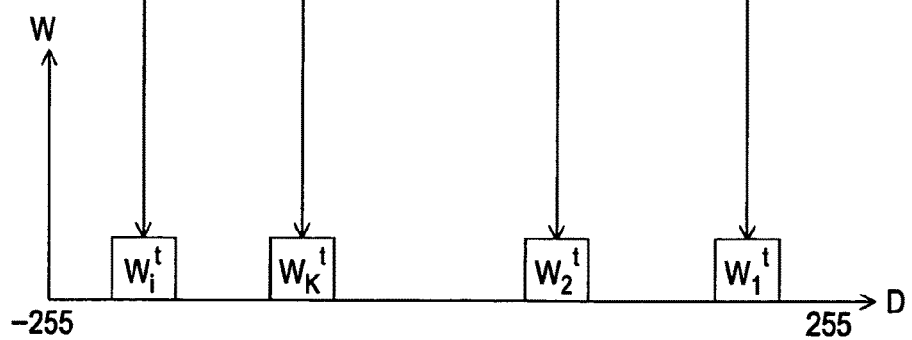

FIGS. 7A and 7B are drawings showing an overview of a creating method of the weight distribution information by the weight distribution information creating unit 803 according to the first embodiment of the present invention. FIG. 7A shows an overview of a computing method to compute the difference value of the luminance between two points on each learning object image. In FIG. 7A, of the various learning object images included in the learning object forward-facing face image group 830 and learning object non-face image group 840, the learning object font-facing face images 831 and 832, and the learning object non-face images 842 and 844 are shown, and an example to compute the difference value of the luminance is shown. Also, the same can be performed for the other learning object images. Also, the weight ($W_i^t$) weighted to each learning object image is shown in the broken-line rectangle at the lower portion of each learning object image. The weight ($W_i^t$) is correlated to each learning object image and held in the weight holding unit 810.

First, the luminance difference value computing unit 802 extracts the luminance of the same two points on each learning object image, and computes the difference value of the luminance of the extracted two points for each learning object image. For example, as shown in FIG. 7A, the luminance of the two points (pixel positions P11 and P12) in the learning object forward-facing face images 831 and 832 and learning object non-face images 842 and 844 is extracted, and the difference value of the luminance of the extracted two points is computed.

FIG. 7B shows an overview of a creating method to create weight distribution information based on the difference value of the luminance between two points on each learning object image. In FIG. 7B, a weight distribution graph is shown as weight distribution information, wherein the horizontal axis is an axis showing the difference value of luminance (−255 through 255), and the vertical axis is an axis showing the product value of the weight.

The weight distribution information creating unit 803 adds the weight ($W_i^t$) that is correlated to the learning object image from which the difference value is computed and held in the weight holding unit 810 to a level of the difference value computed by the luminance difference value computing unit 802. For example, as shown in FIG. 7B, the weights ($W_1^t$, $W_2^t$, $W_i^t$, $W_K^t$) corresponding to each learning object image are added to the levels of difference values computed for the learning object forward-facing face images 831 and 832 and learning object non-face images 842 and 844. Also, in the same way for other learning object images, the weight ($W_i^t$) corresponding to each learning object image is sequentially added, and weight distribution information is created. Note that the same value (1/K) is given as weight ($W_i^1$) to each learning object image immediately following input into the learning object image input unit 801, whereby, in the case of t=1, the same weight ($W_i^t$) is sequentially added. Also, for the combinations (pairs) of other two points on a learning object image, similarly, the weight ($W_1^t$) correlated to each learning object image is sequentially added, and weight distribution information is created. Thus, an example of weight distribution information created for the combination of two points (pixel positions P11 and P12) in each learning object image is shown in FIGS. 8A and 8B).

Figure 8A:
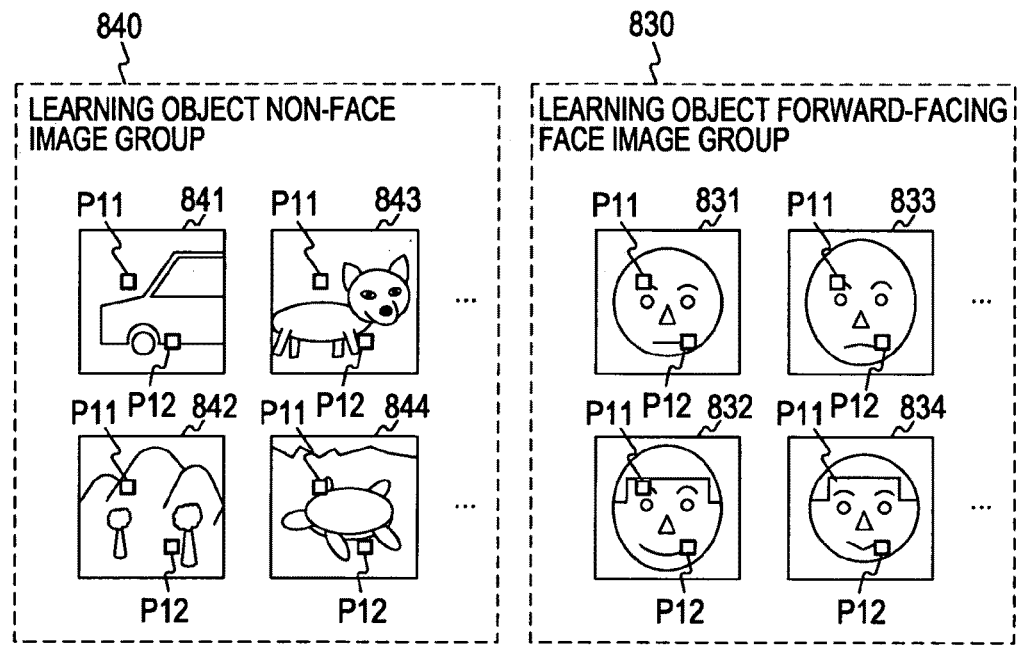
FIGS. 8A and 8B are drawings illustrating an overview of the relation between the weight distribution information created by the weight distribution information creating unit and a learning object image according to the first embodiment of the present invention.
Figure 8B:
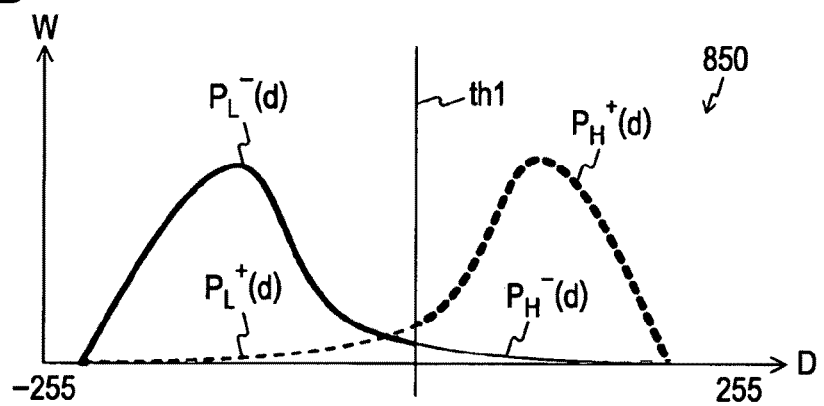

FIGS. 8A and 8B are drawings showing an overview of the relation between the weight distribution information created by the weight distribution information creating unit 803 and the learning object image, according to the first embodiment of the present invention. FIG. 8A shows various learning object images included in the learning object forward-facing face image group 830 and learning object non-face image group 840. These learning object images are the same as in FIGS. 5A and 5B.

FIG. 8B shows a weight distribution curve (weight distribution information) 850 created for the combination of the two points (pixel positions P11 and P12). The weight distribution curve 850 is a curve created by tying together the product values of the weight ($W_i^t$) for each sequentially added level, for each type of learning object image, with a creating method of weight distribution information shown in FIGS. 7A and 7B. With the weight distribution curve, we can see the feature weight distribution state according to each type of the learning object images. Also, with the weight distribution curve, an independent weight distribution can be obtained for each of the face images and non-face images. For example, with the weight distribution curve 850 shown in FIG. 8B, let us say that the curve generated with a bell to the right side is a curve corresponding to face images, and the curve generated with a bell to the left side is a curve corresponding to non-face images. The features of the weight distribution often differ according to the combinations of the two points that are computing objects of the luminance difference values.

A determining method for a threshold for performing distinguishing between a face and non-face will be described. For example, let us say that the value of the vertical axis on the weight distribution curve 850 shown in FIG. 8B is d (d is an integer that satisfies $-255 \leq d \leq 255$) and constant on the horizontal axis is th1 (th1 is an integer that satisfies $-255 \leq th1 \leq 255$). In this case, let us say that the value on the weight distribution curve of the learning object forward-facing face image that is less than the constant th1 is $P_L^+(d)$, and the value on the weight distribution curve of the learning object forward-facing face image that is at or greater than the constant th1 is $P_H^+(d)$. Also, let us say that the value on the weight distribution curve of the learning object non-face image that is less than the constant th1 is $P_L^-(d)$, and the value on the weight distribution curve of the learning object non-face image that is at or greater than the constant th1 is $P_H^-(d)$. Note that in FIG. 8B, the weight distribution curve ($P_L^+(d)$) of the face image that is less than the constant th1 is shown with a fine broken line, and the weight distribution curve ($P_H^+(d)$) of the face image that is at or greater than the constant th1 is shown with a bold broken line. Also, the weight distribution curve ($P_L^-(d)$) of the non-face image that is less than the constant th1 is shown with a bold line, and the weight distribution curve ($P_H^-(d)$) of the non-face image that is at or greater than the constant th1 is shown with a fine line.

In this case, the optimal threshold determining unit 804 computes the sum total of weight distributions on both sides of the constant th1. For example, using the following Expressions 2 through 5, the weight distribution sum totals $P_H^+$, $P_L^+$, $P_H^-$, and $P_L^-$ on both sides of the constant th1 are computed.

$$P_H^+ = \sum_{d=th1}^{255} P_H^+(d)$$ Expression 2

$$P_L^+ = \sum_{d=-255}^{th1} P_L^+(d)$$ Expression 3

$$P_H^- = \sum_{d=th1}^{255} P_H^-(d)$$ Expression 4

$$P_L^- = \sum_{d=-255}^{th1} P_L^-(d)$$ Expression 5

Next, the optimal threshold determining unit 804 computes a value T1 for the computed weight distribution sum totals $P_H^+$, $P_L^+$, $P_H^-$, and $P_L^-$ using the following Expression 6.

$$T1 = \sqrt{(P_L^+ \times P_L^-)} + \sqrt{(P_H^+ \times P_H^-)}$$ Expression 6

Next, the optimal threshold determining unit 804 determines the constant th1, wherein the computed value T1 is minimum, as a threshold th1 relating to the combination of two points (pixel positions P11 and P12) corresponding to the weight distribution curve 850 shown in FIG. 8B. Also, for the combinations (pairs) of other two points on the learning object image, similarly the weight distribution information is used to determine the threshold. Thus, for the combination of two points on each learning object image, the created weight distribution information and an example of the threshold determined based on the weight distribution information is shown in FIGS. 9A through 9C.

Figure 9A:
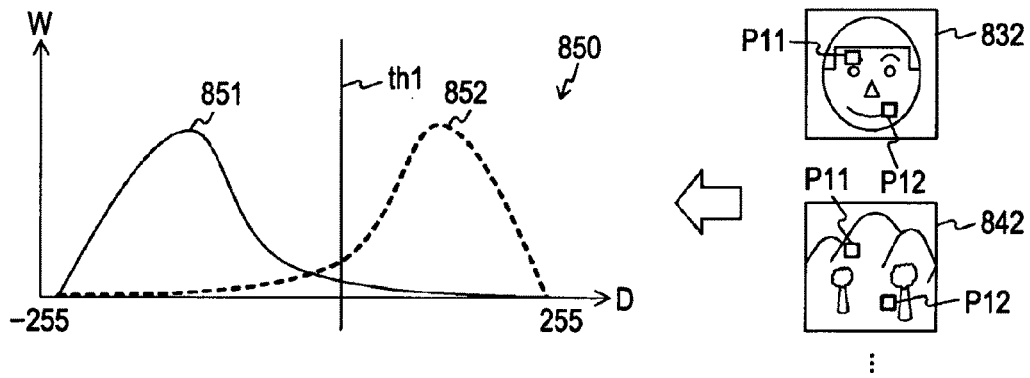
FIGS. 9A through 9C are drawings illustrating an overview of the relation between the weight distribution information created by the weight distribution information creating unit and a threshold determined by an optimal threshold determining unit according to the first embodiment of the present invention.
Figure 9B:
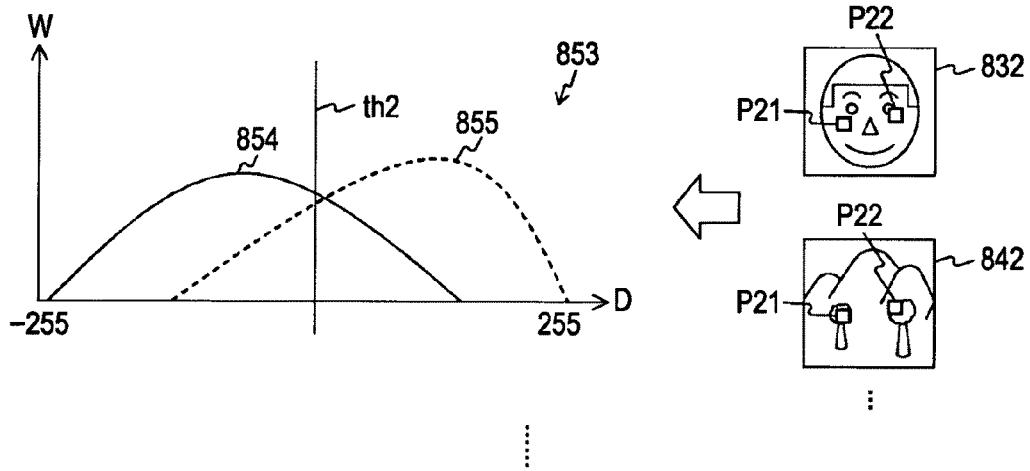
Figure 9C:
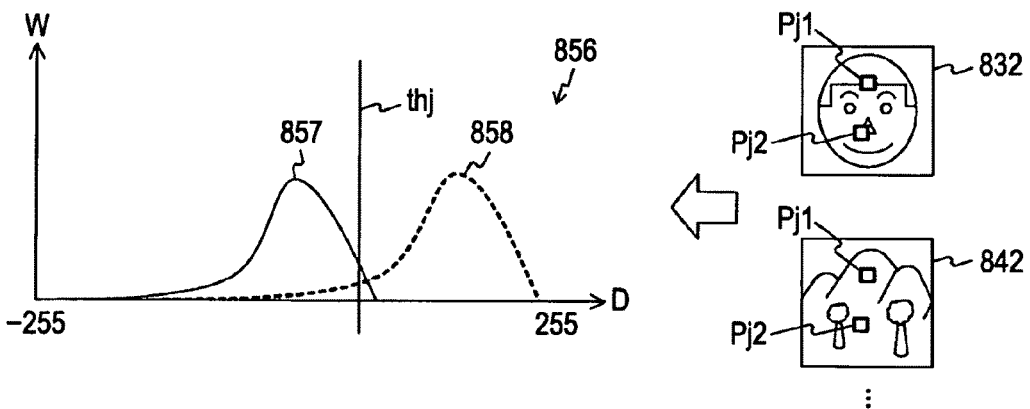

FIGS. 9A through 9C are drawings schematically showing the relation between the weight distribution information created by the weight distribution information creating unit 803 and the threshold determined by the optimal threshold determining unit 804. Also, FIGS. 9A through 9C show the weight distribution information and thresholds, as well as combinations of two points on the learning object images corresponding thereto. Note that in FIGS. 9A through 9C, of the learning object images included in the learning object font-facing face image group 830 and learning object non-face image group 840, only the learning object forward-facing face image 832 and learning object non-face image 842 are shown. Also, the combination of the two points on the learning object image and the relation between the weight distribution information and threshold as shown in FIG. 9A are similar to the relation shown in FIGS. 8A and 8B. Note that weight distribution curve 850 shown in FIG. 9A shows the weight distribution curve corresponding to the learning object non-face image with the curve 851, and the weight distribution curve corresponding to the learning object forward-facing face image with the curve 852.

FIG. 9B shows the relation between the weight distribution curve 853 created for the combination of two points (pixel positions P21 and P22) on the learning object image and the threshold th2 which is determined based on the weight distribution curve 853. Also, for the weight distribution curve 853, the weight distribution curve corresponding to the learning object non-face image is shown in the curve 854, and the weight distribution curve corresponding to the learning object forward-facing face image is shown in the curve 855.

FIG. 9C shows the relation between the weight distribution curve 856 created for the combination of two points (pixel positions Pj1 and Pj2) on the learning object image and the threshold thj which is determined based on the weight distribution curve 856. Also, for the weight distribution curve 856, the weight distribution curve corresponding to the learning object non-face image is shown in the curve 857, and the weight distribution curve corresponding to the learning object forward-facing face image is shown in the curve 858.

Thus, the optimal threshold determining unit 804 uses the weight distribution curve (weight distribution information) for each combination (pair) of two points on the learning object image to determine thresholds th1 through thj. Next, the weak hypothesis determining unit 805 determines a threshold wherein the value T1 computed using the above Expression 6 becomes minimal, out of the determined thresholds Th1 through thj. The weak hypothesis of the weight distribution information corresponding to the determined threshold is determined as the best weak hypothesis.

FIGS. 10A through 10C are drawings schematically showing a recording method to record the values corresponding to the weak hypothesis determined by the weak hypothesis determining unit 805, in the face detecting dictionary, according to the first embodiment of the present invention. FIG. 10A shows the weight distribution curve 860 corresponding to the threshold thr determined by the weak hypothesis determining unit 805 and a combination of two points (pixel positions Pr1 and Pr2) on the learning object image. Note that in FIG. 10A, the line showing the position of the threshold thr is shown as a bold line. Also, for the weight distribution curve 860, the curve corresponding to the learning object non-face image is shown with curve 861, and the curve corresponding to the learning object forward-facing image is shown with curve 862.

FIG. 10B shows the weighting computing unit 806 that computes two weightings for the threshold thr determined by the weak hypothesis determining unit 805. The weighting computing unit 806 computes a weighting h(x) (two weightings $h_H(x)$ and $h_L(x)$), using the following Expressions 7 and 8, based on the weight distribution sum totals $P_H^+$, $P_L^+$, $P_H^-$, and $P_L^-$, on both sides of the threshold thr of the weight distribution curve 860. Note that x as shown in Expressions 7 and 8 distinguishes the image to be detected.

$$h(x) \begin{cases} h_H(x) = \ln\sqrt{\dfrac{P_H^+}{P_H^-}} & \text{Expression 7} \\ h_L(x) = -\ln\sqrt{\dfrac{P_L^+}{P_L^-}} & \text{Expression 8} \end{cases}$$

FIG. 10C shows a model of an example wherein the values corresponding to the weak hypothesis determined by the weak hypothesis determining unit 805 are recorded in the face detecting dictionary 821. The face detecting dictionary 821 is sorted in the face detecting dictionary storage unit 820. Specifically, the value of the threshold thr determined by the weak hypothesis determining unit 805 is recorded in the threshold value (θ) 824 of the face detecting dictionary 821. Also, of the combination of two points (pixel positions Pr1 and Pr2) corresponding to the threshold thr, one of the points (pixel position Pr1) is recorded at a position 1 (u1, v1) 822 of the face detecting dictionary 821. Also, of the combination of two points (pixel positions Pr1 and Pr2) corresponding to the threshold thr, the other point (pixel position Pr2) is recorded at a position 2 (u2, v2) 823 of the face detecting dictionary 821. Now, for example, in the case that the upper left corner of the learning object image is the origin point, let us say that the positions in the horizontal direction of the learning object image are u1 and u2, and the positions in the vertical direction of the learning object image are v1 and v2. Also, the weighing h(x) (two weightings $h_H(x)$ and $h_L(x)$) computed for the threshold thr is recorded in the weighting (α) 825 of the face detecting dictionary 821. For example, the weighting $h_H(x)$ is recorded in (H) of the weighting (α) 825, and the weighting $h_L(x)$ is recorded in (L) of the weighting (α) 825. The various values herein are recorded by the recording control unit 808 in the face detecting dictionary 821.

Next, the weight updating unit 807 uses the following Expression 9 to compute a weight $W_i^{t+1}$ which is given to each learning object image, and updates the weight held in the weight holding unit 810. This updating is called a Boosting operation.

$$W_i^{t+1} = \dfrac{W_i^t \exp(-y_i h_t(x_i))}{\sum_{i=1}^{K} W_i^t \exp(-y_i h_t(x_i))} \quad \text{Expression 9}$$

Now, $W_i^t$ and $y_i$ are values (shown in FIGS. 6A and 6B) that are correlated to the learning object image $x_i$ serving as an object and held in the weight holding unit 810. Also, $H_t(x_i)$ is a value that is determined according to the difference value of the luminance of each learning object image computed for the combination of two points (image position Pr1 and Pr2) corresponding to the threshold thr determined by the weak hypothesis determining unit 805. Specifically, in the case that the difference value Pd of the luminance computed for the learning object image $x_i$ serving as an object is PD ≧ thr, the weighting $h_H(x_i)$ which is computed using Expression 7 is used as the $h_t(x_i)$. On the other hand, in the case that the difference value Pd of the luminance computed for the learning object image $x_i$ serving as an object is PD<thr, the weighting $h_L(x_i)$ which is computed using Expression 8 is used. Thus, for example, a learning object image distinguished differently, using the threshold determined by the weak hypothesis determining unit 805 as a standard, the weighting is made heavier, and can be more readily reflected with the following loop. Thus, the same value (1/K) is given as weight ($W_i^1$) to each learning object image immediately following input into the learning object image input unit 801, but the weight ($W_i^t$) for t=2 and thereafter is modified according to each learning object image.

Next, the above-described processing is repeated, until an expected number of loops is achieved, or until an expected accuracy is achieved. Thus, according to the first embodiment of the present invention, different weightings are computed according to above/below the threshold determined by the weak hypothesis determining unit 805. Therefore, detection can be made readily in face detecting processing even for images wherein distinguishing has been difficult with the related art, and face detecting accuracy can be improved.

Figure 11A:
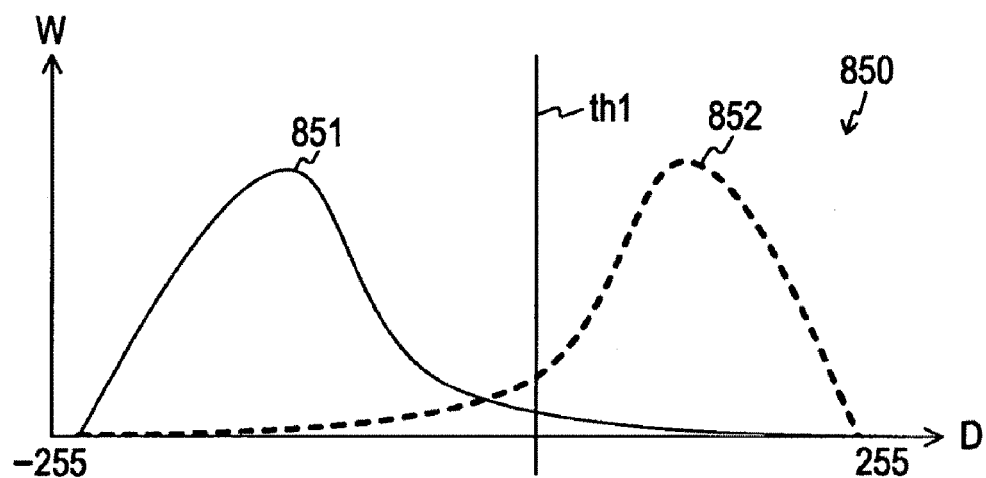
FIGS. 11A and 11B are drawings illustrating two weight distribution curves created for a combination of two points on a learning object image.
Figure 11B:
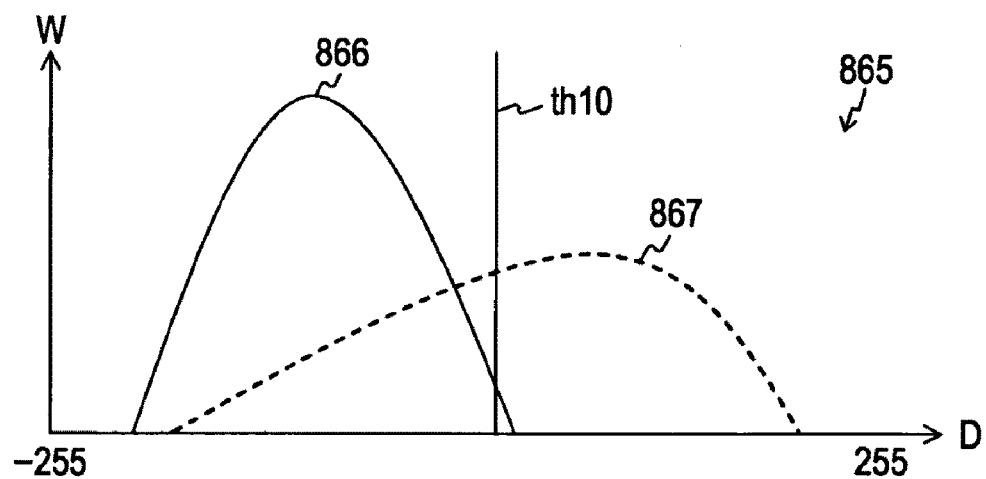

FIGS. 11A and 11B are drawings showing two weight distribution curves created regarding combinations of two points on the learning object images. The weight distribution curve 850 shown in FIG. 11A is similar to the weight distribution curve 850 shown in FIG. 9A. In this case, features of the curve corresponding to the learning object non-face image and the curve corresponding to the learning object forward-facing face image show above/below the threshold, whereby it is assumed that distinguishing between the two is comparatively clear.

The weight distribution curve 865 shown in FIG. 11B is an example of a weight distribution curve in the case that distinguishing a non-face or face at a threshold th10 or less is difficult, but at a threshold th10 or greater, distinguishing can be made comparatively clearly. For the weight distribution curve 865, the curve corresponding to the learning object non-face image is shown in the curve 866, and the curve corresponding to the learning object forward-facing face image is shown in the curve 867. That is to say, at or below the threshold th10, the weight distribution state of a non-face and face is mixed, whereby distinguishing is assumed to be difficult. However, at a threshold th10 or greater, there is almost no non-face weight distribution, and distribution of the face weight is the majority thereof, whereby distinguishing can be made comparatively clearly. Even in such a case, a face can be extremely effectively detected by using weighting that differs according to above/below of the threshold 10*th*. Thus, the weak hypothesis can be reduced, whereby face detecting processing can be performed quickly. Also, even in the case of reducing the weak hypothesis, face detecting accuracy can be increased.

In the case of using the face detecting dictionary 821 thus created to perform face detecting processing, the various information from t=1 through T included in the face detecting dictionary 821 is used to compute the final hypothesis H(x) from the following Expression 10 regarding the image x (24 pixels×24 pixels) to be detected. Depending on whether H(x)≧0 or H(x)<0, whether or not a face is included in the image x to be detected is determined.

$$H(x) = \sum_{t=1}^{T} h(x) \quad \text{Expression 10}$$

The flow in the case that the Expressions 7 and 8 are used to compute the final hypothesis H(x) shown in Expression 10, and face determining is performed will be shown below.

$$h(x) \begin{cases} h_H(x) = \ln\sqrt{\dfrac{P_H^+}{P_H^-}} & \text{Expression 7} \\ h_L(x) = -\ln\sqrt{\dfrac{P_L^+}{P_L^-}} & \text{Expression 8} \end{cases}$$

⇩

$$H(x) = \sum_{t=1}^{T} h(x) \quad \text{Expression 10}$$

For example, in the case of performing face detecting processing for the image x, luminance values for two points on the image x are extracted, corresponding to the position 1 (u1, v1) 822 and position 2 (u2, v2) 823 in the t'th row included in the face detecting dictionary 821. Next, the difference value of the luminance between the two points is computed, and this difference value and a value stored in the threshold (θ) 824 of the face detecting dictionary 821 are compared. For example, in the case that the difference value of the luminance between the two points is Dt, and the value stored in the threshold (θ) 824 is tht, if Dt≧tht, the value stored in (H) of the weighting (α) 825 (i.e. the weighting $h_H(x)$ shown in Expression 7) is selected. On the other hand, if Dt<tht, the value stored in the (L) of the weighting (α) 825 (i.e. the weighting $h_L(x)$ shown in Expression 8) is selected. For each weighting (α) 825 from t=1 through T, by sequentially adding the value (H or L) of the selecting weighting (α) 825, the final hypothesis H(x) is computed. In the case that H(x)<0, determination is made that a face is not included in the image x to be detected, and in the case that H(x)≧0, determination is made that a face is included in the image x to be detected. Note that the face determining processing will be described in detail with reference to FIGS. 22A through 25C.

Dictionary Creating Example to Detect Multiple Difference Objects

An example of creating a face detecting dictionary, using a leaning object forward-facing face image wherein the face of a person serving as an object is included and a learning object non-face image wherein the face of a person is not included, is shown above. However, by applying the above-described computing method, a dictionary for simultaneously performing detecting processing multiple different objects can be created. Specifically, in the case of performing detecting processing for multiple different objects, a dictionary can be created for simultaneously performing computing of evaluation values used in the event of determining whether or not these objects are included in the image, for each of the multiple different objects. That is to say, a dictionary can be created for performing determining processing simultaneously for multiple classes. An example of creating a face detecting dictionary for simultaneously performing detecting processing for a forward-facing face and left-facing side face, as multiple different objects, will be described below. Note that the functional configuration is similar to the functional configuration shown in FIG. 4, so the same reference numerals will be appended, description will be given primarily for the differing functions, and the other descriptions will be omitted.

Figure 12A:
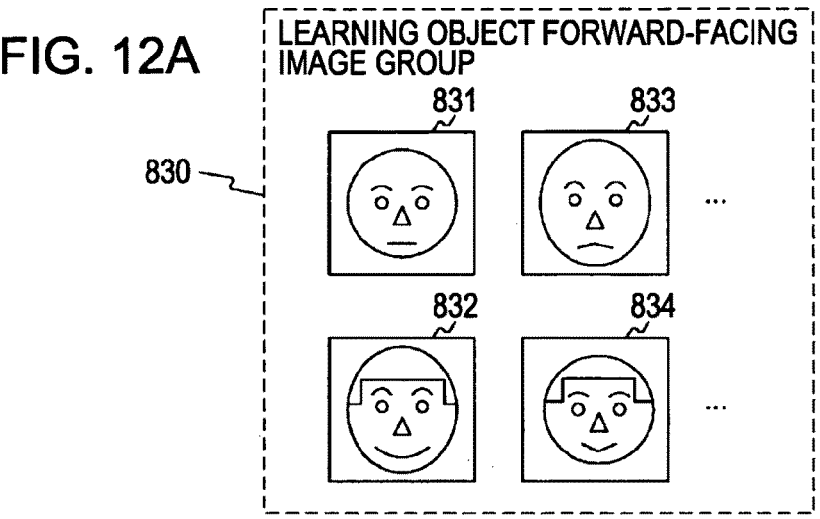
FIGS. 12A through 12C are drawings illustrating an example of the learning object image serving as an object of learning by the learning device according to the first embodiment of the present invention.
Figure 12B:
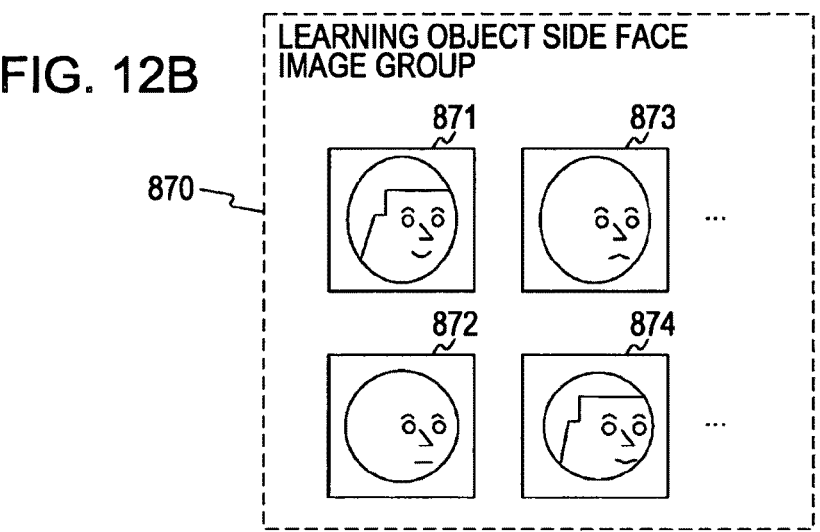
Figure 12C:
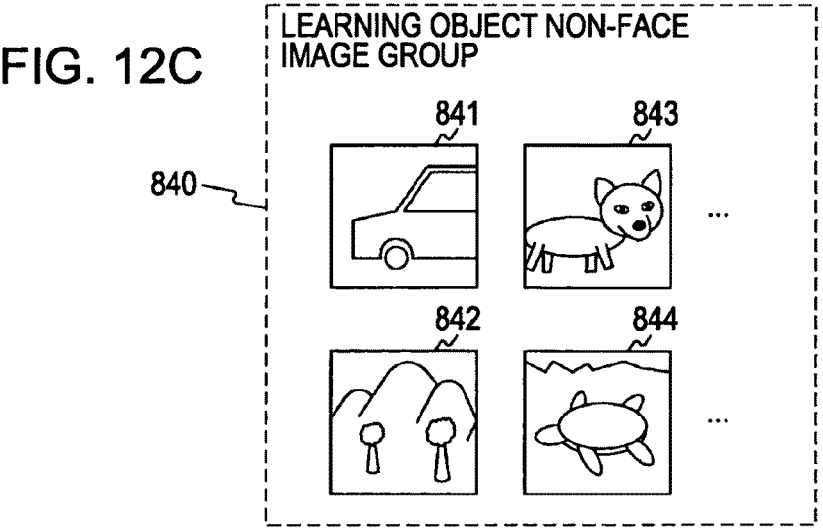

FIGS. 12A through 12C are drawings showing an example of a learning object image serving as a learning object by the learning device 800 according to the first embodiment of the present invention. FIG. 12A shows a learning object forward-facing image group 830 made up of multiple learning object forward-facing face images, and FIG. 12B shows a learning object side face image group 870 made up of multiple learning object side face images. Also, FIG. 12C shows a learning object non-face image group 840 made up of multiple learning object non-face images. Note that the learning object forward-facing image group 830 and learning object non-face image group 840 shown in FIGS. 12A and 12C are the same as the learning object forward-facing image group 830 and learning object non-face image group 840 shown in FIGS. 5A and 5B. Therefore, for these, the same reference numerals will be appended as in FIGS. 5A and 5B, and even in the example shown in FIGS. 12A through 12C, for ease of description the simplified image will be shown as a learning object image.

As with the learning object side face images 871 through 874 shown in FIG. 12B, for example a large number of sample images including the face (left-facing face) of a person are used as learning object side face images. Also, in this example, an example of using roughly 10,000 learning object forward-facing face images, roughly 10,000 learning object side face images, and roughly 100,000 learning object non-face images to create a face detecting dictionary will be described. These learning object images are sequentially input into the learning object image input unit 801, by type.

Figures 13A, 13B:
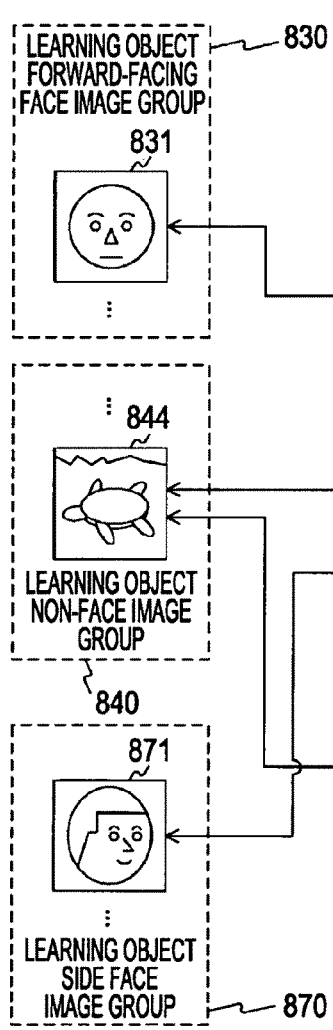
FIGS. 13A and 13B are drawings schematically illustrating the holding content of the weight holding unit according to the first embodiment of the present invention.

FIGS. 13A and 13B are drawings showing a model of the holding content of the weight holding unit 810 according to the first embodiment of the present invention. The various items held in the weight holding unit 810 shown in FIGS. 13A and 13B are the same as the weight holding unit 810 shown in FIGS. 6A and 6B, other than the points wherein class information 814 is added and weight is held by each class. Thus, where the configuration is similar to FIGS. 6A and 6B, the same reference numerals will be appended, description will be given primarily for the differing functions, and the other descriptions will be omitted. FIG. 13A shows a learning object image wherein a weight is held in the weight holding unit 810, and FIG. 13B shows the holding content of the weight holding unit 810 corresponding to the learning object image. Also, the correlation of FIGS. 13A and 13B are shown tied together with arrows. Note that a portion of the learning object image is shown in FIGS. 12A through 12C is shown as a learning object image included the learning object side face image group 870 and so forth, and the same reference numerals are appended for the same learning object images. Also, with this example, an example is described of a case that the number of images included in the learning object forward-facing face image group 830 and the number of images included in the learning object side face image group 870.

An $x_i$ (i is an integer satisfying 1≦i≦K) for distinguishing the learning object image is held in the learning object image distinguishing information ($x_i$) 811. The example shown in FIG. 13B shows a case wherein the total number of images included in the learning object forward-facing face image group 830 and learning object non-face image group 840 is K, and the total number of images included in the learning object side face image group 870 and learning object non-face image group 840 is K. For example, we can say that K=110,000. Also, for example, $x_1$ is correlated to the learning object side face image 871 and held in the learning object image distinguishing information $(x_i)$ 811.

As described above, a weight is held in the weight $(W_{i,cj}{}^t)$ 812 by each class. That is to say, as shown in FIG. 13B, a weight is held by each class of the various learning object images included in the learning object forward-facing face image group 830 and learning object non-face image group 840, and the various learning object images included in the learning object side face image group 870 and learning object non-face image group 840. Now, a common image will be used with each class for the various learning object images included in the learning object non-face image group 840, but the weight that is sequentially updated by the weight updating unit 807 becomes different values. Also, the same value (1/K) is given as weight $(W_{i,cj}{}^1)$ to each learning object image immediately following input into the learning object image input unit 801. Also, for example, $W_{1,c2}{}^t$ is correlated to the learning object side face image 871 and held in the weight $(W_{i,cj}{}^t)$ 812. Now, $c_j$ corresponds to the $c_j$ in the class information $(c_j)$ 814, and expresses a belonging class.

In the face image/non-face image identifying information $(y_i)$ 813, similar to the learning object forward-facing face image, "1" is held in the learning object side face image. For example, "1" is correlated to the learning object side face image 871 and held in the face image/non-face image identifying information $(y_i)$ 813.

The class information $(c_j)$ 814 is information for identifying a class, and for example, "$c_1$" is held in the learning object forward-facing face image, and "$c_2$" is held in the learning object side face image. Also, "$c_1$" is held in the weight of the learning object non-face image belonging to the class of learning object forward-facing face images, and "$c_2$" is held in the weight of the learning object non-face image belonging to the class of learning object side face images. For example, "$c_1$" is held in the weight of the learning object non-face image 844 belonging to the class of learning object forward-facing face images, and "$c_2$" is held in the weight of the learning object non-face image 844 belonging to the class of learning object side face images.

Figure 14A:
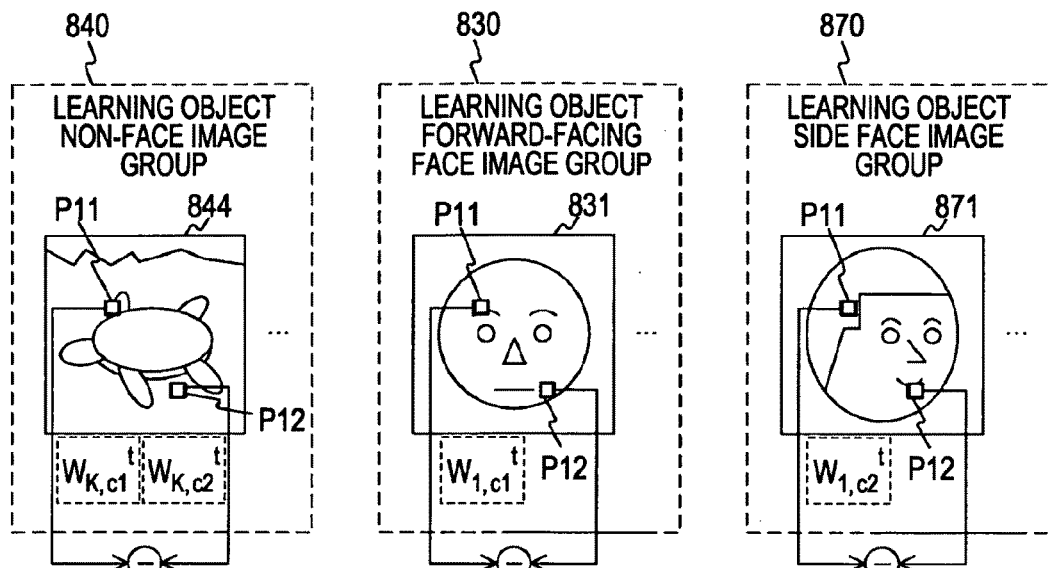
FIGS. 14A through 14C are drawings illustrating an overview of a creating method of weight distribution information by the weight distribution information creating unit according to the first embodiment of the present invention.
Figure 14B:
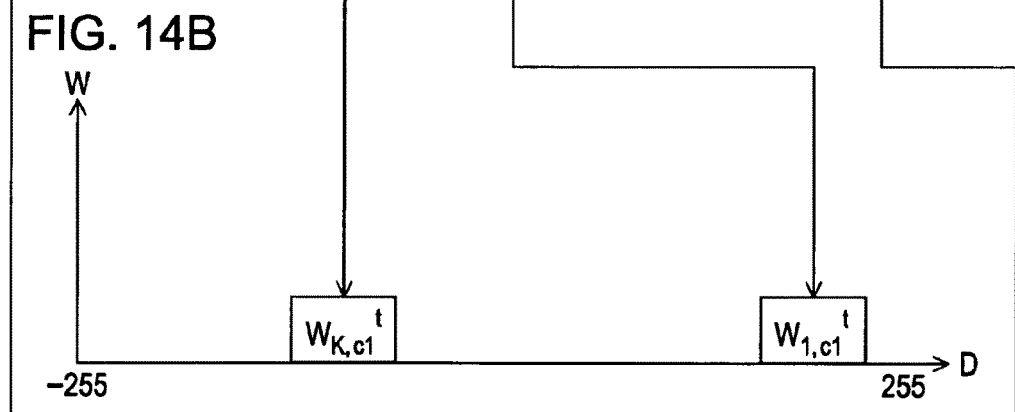
Figure 14C:
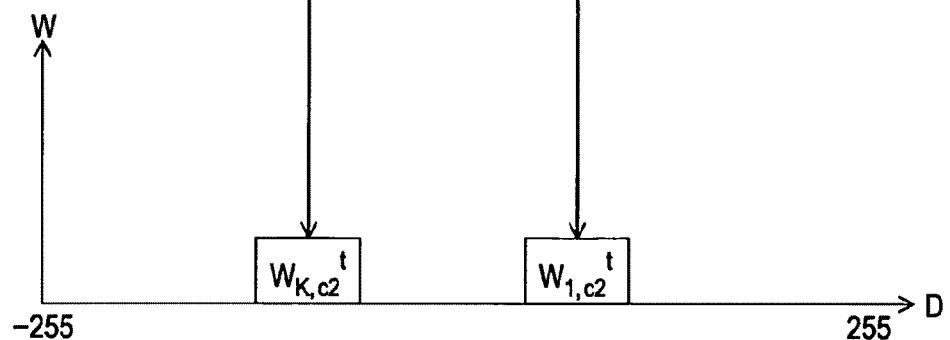

FIGS. 14A through 14C are drawings schematically showing a method for creating weight distribution information by the weight distribution creating unit 803, according to the first embodiment of the present invention. The example shown in FIGS. 14A through 14C is a modified example of FIGS. 7A and 7B, and other than creating the weight distribution information relating to the learning object forward-facing face image and learning object non-face image, differs from FIGS. 7A and 7B in the point of creating weight distribution information relating to the learning object side face image and learning object non-face image. Thus, wherein the configuration is similar, the same reference numerals will be appended and descriptions will be omitted, and descriptions will be given primarily for the portions differing from FIGS. 7A and 7B.

As shown in FIG. 14A, the computing method of the difference value of the luminance between the two points on each learning object image is similar to the case shown in FIG. 7A. Also, as shown in FIG. 14B, the creating method to create weight distribution information based on the difference value of the luminance between each learning object forward-facing face image and learning object non-face image is similar to the example shown in FIG. 7B.

The weight distribution information shown in FIG. 14C differs from the example shown in FIG. 7B in that the weight distribution information shown in FIG. 14C is weight distribution information relating to the learning object side face image and learning object non-face image. However, the creating method for the weight distribution information based on the difference value of the luminance between two points on each learning object side face image and learning object non-face image is similar to the example shown in FIG. 7B.

Specifically, the weight distribution information creating unit 803 adds the weight $(W_{i,cj}{}^t)$ that is correlated to the learning object image to which the difference value is computed and is held in the weight holding unit 810, to the level of the difference value computed by the luminance difference value computing unit 802. The adding processing is performed for each class. That is to say, the adding processing is performed for the weight distribution graph relating to the learning object forward-facing face image and learning object non-face image shown in FIG. 14B and the weight distribution graph relating to the learning object side face image and learning object non-face image shown in FIG. 14C. For example, as shown in FIG. 14B, the weight $(W_{i,c1}{}^t, W_{K,c1}{}^t)$ corresponding to each learning object image is added to the level of the difference values computed for the learning object forward-facing face image 831 and learning object non-face image 844. Also, as shown in FIG. 14C, the weight $(W_{1,c2}{}^t, W_{K,c2}{}^t)$ corresponding to each learning object image is added to the level of the difference value computed for the learning object side face image 871 and learning object non-face image 844. Thus, for the learning object non-face image adding processing is performed simultaneously for the weight distribution graph shown in FIG. 14B and the weight distribution graph shown in FIG. 14C. Also, similarly for the learning object image also, the weight $(W_{i,cj}{}^t)$ corresponding to each learning object image is sequentially added to the level of the computed difference value, and the weight distribution information is created. Also, for a combination (pair) of two other points on the learning object image, similarly, the weight $(W_i{}^t)$ correlated to each learning object image is sequentially added, and the weight distribution information is created. Thus, an example of the weight distribution information created for a combination of two points (pixel positions P11 and P12) on each learning object image is shown in FIGS. 15A and 15B.

Figure 15A:
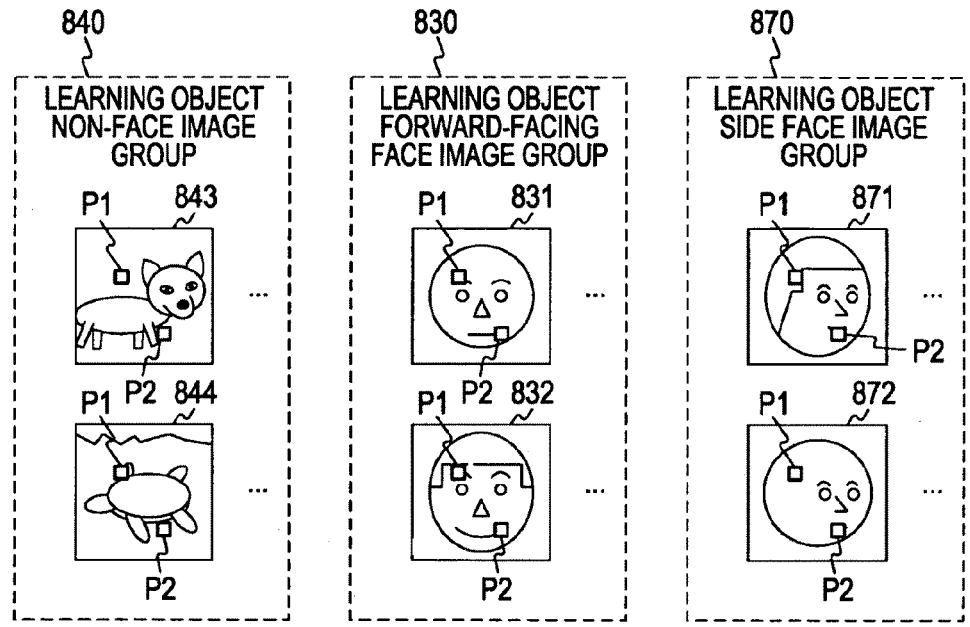
FIGS. 15A and 15B are drawings illustrating an overview of the relation between the weight distribution information created by the weight distribution information creating unit and a learning object image according to the first embodiment of the present invention.
Figure 15B:
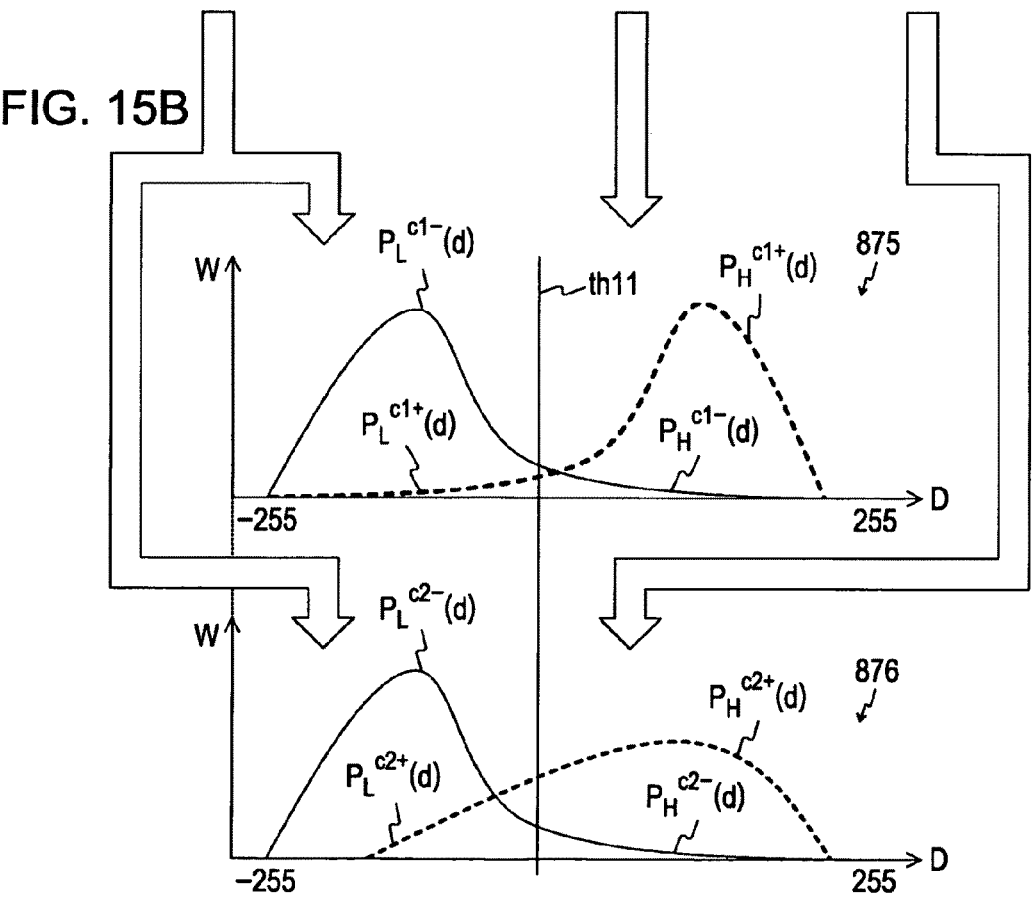

FIGS. 15A and 15B are drawings schematically showing the relation between the weight distribution information created by the weight distribution information creating unit 803 and the learning object image, according to the first embodiment of the present invention. The learning object images included in the learning object forward-facing face image group 830, learning object side face image group 870, and learning object non-face image group 840 is shown in FIG. 15A. The learning object images are similar to a portion in FIGS. 12A through 12C.

FIG. 15B shows the weight distribution curves (weight distribution information) 875 and 876 created for the combination of two points (pixel positions P11 and P12). As shown in FIG. 14B, the weight distribution curve 875 is a curve created by tying together the product values of the weight $(W_{i,c1}{}^t)$ for each sequentially added level, for each type of learning object image included in the learning object forward-facing face image group and learning object non-face image group. Also, as shown in FIG. 14C, the weight distribution curve 876 is a curve created by tying together the product values of the weight $(W_{i,c2}{}^t)$ for each sequentially added level, for each type of learning object image included in the learning object side face image group and learning object non-face image group. With these weight distribution curves, the characteristic weight distribution state according to the type of learning object image can be understood.

Also, with these distribution curves, independent weight distribution can be obtained for each of the forward-facing face images and non-face images, and left-facing side face images and non-face images. For example, with the weight distribution curve 875, let us say that the curve generated with a bell to the right side is a curve corresponding to forward-facing face images, and the curve generated with a bell to the left side is a curve corresponding to non-face images. Also, with the weight distribution curve 876, let us say that the curve generated with a bell to the right side is a curve corresponding to left-facing side face images, and the curve generated with a bell to the left side is a curve corresponding to non-face images. For example, of the weight distribution curves 875 and 876, in the case that the curve corresponding to the non-face image is t=1, the learning object images to be added are the same, and so are held in common. Also, for example, of the weight distribution curves 875 and 876, the curve corresponding to the forward-facing face image and the curve corresponding to the left-facing side face image have different learning object images to be added, and thereby are mutually different curves.

Now, a determining method of a threshold for distinguishing a forward-facing face, left-facing side face, and non-face will be described. For example, let us say that the values of the vertical axis of the weight distribution curve 875 and 876 shown in FIG. 15B is d (d is an integer satisfying −255≦d≦255), and the constant of the horizontal is th11 (th11 is an integer satisfying −255≦th11≦255). In this case, let us say that the value on the weight distribution curve of the learning object forward-facing face image of less than the constant th11 is $P_L^{c1+}(d)$, and the value on the weight distribution curve of the learning object forward-facing face image that is at or more than the constant th11 is $P_H^{c1+}(d)$. Also, the value on the weight distribution curve of the learning object side-facing face image of less than the constant th11 is $P_L^{c2+}(d)$, and the value on the weight distribution curve of the learning object side-facing face image that is at or more than the constant th11 is $P_H^{c2+}(d)$. Also, for a class ($c_1$), let us say that the value on the weight distribution curve of the learning object non-face image of less than the constant th11 is $P_L^{c1-}(d)$, and the value on the weight distribution curve of the learning object non-face image that is at or more than the constant th11 is $P_H^{c1-}(d)$. Also, for a class ($c_2$), let us say that the value on the weight distribution curve of the learning object non-face image of less than the constant th11 is $P_L^{c2-}(d)$, and the value on the weight distribution curve of the learning object non-face image that is at or more than the constant th11 is $P_H^{c2-}(d)$.

In this case, for each of the weight distribution curves 875 and 876, the optimal threshold determining unit 804 computes the sum total of the weight distribution on both sides of the constant th11. For example, for the weight distribution curve 875, the sum totals $P_H^{c1+}$, $P_L^{c1+}$, $P_H^{c1-}$, and $P_L^{c1-}$ are computed using the following Expressions 11 through 14.

$$P_H^{c1+} = \sum_{d=th11}^{255} P_H^{c1+}(d) \qquad \text{Expression 11}$$

$$P_L^{c1+} = \sum_{d=-255}^{th11} P_L^{c1+}(d) \qquad \text{Expression 12}$$

$$P_H^{c1-} = \sum_{d=th11}^{255} P_H^{c1-}(d) \qquad \text{Expression 13}$$

$$P_L^{c1-} = \sum_{d=-255}^{th11} P_L^{c1-}(d) \qquad \text{Expression 14}$$

Also, for example, for the weight distribution curve 876, the sum totals $P_H^{c2+}$, $P_L^{c2+}$, $P_H^{c2-}$, and $P_L^{c2-}$ are computed using the following Expressions 15 through 18.

$$P_H^{c2+} = \sum_{d=th11}^{255} P_H^{c2+}(d) \qquad \text{Expression 15}$$

$$P_L^{c2+} = \sum_{d=-255}^{th11} P_L^{c2+}(d) \qquad \text{Expression 16}$$

$$P_H^{c2-} = \sum_{d=th11}^{255} P_H^{c2-}(d) \qquad \text{Expression 17}$$

$$P_L^{c2-} = \sum_{d=-255}^{th11} P_L^{c2-}(d) \qquad \text{Expression 18}$$

Now, as described above, of the weight distribution curves 875 and 876, in the case of t=1, the curves corresponding to non-face images are the same, whereby the $P_H^{c1-}$ shown in Expression 13 and the $P_H^{c2-}$ shown in Expression 17 are the same value. Similarly, in the case of t=1, the $P_L^{c1-}$ shown in Expression 14 and the $P_L^{c2-}$ shown in Expression 18 are the same value.

Next, the optimal threshold determining unit 804 computes the value T11, using the computed weight distribution sum totals $P_H^{c1+}$, $P_L^{c1+}$, $P_H^{c1-}$, $P_L^{c1-}$, $P_H^{c2+}$, $P_L^{c2+}$, $P_H^{c2-}$, and $P_L^{c2-}$, using the following Expression 19.

$$T11 = \sqrt{(P_L^{c1+} \times P_L^{c1-})} + \sqrt{(P_H^{c1+} \times P_H^{c1-})} + \sqrt{(P_L^{c2+} \times P_L^{c2-})} + \sqrt{(P_H^{c2+} \times P_H^{c2-})} \qquad \text{Expression 19}$$

Next, the optimal threshold determining unit 804 determines the constant th11 wherein the computed value T11 is minimal is determined as the threshold th11 relating to the combination of two points (pixel positions P11 and P12) corresponding to the weight distribution curves 875 and 876 shown in FIG. 15B. Also, for other combinations (pairs) of two points on the learning object image, similarly, the threshold can be determined using the weight distribution curve (weight distribution information). Thus, for a combination of two points on each learning object image, the created weight distribution information and an example of the determined threshold based on this weight distribution information is shown in FIGS. 16A and 16B.

Figure 16A:
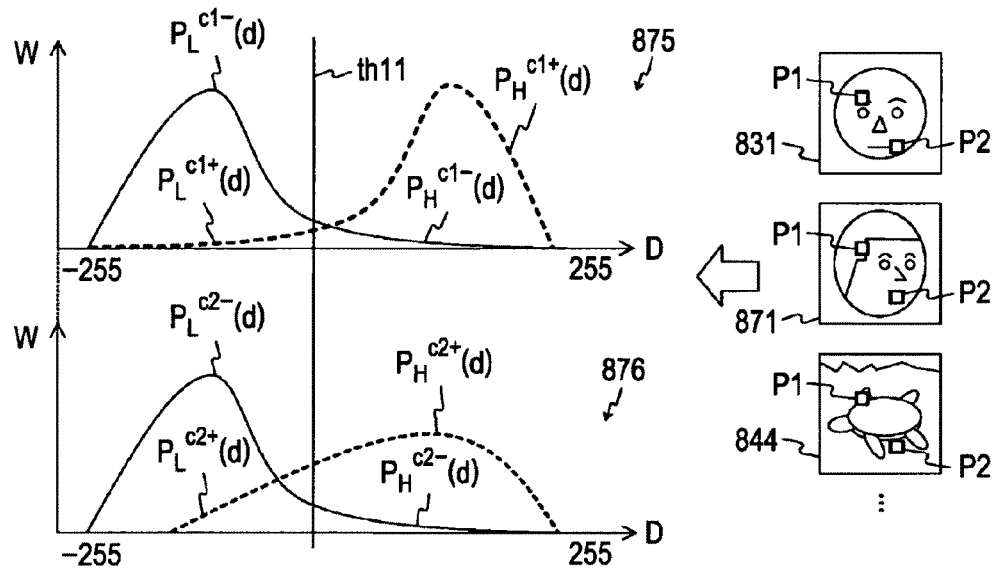
FIGS. 16A and 16B are drawings illustrating an overview of the relation between the weight distribution information created by the weight distribution information creating unit and a threshold determined by an optimal threshold determining unit according to the first embodiment of the present invention.
Figure 16B:
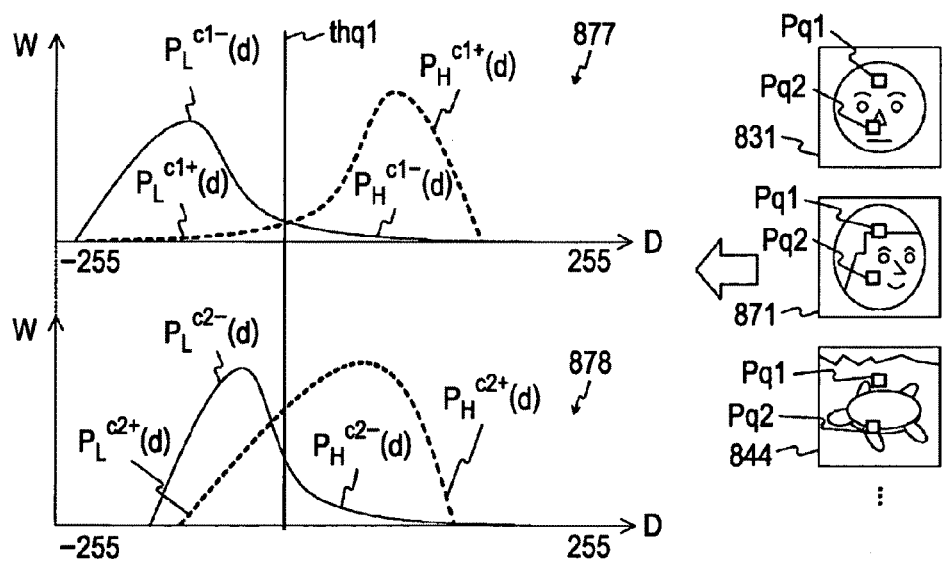

FIGS. 16A and 16B are drawings schematically showing the relation between the weight distribution information created by the weight distribution information creating unit 803 and the threshold determined by the optimal threshold determining unit 804 according to the first embodiment of the present invention. Also, FIGS. 16A and 16B show the weight distribution information and threshold, as well as a combination of two points on the learning object images corresponding thereto. Note that in FIGS. 16A and 16B, of the various learning object images included in the learning object forward-facing face image group 830, learning object side-face image group 870, and learning object non-face image group 840, only the learning object forward-facing face image 831, learning object side-face image 871, and learning object non-face image 844 are shown. Also, the relation between the combination of two points on the learning object image shown in FIG. 16A, the weight distribution information, and the threshold are similar to the relation shown in FIGS. 15A and 15B.

FIG. 16B shows the relation between the weight distribution curves 877 and 878 created for the combination of two points (pixel positions Pq1 and Pq2) on the learning object image and the threshold thq1 determined based on the weight distribution curves 877 and 878.

Thus, for each combination (pair) of two points on the learning object image, the optimal threshold determining unit 804 determines the thresholds th11 through thq1, using the weight distribution information. Next, the weak hypothesis determining unit 805 determines the threshold wherein the value T11 computed using the above Expression 19 is minimum, of the determined thresholds th11 through thq1. The weak hypothesis of the weight distribution information corresponding to the determined threshold is determined as the best weak hypothesis.

FIGS. 17A through 17C are drawings schematically showing a recording method to record the various values corresponding to the weak hypothesis determined by the weak hypothesis determining unit 805 in a face detecting dictionary, according to the first embodiment of the present invention. FIG. 17A shows weight distribution curves 880 and 881 that correspond to the threshold thr11 determined by the weak hypothesis determining unit 805, and a combination of two points (pixel positions Pr11 and Pr12) on the learning object image. Note that in FIG. 17A, the line showing the position of the threshold thr11 is a bold line. Also, for the weight distribution curve 880 (class: $c_1$), the curve corresponding to the learning object non-face image is shown with curve 882, and the curve corresponding to the learning object forward-facing face image is shown with curve 883. Also, for the weight distribution curve 881 (class: $c_2$), the curve corresponding to the learning object non-face image is shown with curve 884, and the curve corresponding to the learning object side-facing face image is shown with curve 885.

FIG. 17B shows a weighting computing unit 806 to compute four weightings regarding the threshold thr11 determined by the weak hypothesis determining unit 805. The weighting computing unit 806 computes a weighting $h(x, c_1)$ relating to a forward-facing face and a weighting $h(x, c_2)$ relating to a left-facing face, based on the sum totals of the weight distribution on both sides of the threshold thr11 of the weight distribution curves 880 and 881. The sum totals for each weight distribution on both sides of the threshold thr11 are $P_H^{c1+}$, $P_L^{c1+}$, $P_H^{c1-}$, $P_L^{c1-}$, $P_H^{c2+}$, $P_L^{c2+}$, $P_H^{c2-}$, and $P_L^{c2-}$. Also, the weighting $h(x, c_1)$ relating to a forward-facing face are two weightings $h_H(x, c_1)$ and $h_L(x, c_1)$, and the weighting $h(x, c_2)$ relating to a left-facing side face are two weightings $h_H(x, c_2)$ and $h_L(x, c_2)$. Specifically, the weighting $h(x, c_1)$ is computed using the following Expressions 20 and 21, based on the sum total of the weight distributions on both sides of the threshold thr11 of the weight distribution curve 880. Also, the weighting $h(x, c_2)$ is computed using the following Expressions 22 and 23, based on the sum total of the weight distributions on both sides of the threshold thr11 of the weight distribution curve 881. Note that x as shown in Expressions 20 through 23 is to distinguish the images to be detected.

$$h(x, c_1) \begin{cases} h_H(x, c_1) = \ln\sqrt{\dfrac{P_H^{c1+}}{P_H^{c1-}}} & \text{Expression 20} \\[6pt] h_L(x, c_1) = -\ln\sqrt{\dfrac{P_L^{c1+}}{P_L^{c1-}}} & \text{Expression 21} \end{cases}$$

$$h(x, c_2) \begin{cases} h_H(x, c_2) = \ln\sqrt{\dfrac{P_H^{c2+}}{P_H^{c2-}}} & \text{Expression 22} \\[6pt] h_L(x, c_2) = -\ln\sqrt{\dfrac{P_L^{c2+}}{P_L^{c2-}}} & \text{Expression 23} \end{cases}$$

FIG. 17C shows a model of an example wherein various values corresponding to the weak hypothesis determined by the weak hypothesis determining unit 805 are recorded in the face determining dictionary 826. The face determining dictionary 826 is stored in the face detecting dictionary storage unit 820. Specifically, the value of the threshold thr11 determined by the weak hypothesis determining unit 805 is recorded in the threshold value ($\theta$) 824 of the face detecting dictionary 826. Also, of the combination of two points (pixel positions Pr11 and Pr12) corresponding to the threshold thr11, one of the points (pixel position Pr11) is recorded in position 1 (u1, v1) 822 of the face detecting dictionary 826. Also, of the combination of two points (pixel positions Pr11 and Pr12) corresponding to the threshold thr11, the other point (pixel position Pr12) is recorded in position (u2, v2) 823 of the face detecting dictionary 826. Also, the weighting $h(x, c_1)$ and weighting $h(x, c_2)$ computed for the threshold thr11 are recorded in the weighting ($\alpha 1$ and $\alpha 2$) 827 of the face detecting dictionary 826. For example, $h_H(x, c_1)$ of the weighting $h(x, c_1)$ is recorded in (H) of the weighting ($\alpha 1$) 827, and $h_L(x, c_1)$ of the weighting $h(x, c_1)$ is recorded in (L) of the weighting ($\alpha 1$) 827. Also, $h_H(x, c_2)$ of the weighting $h(x, c_2)$ is recorded in (H) of the weighting ($\alpha 2$) 827, and $h_L(x, c_2)$ of the weighting $h(x, c_2)$ is recorded in (L) of the weighting ($\alpha 2$) 827. The various values herein are recorded in the face detecting dictionary 826 by the recording control unit 808.

Next, the weight updating unit 807 uses the following Expression 24 to compute a weight $W_{i,cj}^{t+1}$ weighted to each learning object image, and updates the weights held in the weight holding unit 810.

$$W_{i,cj}^{t+1} = \dfrac{W_{i,cj}^{t}\exp(-y_i h_t(x_i, c_j))}{\sum_{i=1}^{K} W_{i,cj}^{t}\exp(-y_i h_t(x_i, c_j))} \qquad \text{Expression 24}$$

Now, $W_{i,cj}^{t}$ and $y_i$ are values that are correlated to the learning object image $x_i$ and held in the weight holding unit 810 (shown in FIGS. 13A and 13B). Also, $h_t(x_i, c_i)$ is a value determined according to the different value of the luminance for each learning object image computed for the combination of two points (pixel positions Pr11 and Pr12) corresponding to the threshold thr11 determined by the weak hypothesis determining unit 805. Now, $c_i$ is correlated to the learning object image $x_i$ and expresses a class (shown in FIGS. 13A and 13B) that is held in the weight holding unit 810. Specifically, in the case that "$c_1$" is correlated to the learning object image $x_i$ and stored in the class information ($c_i$) 814 held in the weight holding unit 810, the weighting $h(x, c_1)$ for one of Expression 20 or 21 is used. Also, in the case that "$c_2$" is correlated to the learning object image $x_i$ and stored in the class information ($c_i$) 814 held in the weight holding unit 810, the weighting h(x, $c_2$) for one of Expression 22 or 23 is used. Now, let us say that the difference value of the luminance computed for a combination of two points (pixel position Pr11 and Pr12) in the learning object image $x_i$ is a difference value Pd. For example, in the case that the class information ($c_i$) 814 is "$c_1$", in the case that Pd≧thr11 holds, then $h_L(x, c_1)$ shown in Expression 20 is used. On the other hand, in the case that Pd<thr11 holds, then $h_L(x, c_1)$ shown in Expression 21 is used. Also, in the case that the class information ($c_i$) 814 is "$c_2$", in the case that Pd≧thr11 holds, then $h_H(x, c_2)$ shown in Expression 22 is used. On the other hand, in the case that Pd<thr11 holds, then $h_L(x, c_2)$ shown in Expression 23 is used. Thus, $h_t(x_i, c_i)$ is selected according to the difference value of the luminance. Thus, for example, for a learning object image that has been distinguished differently, using the threshold determined by the weak hypothesis determining unit 805 as a basis, the weight can be made heavier, and therefore can be more readily reflected with the following loop. Thus, the same value (1/K) is given as weight ($W_{i,cj}^t$) to each learning object image immediately following input into the learning object image input unit 801, but the weight ($W_{i,cj}^t$) for t=2 and thereafter is modified according to each learning object image.

Next, the above-described processing is repeated until an expected number of loops are achieved, or until an expected accuracy is achieved.

Thus, according to the first embodiment of the present invention, even in the case of two or more objects, different weightings can be computed according to the increase/decrease of the threshold determined by the weak hypothesis determining unit 805. Therefore, in the face detecting processing of simultaneously detecting multiple objects, detecting can be made readily even for images that are difficult to distinguish, and face detecting accuracy can be improved.

Also, in the example shown above, an example to create an object detecting dictionary for detecting two objects of a forward-facing face and left-facing side face is described. However, this example can be applied to create an object detecting dictionary for detecting three or more objects. In this case, the weightings h(x,$c_j$) of each class ($c_j$) can be computed using the following Expressions 25 and 26.

$$h(x, c_j) \begin{cases} h_H(x, c_j) = \ln \sqrt{\frac{P_H^{cj+}}{P_H^{cj-}}} & \text{Expression 25} \\ h_L(x, c_j) = -\ln \sqrt{\frac{P_L^{cj+}}{P_L^{cj-}}} & \text{Expression 26} \end{cases}$$

Also, in the example shown above, an example is described wherein the multiple objects are faces of persons facing different directions, but this example can be applied to a case of creating an object detecting dictionary relating to multiple objects of different types, such as dogs and cats, for example. Further, this example can be applied to a case of creating an attribute determining dictionary for determining attributes such as distinguishing male and female, or distinguishing age ranges.

In the case of using the face detecting dictionary 826 thus created to perform face detecting processing, a final hypothesis relating to two objects is computed for an image x (24 pixels×24 pixels) serving as a detecting object, using the various information of t=1 through T included in the face detecting dictionary 826. That is to say, using the following Expressions 27 and 28, a final hypothesis H(x, $c_1$) relating to the forward-facing side face and a final hypothesis H(x, $c_2$) relating to the left-facing side face are computed. Depending on whether H(x, $c_1$)≧0 or whether H(x, $c_1$)<0, determination is made as to whether or not a forward-facing face is included in the image x serving as detecting object. Also, depending on whether H(x, $c_2$)≧0 or whether H(x, $c_2$)<0, determination is made as to whether or not a left-facing face is included in the image x serving as detecting object. Note that the face determining herein will be described in detail with reference to FIGS. 22A through 25C.

$$H(x, c_1) = \sum_{t=1}^{T} h(x, c_1) \quad \text{Expression 27}$$

$$H(x, c_2) = \sum_{t=1}^{T} h(x, c_2) \quad \text{Expression 28}$$

Thus, according to the first embodiment of the present invention, determining processing relating to two different objects can be performed simultaneously using the same luminance difference value. Thus, face detecting processing can be performed quickly.

Operating Example of Learning Device

Next, operations of the learning device 800 according to the first embodiment of the present invention will be described with reference to the drawings.

Figure 18:
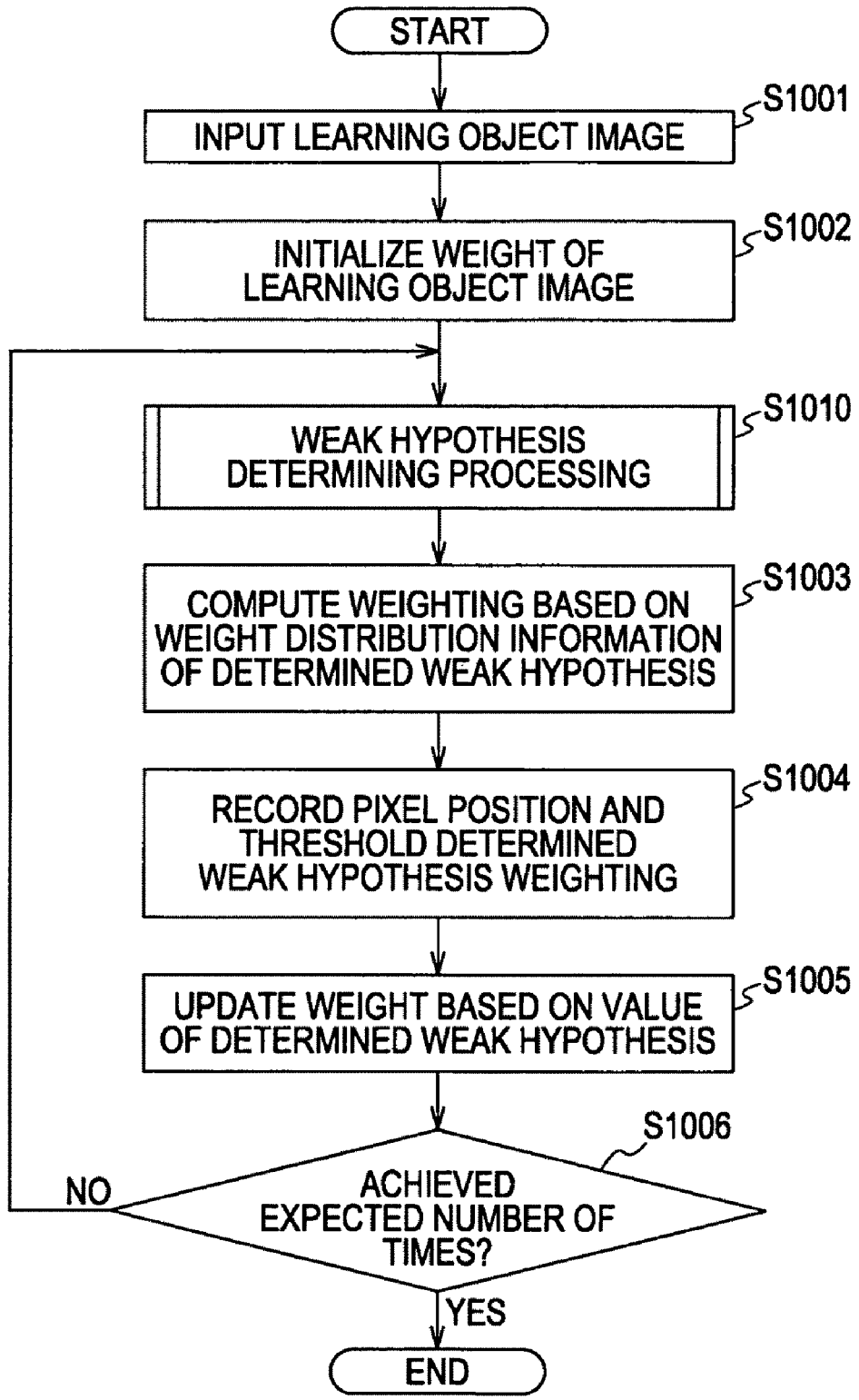
FIG. 18 is a flowchart describing processing procedures for object detecting dictionary creating processing by the learning device according to the first embodiment of the present invention.

FIG. 18 is a flowchart showing processing procedures for object detecting dictionary creating processing by the learning device 800, according to the first embodiment of the present invention. In this example, an example to create a face detecting dictionary for detecting a forward-facing face as an object will be described. Also with this example, an example wherein the object detecting dictionary creating processing is repeated until achieving an expected number of times will be described.

First, multiple learning object forward-facing face images and learning object non-face images are input in the learning object image input unit 801 (step S1001). Next, the weight updating unit 807 initializes the weight ($W_i^t$) weighted to each learning object image (step S1002). That is to say, the same value is weighted as weight ($W_i^t$) in each learning object image. Next, weak hypothesis determining processing is performed (step S1010). The weak hypothesis determining processing will be described in detail with reference to FIG. 19.

Next, the weighting computing unit 806 computes the weighting based on the weight distribution information corresponding to the determined best weak hypothesis (step S1003). Next, the recording control unit 808 records the combination of two points (pixel positions of two points) corresponding to the determined weak hypothesis, a threshold value, and weighting value in the face detecting dictionary (step S1004). Next, the weight updating unit 807 computes the weight $W_i^{t+1}$ to be weighted to each learning object image based on the determined weak hypothesis, and updates the weight held in the weight holding unit 810 (step S1005). Next, determination is made as to, whether or not expected number of times has been achieved (step S1006), and in the case the number of times has not been achieved (step S1006), the flow is returned to step S1010. On the other hand, in the case that the expected number of times has been achieved (step S1006), the operations of the object detecting dictionary creating processing is ended.

FIG. 19 is a flowchart showing the weak hypothesis determining processing procedures (processing procedures in step S1010 shown in FIG. 18) out of the processing procedures for the object detecting dictionary creating processing by the learning device 800, according to the first embodiment of the present invention.

First, the luminance difference value computing unit 802 selects one combination (pair) of two points of pixel positions on each learning object image (step S1011), and selects one learning object image serving as an object for weight adding (S1012). Next, the luminance difference value computing unit 802 extracts the luminance between two points on the selected learning object image (step S1013), and computes the difference value of the luminance of the extracted two points (step S1014). Next, the weight distribution information creating unit 803 adds the weight wherein the difference value is correlated to the computed learning object image and held in the weight holding unit 810, to the level of the computed difference value (step S1015). In the weight adding processing, weight is added by each type of learning object image, and the weight distribution information is created for each type of learning object image.

Next, for all of the learning object forward-facing face images and learning object non-face images input in the learning object image input unit 801, determination is made as to whether or not weight adding processing relating to the same two points (step S1016). In the case that weight adding processing relating to the same two points is not performed for all of the learning object forward-facing face images and learning object non-face images (step S1016), the flow is returned to step S1012. On the other hand, in the case weight adding processing relating to the same two points is performed (step S1016), the optimal threshold determining unit 804 uses the above-described Expression 6 to determine the optimal threshold for the created weight distribution information (step S1017).

Next, determination is made as to whether or not weight distribution information is created for all combinations of two points of the pixel positions on each learning object image (step S1018). In the case that weight distribution information is not created for all combinations of two points of the pixel positions (step S1018), the flow is returned to step S1011. On the other hand, in the case weight distribution information is created for all combinations of two points of the pixel positions (step S1018), the weak hypothesis determining unit 805 determines the best weak hypothesis based on the determined optimal threshold (step S1019).

Next, an example of providing various dictionaries that can be created by the learning device 800 to the imaging device 100 will be described in detail with reference to the drawings.
Configuration Example of Evaluation Value Computing Dictionary FIGS. 20A and 20B are drawings showing an example of an evaluation value computing dictionary for computing multiple evaluation values for the determining object image, according to the first embodiment of the present invention. FIG. 20A shows an object image group 600 including images 601 through 609 that express multiple objects for which evaluation values are to be computed. Now, according to the first embodiment of the present invention, an example of faces of persons facing various directions will be described as the multiple objects. That is to say, images 601 through 609 are images expressing the faces of persons facing various directions. For example, image 605 is an image including a face facing forward, images 601 through 604 and 606 through 609 are images including faces facing directions other than forward.

FIG. 20B shows an evaluation value computing dictionary 301 for computing various evaluation values corresponding to the images 601 through 609 shown in FIG. 20A simultaneously. The evaluation value computing dictionary 301 is determining information for performing evaluation value computing processing by the evaluation value computing unit 235 for a determining object image extracted by the image extracting unit 233 (e.g. vector-form weak hypothesis), and is stored in the evaluation value computing dictionary storage unit 300. Also the various values stored in the evaluation value computing dictionary 301 are created by the learning device 800, for example. Also, the evaluation value computing dictionary 301 is determining information holding data relating only to the determining standard, and does not hold the image itself. Therefore, storage capacity can be reduced, and determining processing can be performed quickly.

T sets of combinations of a position 1 (u1, v1) 302, position 2 (u2, v2) 303, threshold (θ) 304, and weightings (α1 through α9) 305 are stored in the evaluation value computing dictionary 301.

The position 1 (u1, v1) 302 and position 2 (u2, v2) 303 are positions of two points on the determining object image. Now, for example, in the case that the upper-left corner on the determining object image is an origin point, we can say that the positions in the horizontal direction on the determining object image are u1 and u2, and the positions in the vertical direction are v1 and v2.

The threshold (θ) 304 is a threshold value relating to the difference value between the luminance value of the position 1 (u1, v1) 302 and the luminance value of the position 2 (u2, v2) 303.

The weightings (α1 through α9) 305 are weightings α1 through α9 that are added based on the comparison results of the difference value between the luminance value of the position 1 (u1, v1) 302 and the luminance value of the position 2 (u2, v2) 303, and the threshold (θ) 304. The weightings α1 through α9 are values for computing the various evaluation values corresponding to the images 601 through 609 shown in FIG. 20A, and in FIGS. 20A and 20B the images 601 through 609 shown in FIG. 20B and the corresponding weightings α1 through α9 are shown tied together with arrows. Also, for each of the weightings α1 through α9, two different values (H and L) are stored.

Figure 21A:
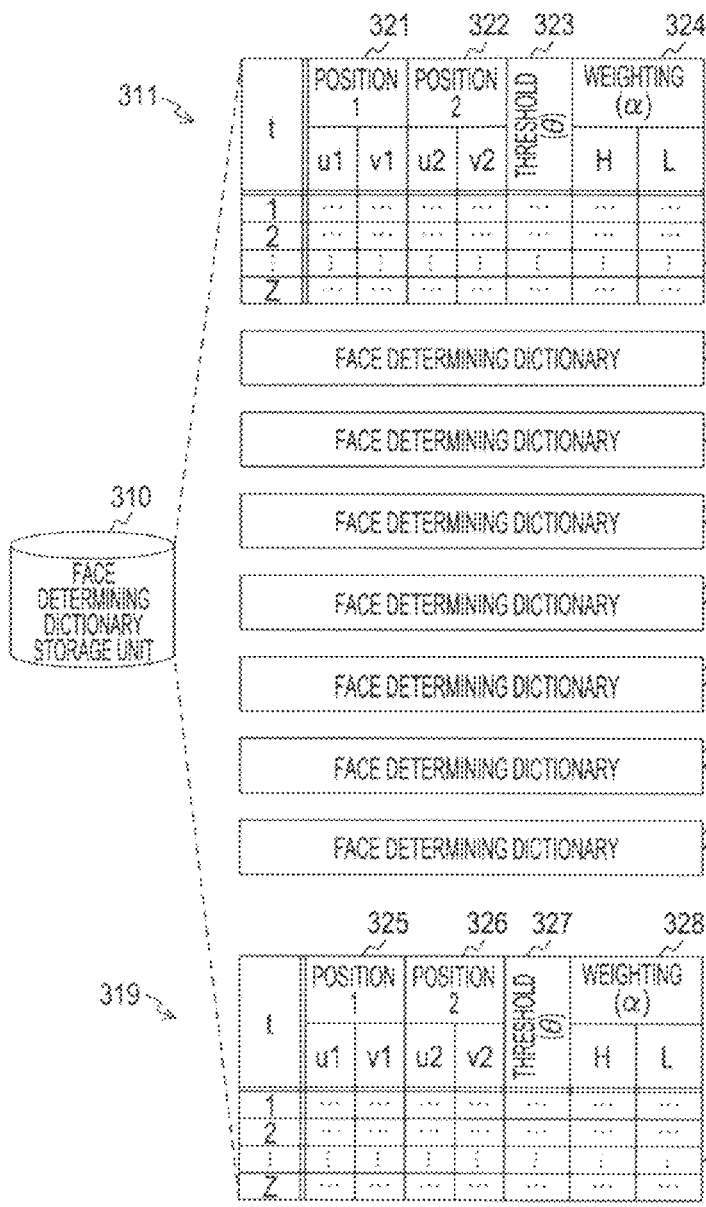
FIGS. 21A and 21B are drawings illustrating an example of the face determining dictionary for determining whether or not a face is included in the determining object image according to the first embodiment of the present invention.
Figure 21B:
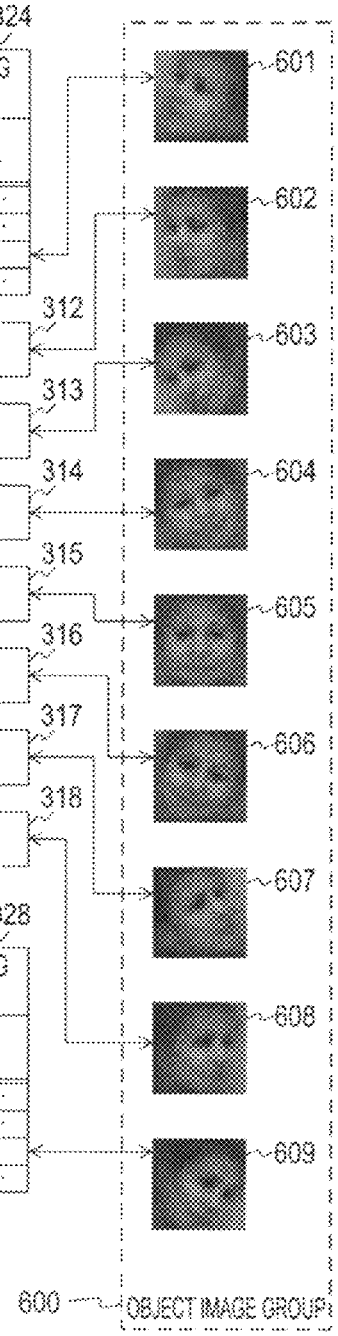

Now, the evaluation value computing dictionary 301 is to compute the evaluation values for narrowing down the objects to be subject to face determining processing by the face determining dictionary 311 through 319 shown in FIGS. 21A and 21B, and does not independently perform face detecting. Thus, the evaluation value computing dictionary 301 has conditions that are more relaxed than the computing accuracy of the evaluation values used for the face determining dictionaries 311 through 319. For example, in the case of creating an evaluation value computing dictionary 301, several thousands to several tens of thousands of sample images are used, whereby we can say that roughly T=100. Note that according to the first embodiment of the present invention, an example using common values as the threshold for each record is shown, but a threshold may be used which is modified according to each object (class). Also, for example, in the case of creating an evaluation value computing dictionary that simultaneously computes evaluation values relating to multiple objects, a case where the number of sample images used for the various objects greatly differs can be assumed. In this case, in the event of evaluation value computing processing, normalizing or adjustment operations or the like can be performed according to the number of sample images. Note that for the computing of the evaluation values performed using each value is described in detail with reference to FIGS. 23A and 23B and so forth.

Configuration Example of Face Determining Dictionary

FIGS. 21A and 21B are drawings showing an example of a face determining dictionary for determining whether or not a face is included in the determining object image, according to the first embodiment of the present invention. FIG. 21A shows face determining dictionaries 311 through 319 for computing the evaluation values corresponding to the images 601 through 609 shown in FIGS. 20A and 21B and performing face determining. The face determining dictionaries 311 through 319 are determining information (e.g. scalar-type weak hypothesis) for performing face determining processing by the face determining unit 237 for the determining object image extracted by the image extracting unit 233, and are stored in the face determining dictionary storage unit 310. Also, the various values stored in the face determining dictionaries 311 through 319 are created by the learning device 800, for example. Note that the face determining dictionaries 311 through 319 are determining information to hold data relating only to the determining standard, and do not hold the image itself. Therefore, the storage capacity can be reduced, while determining processing can be performed quickly. The face determining dictionaries 311 through 319 have different values for each item, but the format of each item is the same. Therefore, in FIG. 21A, only the storage content of the face determining dictionaries 311 and 319 are represented and shown, and the storage content for others are omitted from the drawing. Note that the images 601 through 609 shown in FIG. 21B are the same as the images 601 through 609 shown in FIG. 20A, and are images showing multiple objects to be determined. Also, in FIGS. 21A and 21B, the images 601 through 609 shown in FIG. 21B and the corresponding face determining dictionaries 311 through 319 are shown tied together with arrows.

Z sets of combinations of a position 1 (u1, v1) 321, position 2 (u2, v2) 322, threshold (θ) 323, and weighting (α) 324 are stored in the face determining dictionary 311. The position 1 (u1, v1) 321 and position 2 (u2, v2) 322 are positions of two points on the determining object image. The threshold (θ) 323 is a threshold value relating to the difference value between the luminance value of the position 1 (u1, v1) 321 and the luminance value of the position 2 (u2, v2) 322. The weighting (α) 324 is a weighting a that is added based on the comparison results of the difference value between the luminance value of the position 1 (u1, v1) 321 and the luminance value of the position 2 (u2, v2) 322, and the threshold (θ) 323. Also, two different values (H and L) are stored in the weighting (α) 324.

Now, the face determining dictionaries 311 through 319 have conditions that are stricter than the computing accuracy of the evaluation values using the evaluation value computing dictionary 301. For example, in the case of creating the face determining dictionaries 311 through 319, several tens of thousands of sample images are used, whereby we can say that roughly Z=2,000 to 3,000. Now, for example, in the case of creating a face determining dictionary to compute the evaluation values relating to multiple objects, a case where the number of sample images used for the various objects greatly differs can be assumed. In this case, in the event of evaluation value computing processing, normalizing or adjustment operations or the like can be performed according to the number of sample images. Also, for the computing of the evaluation values performed using each value is described in detail with reference to FIGS. 24A through 24D and so forth.

Detecting Example of Face Included in Image

Figure 22A:
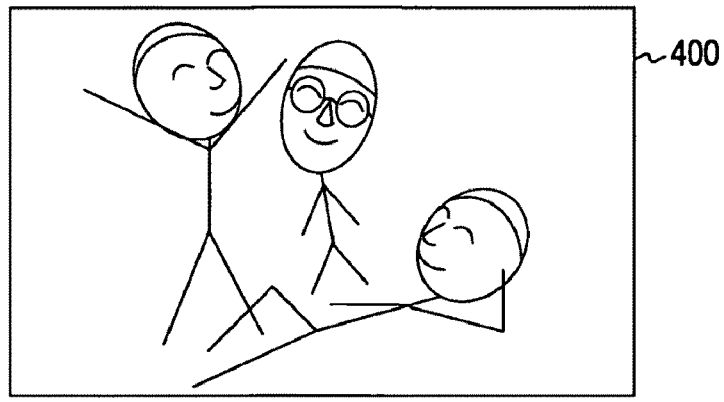
FIGS. 22A through 22D are drawings illustrating an overview of the image extracting method to extract the determining object image that is subjected to the face detecting processing by the face detecting unit according to the first embodiment of the present invention.
Figure 22B:
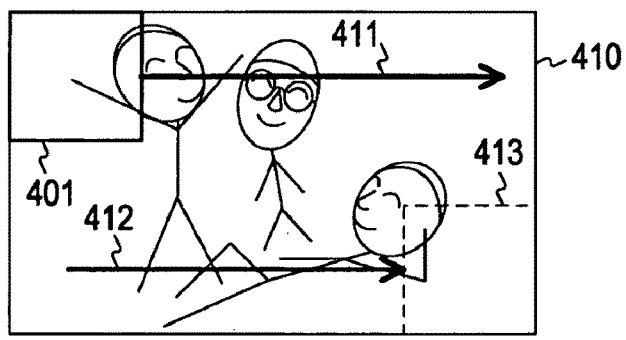
Figure 22C:
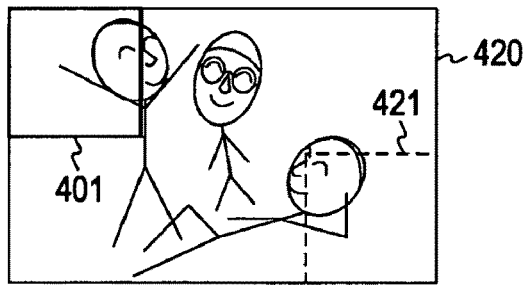
Figure 22D:
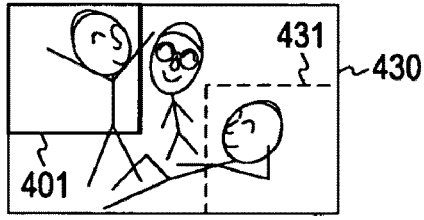

FIGS. 22A through 22D are drawings showing an overview of an image extracting method to extract a determining object image to be subjected to face detecting processing by the face detecting unit 230, according to the first embodiment of the present invention. FIG. 22A shows an imaging image 400 obtained by the image obtaining unit 231, and FIGS. 22B through 22D show images 410, 420, and 430 which result from the imaging image 400 being subjected to reduction processing by the image reducing unit 232. Note that the extracting of the determining object image is performed by the image extracting unit 233.

The imaging image 400 shown in FIG. 22A is an imaging image wherein three persons facing mutually different directions are the subject. In the case of extracting the determining object image from the imaging image 400, as shown in FIGS. 22B through 22D, the images 410, 420, and 430 of which the imaging image 400 has been sequentially reduced by the image reducing unit 232 are generated. For example, an extracting frame 401 is positioned on the upper-left corner of the image 410, and the image included within the extracting frame 401 is extracted. Next, the extracting frame is shifted by one pixel in the right direction (direction indicated by arrows 411 and 412), and the image included in the extracting frame is extracted. Similarly, the extracting frame is sequentially shifted in the right direction one pixel at a time, and the images included within the extracting frame are sequentially extracted. Upon the image included in the extracting frame at a position that is shifted to the right edge position of the image 410 being extracted, the extracting frame is shifted downward by one pixel and moved to the left edge of the image 410. Next, after the images included within the extracting frame immediately following moving to the left edge of the image 410, the extracting frame is sequentially shifted in the right direction one pixel at a time, and the images included within the extracting frame are sequentially extracted. Hereafter, the images included in the extracting frame are similarly sequentially extracted. Upon the extracting frame being shifted to the position 413 which is the right edge and bottom edge of the image 410, and upon the image included in the extracting frame at the position 413 being extracted, the extracting processing of the determining object image from the image 410 is ended.

Also, in the images 420 and 430 shown in FIGS. 22C and 22D, an example of positioning the extracting frame 401 in the first positioning position is shown, while showing the final positioning positions of the extracting frame 401 to be positions 421 and 431. Note that the movement of the extracting frame 401 from the first positioning position to the final positioning position is similar to the movement shown in FIG. 22B. Also, the size of the extracting frame 401 is constant, regardless of the same of image to be extracted. Image extracting processing is performed until the size of the image subjected to reduction processing by the image reducing unit 232 becomes smaller than the extracting frame 401. Note that the original image that is subject to reduction processing is an image of 320 pixels×240 pixels, for example. Also, the reduction processing performed by the image reducing unit 232 can be reduction processing to reduce the prior image by 0.83 times, for example.

Next, an example of performing evaluation value computing processing using the evaluation value computing dictionaries for the determining object image will be described in detail with reference to the drawings.

Figure 23A:
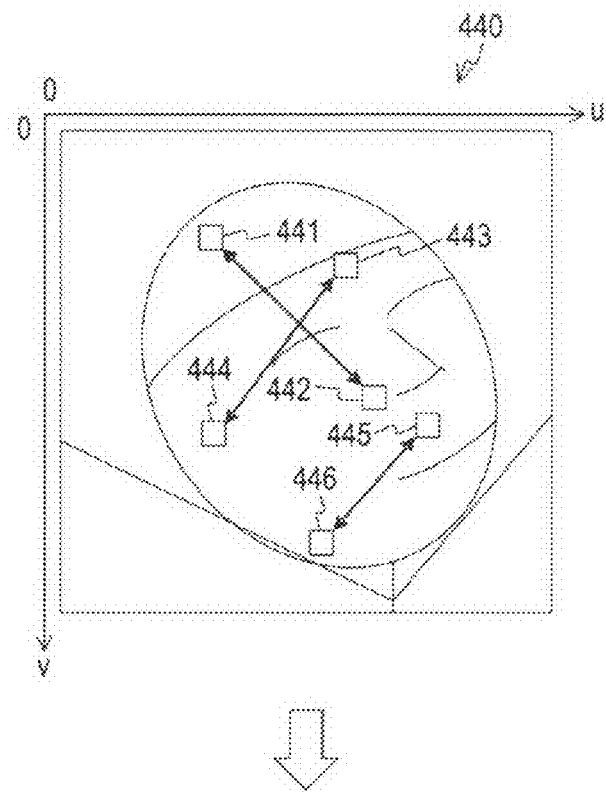
FIGS. 23A and 23B are drawings illustrating an example of the determining object image extracted from the image extracting unit and the evaluation value computed by the evaluation value computing unit for the determining object image, according to the first embodiment of the present invention.
Figure 23B:
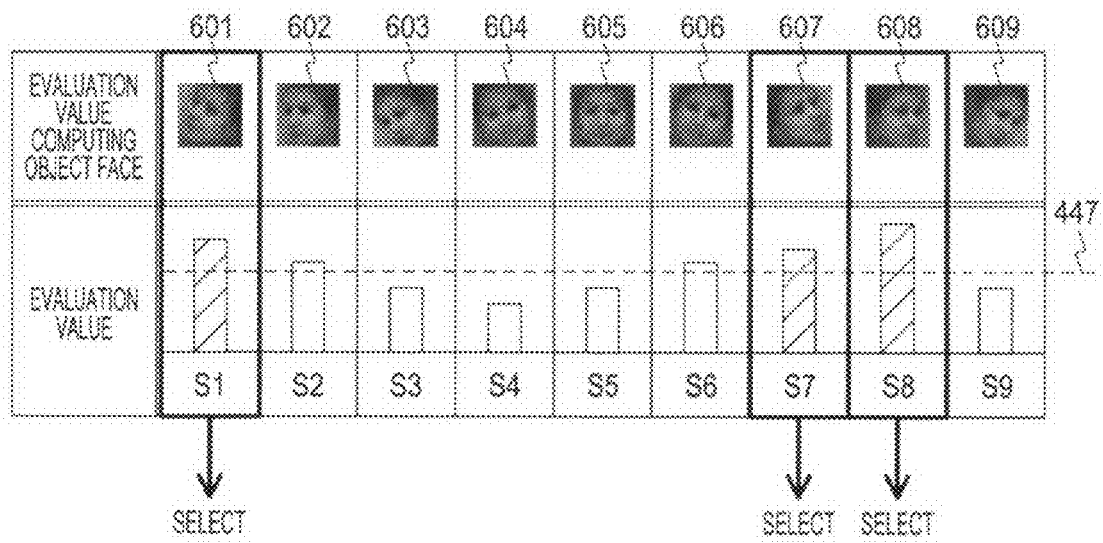

FIGS. 23A and 23B are drawings showing an example of the determining object image extracted by the image extracting unit 233 and the evaluation value computed by the evaluation value computing unit 235 regarding the determining object image, according to the first embodiment of the present invention. FIG. 23A shows a determining object image 440 as an example of the determining object image. Also, in the example shown in FIG. 23A, description is given with an example in the case of subjecting the determining object image 440 to evaluation value computing processing, wherein the upper-left corner of the determining object image 440 is the origin point, the horizontal axis is the u-axis, and the vertical axis is the v-axis.

For example, let us say that the position of the determining object image 440 corresponding to the value of the position 1 (u1, v1) 302 stored in the first row of the evaluation value computing dictionary 301 shown in FIG. 20B is position 441, and the position of the determining object image 440 corresponding to the value of the position 2 (u2, v2) 303 is position 442. Also, let us say that the position of the determining object image 440 corresponding to the value of the position 1 (u1, v1) 302 stored in the second row of the evaluation value computing dictionary 301 is position 443, and the position of the determining object image 440 corresponding to the value of the position 2 (u2, v2) 303 is position 444. Further, let us say that the position of the determining object image 440 corresponding to the value of the position 1 (u1, v1) 302 stored in the third row of the evaluation value computing dictionary 301 is position 445, and the position of the determining object image 440 corresponding to the value of the position 2 (u2, v2) 303 is position 446.

First, the value of scores S1 through S9 that show the evaluation value is set to 0, and calculations using each value stored in the first row of the evaluation value computing dictionary 301 is performed. Specifically, the luminance value A(1) at the position 441 corresponding to the value of the position 1 (u1, v1) 302, and the luminance value B(1) at the position 442 corresponding to the value of the position 2 (u2, v2) 303, stored in the first row of the evaluation value computing dictionary 301, are extracted. Using the following Expression, the difference value C(1) of each extracted luminance value is computed.

$$C(1)=A(1)-B(1)$$

Next, the difference value C(1) of each computed luminance value and the threshold value $\theta(1)$ of the threshold value ($\theta$) 304 stored in the first row of the evaluation value computing dictionary 301 are compared, and determination is made as to whether the computed difference value C(1) is smaller than that of the threshold value $\theta(1)$. In the case that computed difference value C(1) is smaller than that of the threshold value $\theta(1)$, the various values of L in the weighting ($\alpha 1$ through $\alpha 9$) 305 stored in the first row of the evaluation value dictionary 301 are sequentially added to the corresponding scores S1 through S9. Specifically, the value of weighting $\alpha 1(L)$ is added to the score S1, the value of weighting $\alpha 2(L)$ is added to the score S2, and the value of weighting $\alpha 3(L)$ is added to the score S3. Also, the value of weighting $\alpha 4(L)$ is added to the score S4, the value of weighting $\alpha 5(L)$ is added to the score S5, and the value of weighting $\alpha 6(L)$ is added to the score S6. Also, the value of weighting $\alpha 7(L)$ is added to the score S7, the value of weighting $\alpha 8(L)$ is added to the score S8, and the value of weighting $\alpha 9(L)$ is added to the score S9.

On the other hand, in the case that the computed difference value C(1) is greater than the threshold value $\theta(1)$, the various values of H in the weighting ($\alpha 1$ through $\alpha 9$) 305 stored in the first row of the evaluation value dictionary 301 are sequentially added to the corresponding scores S1 through S9. Specifically, the value of weighting $\alpha 1(H)$ is added to the score S1, the value of weighting $\alpha 2(H)$ is added to the score S2, and the value of weighting $\alpha 3(H)$ is added to the score S3. Also, the value of weighting $\alpha 4(H)$ is added to the score S4, the value of weighting $\alpha 5(H)$ is added to the score S5, and the value of weighting $\alpha 6(H)$ is added to the score S6. Also, the value of weighting $\alpha 7(H)$ is added to the score S7, the value of weighting $\alpha 8(H)$ is added to the score S8, and the value of weighting $\alpha 9(H)$ is added to the score S9.

Next, using the various values stored in the second row of the evaluation value computing dictionary 301, the above-described calculations are repeated. Specifically, the luminance value A(2) at the position 443 corresponding to the value of the position 1 (u1, v1) 302, and the luminance value B(2) at the position 444 corresponding to the value of the position 2 (u2, v2), stored in the second row of the evaluation value computing dictionary 301, are extracted. Using the following Expression, the difference value C(2) of each extracted luminance value is computed.

$$C(2)=A(2)-B(2)$$

Next, the difference value C(2) of each computed luminance value and the threshold value $\theta(2)$ of the threshold value ($\theta$) 304 stored in the second row of the evaluation value computing dictionary 301 are compared, and determination is made as to whether the computed difference value C(2) is smaller than that of the threshold value $\theta(2)$. In the case that computed difference value C(2) is smaller than that of the threshold value $\theta(2)$, the various values of L in the weighting ($\alpha 1$ through $\alpha 9$) 305 stored in the second row of the evaluation value dictionary 301 are sequentially added to the corresponding scores S1 through S9. On the other hand, in the case that the computed difference value C(2) is greater than the threshold value $\theta(2)$, the various values of H in the weighting ($\alpha 1$ through $\alpha 9$) 305 stored in the second row of the evaluation value dictionary 301 are sequentially added to the corresponding scores S1 through S9. Next, sequentially using the various values stored in the third row and thereafter to the T'th row of the evaluation value computing dictionary 301, the above-described calculations are repeated.

That is to say, in the case of performing evaluation value computing processing using the evaluation value computing dictionary 301 for the determining object image 440, the evaluation value computing unit 235 sequentially uses the various values stored in the first row through the T-th row of the evaluation value computing dictionary 301, and computes C(i) using Expression 29. Determination is made as to whether or not the computed C(i) satisfies the Expression 30. The variable i is an integer, and indicates values of 1 through T.

$$C(i)=A(i)-B(i) \qquad \text{Expression 29}$$

$$C(i)<\theta(i) \qquad \text{Expression 30}$$

In the case that the computed C(i) satisfies the Expression 30, the evaluation value computing unit 235 adds the various values of $\alpha 1L(i)$ through $\alpha 9L(i)$ to the corresponding scores S1 through S9. On the other hand, in the case that the computed C(i) does not satisfy the Expression 30, the evaluation value computing unit 235 adds the various values of $\alpha 1H(i)$ through $\alpha 9H(i)$ to the corresponding scores S1 through S9. A(i) expresses the luminance value corresponding to the position 1 (u1, v1) 302 stored in the i'th row, and B(i) expresses the luminance value corresponding to the position 2 (u2, v2) 303 stored in the i'th row. Also, $\theta(i)$ expresses the value of the threshold ($\theta$) 304 stored in the i'th row. Also, $\alpha 1H(i)$ through $\alpha 9H(i)$ express the various values of H in the weighting ($\alpha 1$ through α9) 305, and α1L(i) through α9L(i) express the various values of L in the weighting (α1 through α9) 305.

The scores (evaluation values) S1 through S9 after ending the various calculations using the various values stored in the first through T'th row of the evaluation value computing dictionary 301 can be expressed with the following Expression 31.

$$Sj = \sum_{i=1}^{T} h(x_i, c_j) \qquad \text{Expression 31}$$

In the case that C(i)≧θ(i) holds, h(xi, ci) expresses the αjH(i) computed in Expression 25, and in the case that C(i) <θ(i) holds, expresses the αjL(i) computed in Expression 26. Also, j=1 through 9.

FIG. 23B shows the relation between the images 601 through 609 expressing faces that are subject to computation of an evaluation value, and the evaluation values S1 through S9 computed by the evaluation value computing unit 235 regarding the determining object image 440. As shown in FIG. 23B, upon the various calculations ending that use the various values stored in the T'th row of the evaluation value computing dictionary 301, nine evaluation values S1 through S9 are computed. Note that in FIG. 23B, the size of the evaluation values S1 through S9 are expressed as a model with a bar graph.

Thus, the evaluation values S1 through S9 computed by the evaluation value computing unit 235 are output to the selecting unit 236. The selecting unit 236 extracts the evaluation value of at or greater than the threshold 447, out of the evaluation values S1 through S9. For example, of the evaluation values S1 through S9 as shown in FIG. 23B, the evaluation values S1, S2, S6, and S8 corresponding to the images 601, 602, 606, and 608 are extracted. Next, the selecting unit 236 selects three evaluation values having the highest values out of the extracted evaluation values, and outputs the information (selection object information) relating to an object corresponding to the selected evaluation value to the face determining unit 237. For example, of the extracted evaluation values S1, S2, S6, and S8, the evaluation values S1, S7, and S8 are selected as the three evaluation values having the highest values. In FIG. 23B, the bar graphs showing the selected evaluation values S1, S7, and S8 are shown as hatched areas. Next, the selection object information corresponding to the evaluation values S1, S7, and S8 is output to the face determining unit 237.

Note that in the case that an evaluation value of at or greater than the threshold 447 out of the evaluation values S1 through S9, the selecting unit 236 outputs information to the extent to the face determining unit 237. Also, in the case that only 1 or 2 evaluation values exist of at or greater than the threshold 447, the selection unit 236 outputs selecting object information corresponding to the 1 or 2 evaluation values to the face determining unit 237. For example, 0 can be used as the threshold 447. Also, so as to have a comparatively low reliability, a value of less than 0 can be used, or another value can be used.

Next, an example of performing face determining processing using the face determining dictionary for the determining object image will be described in detail with reference to the drawings.

FIGS. 24A through 24D are drawings showing an example of the determining object image extracted from the image extracting unit 233 and the evaluation values computed by the face determining unit 237 for the determining object image, according to the first embodiment of the present invention. FIG. 24A shows the determining object image 440 as an example of a determining object image. Note that the determining object image 440 is the same as the determining object image 440 shown in FIG. 23A. Also, in this example, the example will be described as a case of setting a two-dimensional grid for the determining object image 440, similar to the example shown in FIG. 23A, and performing face determining processing.

First, the face determining unit 237 obtains the face determining dictionary for determining an object corresponding to the evaluation value selected by the selecting unit 236 from the face determining dictionary storage unit 310, and holds this in the face determining dictionary memory 239. For example, as shown in FIG. 23B, in the case that the evaluation values S1, S7, and S8 are selected by the selecting unit 236, the face determining dictionary 311, 317, and 318 corresponding to the evaluation values S1, S7, and S8 are obtained, and held in the face determining dictionary memory 239. Next, the face determining unit 237 sequentially computes the evaluation value relating to each face determining dictionary, using the various face determining dictionaries held in the face determining dictionary memory 239. Note that the computing of the evaluation values using the face determining dictionary by the face determining unit 237 is similar to the computing of evaluation values using the evaluation value computing dictionary by the evaluation value computing unit 235, except that the number of weighting (α) is different.

For example, the luminance value A(i) corresponding to the position 1 (u1, v1) 321 stored in the i'th row of the face determining dictionary 311 is expressed as A(i), the luminance value B(i) corresponding to the position 2 (u2, v2) 321 is expressed as B(i), and the difference value between the luminance value A(i) and luminance value B(i) is expressed as C(i). Also, the value of the threshold (θ) stored in the i'th row of the face determining dictionary 311 is expressed as threshold θ(i), the H value of the weighting (α) 324 stored in the i'th row is expressed as αH(i), and the L value of the weighting (α) 324 stored in the i'th row is expressed as αL(i).

For example, in the case of performing evaluation value computing processing using the face determining dictionary 311 for the determining object image 440, 0 is set as the value of the score S shown in the evaluation value.

The face determining unit 237 sequentially uses the various values stored in the first row through Z'th row of the face determining dictionary 311, and computes C(i) using Expression 32. Next, determination is made as to whether or not the computed C(i) satisfies the Expression 33. The variable i is an integer, and shows the values from 1 through Z.

$$C(i) = A(i) - B(i) \qquad \text{Expression 32}$$

$$C(i) < \theta(i) \qquad \text{Expression 33}$$

In the case that the computed C(i) satisfies the Expression 33, the face determining unit 237 adds the value of αL(i) to the score S. On the other hand, in the case that the computed C(i) does not satisfy the Expression 33, the face determining unit 237 adds the value of αH(i) to the score S.

The score (evaluation value) S after ending the various calculations using the various values stored in the first through Z'th rows of the face determining dictionary 311 can be expressed by the following Expression 34.

$$S = \sum_{i=1}^{T} h(x_i)$$ Expression 34

In the case that C(i)≧θi holds, h($x_i$) expresses the αH(i) computed with Expression 7, and in the case that C(i)<θi holds, h($x_i$) expresses the αL(i) computed with Expression 8. Note that for the other face determining dictionaries 312 through 319, the scores (evaluation values) S can be computed similarly. Note that in FIGS. 24A through 25C, the various evaluation values computing using the face determining dictionaries 311 through 319 are shown as evaluation values SS1 through SS9.

FIG. 24B shows the relation between the images 601, 607, 608 that express the faces subject to evaluation computing, and the evaluation values SS1, SS7, and SS8 computed for the determining object image 440 by the face determining unit 237. As shown in FIG. 24B, upon the various calculations using the various values stored in the Z'th row of the face determining dictionary 311 ending, one evaluation value SS1 is computed. Similarly, upon the various calculations using the various values stored in the Z'th row of the face determining dictionary 317 ending, one evaluation value SS7 is computed, and upon the various calculations using the various values stored in the Z'th row of the face determining dictionary 318 ending, one evaluation value SS8 is computed. Note that in FIG. 24B, the size of the evaluation values SS1, SS7, and SS8 are expressed as a model with a bar graph.

Thus, the face determining unit 237 determines whether or not a face is included in the determining object image 440, based on the computed evaluation values SS1, SS7, and SS8. That is to say, the face determining unit 237 selects the evaluation value that, out of the computed evaluation values, is at or greater than the threshold, and has the highest value, and determines that the face corresponding to the selected evaluation value is included in the determining object image 440. For example, of the evaluation values SS1, SS7, and SS8 shown in FIG. 24B, the evaluation values that are at or greater than the threshold 448 are the evaluation values SS7 and SS8. Also, of the evaluation values SS7 and SS8, the evaluation value SS7 which has the highest value is selected. The face included in the image 607 corresponding to the evaluation value SS7 is determined to be included in the determining object image 440. The determining results are output to the determining result output unit 238.

Note that in the case an evaluation value at or greater than the threshold does not exist out of the computed evaluation values, the face determining unit 237 determines that an object face is not included in the determining object image 440, and information to that extent is output to the determining result output unit 238. For example, 0 can be used as the threshold 448. Also, so as to have a comparatively low reliability, a value of less than 0 can be used, or another value can be used.

Thus, causing the resolution of the determining object images to be the same resolution and the feature amounts used for evaluation computing uniformly to be the luminance values between two points enables switching between multiple face determining dictionaries, and multiple evaluation values can be created with the same algorithm.

FIGS. 25A through 25C are drawings schematically showing the flow in the case of performing face detecting with the face detecting unit 230, according to the first embodiment of the present invention. FIG. 25A shows the determining object image 440 extracted by the image extracting unit 233. The determining object image 440 is the same as the determining object image 440 shown in FIGS. 23A through 24D.

FIG. 25B shows the relation between the images 601 through 609 that express the faces subject to determining, and the evaluation values S1 through S9 computed by the evaluation value computing unit 235. Note that the relation shown in FIG. 25B is similar to the relation shown in FIG. 23B. Also, in FIG. 25B, regions corresponding to the evaluation values selected by the selecting unit 236 are surrounded with a bold frame.

FIG. 25C shows the relation between the images 601 through 609 that express the faces subject to determining, and the evaluation values SS1, SS7, and SS8 computed by the face determining unit 237. Note that in FIG. 25C, regions for which evaluation values are computed by the face determining unit 237 are surrounded with a bold frame.

The evaluation values S1 through S9 shown in FIG. 25B are evaluation values to narrow down the objects for computing the evaluation values SS1 through SS9 shown in FIG. 25C. Therefore, the calculation amount of the evaluation value computing can be reduced, and the evaluation value computing processing can be performed quickly. Note that the reliability of the evaluation values S1 through S9 is to be comparatively low, whereby, for example as shown in FIG. 25B, the value of the evaluation value S1 that corresponds to the image 601 which does not look like the face included in the determining object image 440 is assumed to be great. Even in such a case, the reliability of the evaluation value using the face determining dictionaries 311 through 319 is high, whereby, for example as shown in FIG. 25C, the image 607 having a high similarly with the face included in the determining object image 440 can be finally determined. Thus, by narrowing down the object to be determined based on the evaluation values of the first level having a comparatively low reliability, the object of computing processing of the evaluation values of the second level having a high reliability can be reduced, whereby face detecting processing can be performed quickly. Also, for example in a case such as an evaluation value of roughly 1 or 2 is erroneously computed in the first level, correct determining can be performed based on the evaluation values of the second level having high reliability, whereby object detecting with high accuracy can be realized.

Now, for example, let us use a tree structure to consider a detecting method to detect faces that are facing various directions, by using multiple distinguishers created for each type of face direction, while sequentially distinguishing the facing of faces according to branches shown by the tree. In this detecting method, the faces are detected while the facing directions are sequentially distinguished, whereby for example, the average weak hypothesis until arriving at a conclusion can become long and efficiency become poor. Also, if there are errors in the determining until arriving at a leaf, and the wrong node branch is taken, steps are not retraced, and appropriate face detecting is not performed.

Conversely, in the first embodiment of the present invention, there is no node branch logic, whereby the average weak hypothesis until arriving at a conclusion can be shortened, and efficiency can be improved. Also, of the evaluation values computed at the first level, regardless of the type of face facing direction, a candidate for face determining is selected from all of the objects, whereby for example, even when it is uncertain to which object this face corresponds, erroneous detecting is less likely to occur. Also, a tree structure is not employed, and evaluation is performed simultaneously in the first level of the face detecting processing, facilitating carrying out thereof, and influence of wrong branches can be avoided. Also, at the first level of the face detecting processing, the evaluation values relating to multiple objects can be computed simultaneously using the same feature amounts, whereby efficiency relating to the evaluation value computing processing can be improved. Also, in the case of creating a dictionary that can simultaneously compute evaluation values relating to multiple objects used at the first level, the dictionaries relating to each object can be crated simultaneously, thereby improving convergent learning.

Also, in the event of evaluation value computing, the weightings to multiply the scores by are modified and calculations performed, according to the case of smaller than the threshold and greater than the threshold for each dictionary. Thus, even in a case with complicated distribution as to the physical amount in the determining object image, distinguishing can be performed from the distribution thereof.

Figure 26:
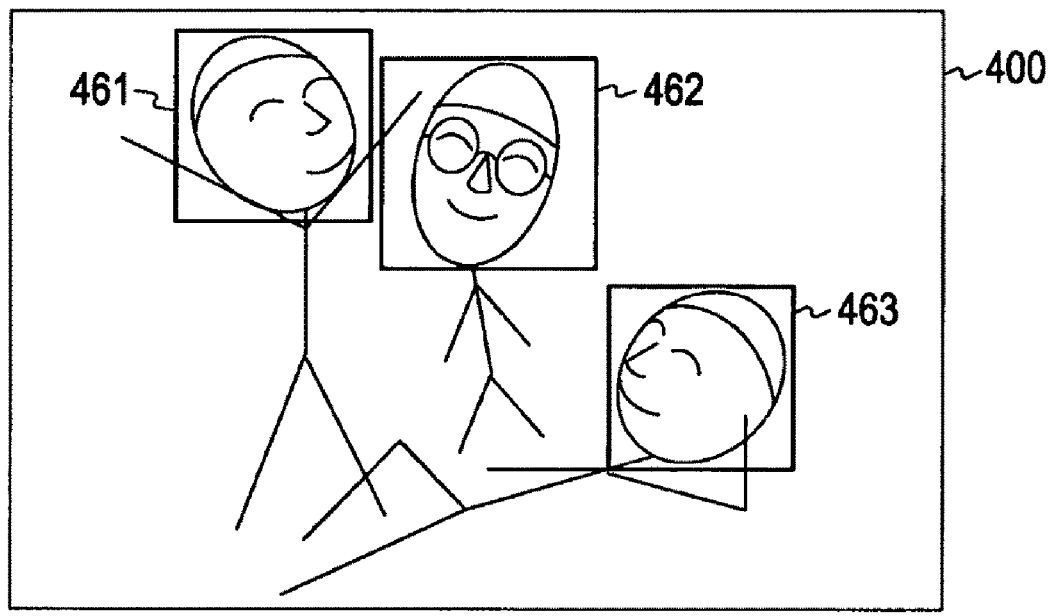
FIG. 26 is a drawing illustrating the imaging image subject to face detecting processing by the face detecting unit and the detection result of the face detecting processing by the face detecting unit, according to the first embodiment of the present invention.

FIG. 26 is a drawing showing the imaging image 400 that has been subject to face detecting processing by the face detecting unit 230, and the detection results of the face detecting processing by the face detecting unit 230, according to the first embodiment of the present invention. The imaging image 400 is the same as the imaging image 400 shown in FIG. 22A, and includes three persons. Also, in the imaging image 400, the detection results in the case that the faces of three persons have been detected are shown schematically with frames 461 through 463. The frames 461 through 463 are frames showing positions and size, as the detection results of the face detecting processing by the face detecting unit 230. Based on the detection results herein, for example the camera parameter control unit 220 can determine camera parameters that are optimal for the detected. Also, in the case that the imaging image 400 is displayed on the display unit 170, the frames 461 through 463 can be displayed so as to overlay the imaging image 400. As shown in FIG. 26, for example, a face that is tilted or a face of a person lying down can also be appropriately detected.

Operating Example of Imaging Image

Figure 27:
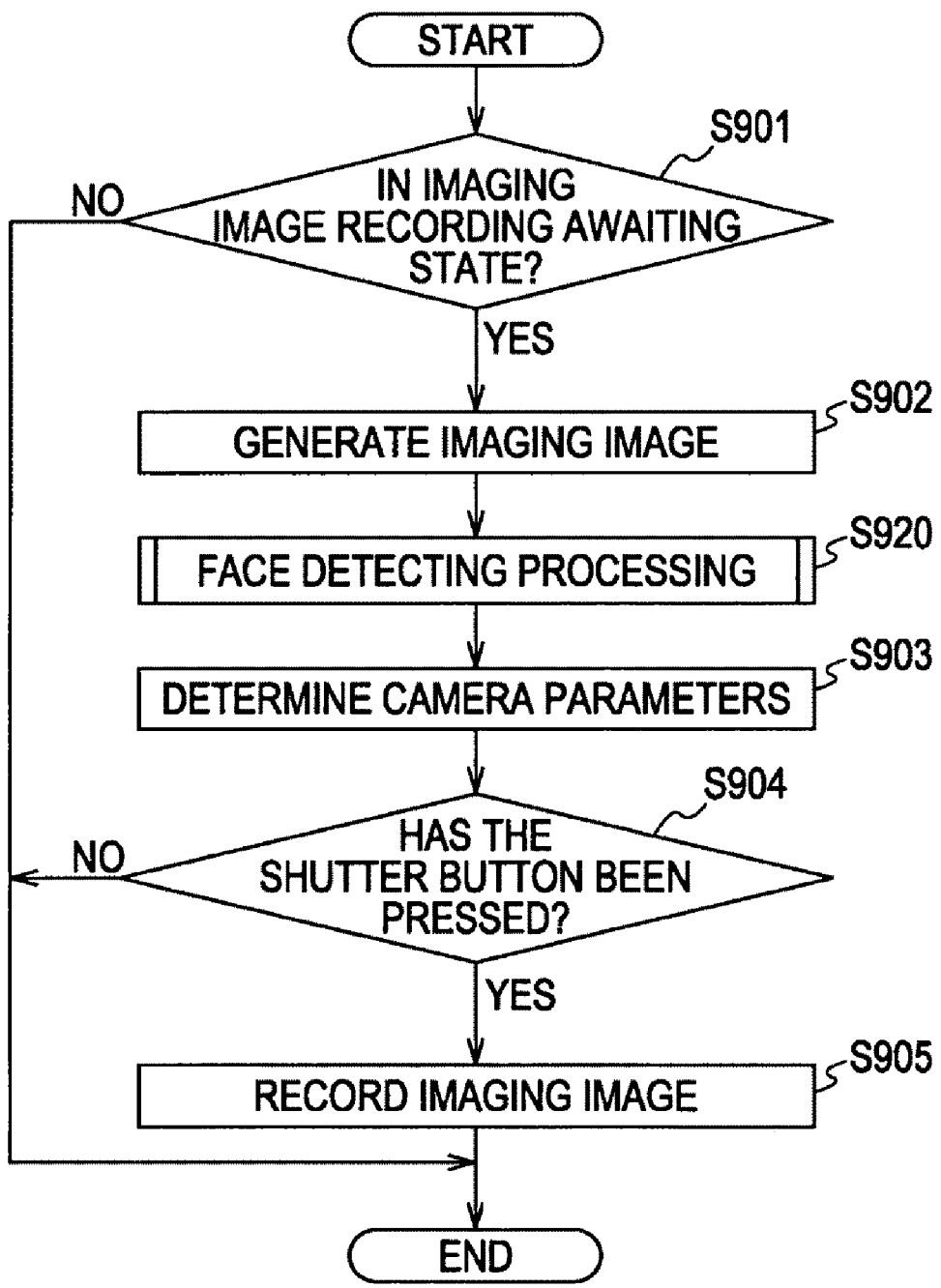
FIG. 27 is a flowchart describing the processing sequence of the imaging image recording processing by the imaging device, according to the first embodiment of the present invention.

Next, the operations of the imaging image 100 according to the first embodiment of the present invention will be described with reference to the drawings. FIG. 27 is a flowchart showing processing procedures for the imaging image recording processing by the imaging device 100, according to the first embodiment of the present invention. In this example, an example of generating an imaging image and performing face detecting processing in the case of the imaging device 100 in an imaging image recording awaiting state will be described.

First, whether or not the imaging device 100 is in the imaging image recording awaiting state or not is determined (step S901). In the case that the imaging device 100 is in the imaging image recording awaiting state (step S901), the imaging unit 112 generates the imaging image (step S902), and the face detecting unit 230 performs face detecting processing for the generated imaging image (step S920). The face detecting processing will be described in detail with reference to FIG. 28. The face detecting processing may be performed as to each frame, or may be performed as to a frame at every defined interval. On the other hand, in the case that the imaging device 100 is not in the imaging image recording awaiting state (step S901), the operations of the imaging image recording processing are ended.

Next, the camera parameter control unit 220 determines the camera parameters (step S903). For example, in the case that face detecting information is output from the face detecting unit 230, the camera parameter control unit 220 determines the camera parameters optimal for the detected face, based on the position and size on the imaging image of the detected face. Next, determination is made as to whether or not the shutter button has been pressed (step S904), and in the case the shutter button has been pressed, the generated imaging image is recorded in the recording unit 150 (step S905). On the other hand, in the case the shutter button has not been pressed (step S904), the operations of the imaging image recording processing is ended.

Figure 28:
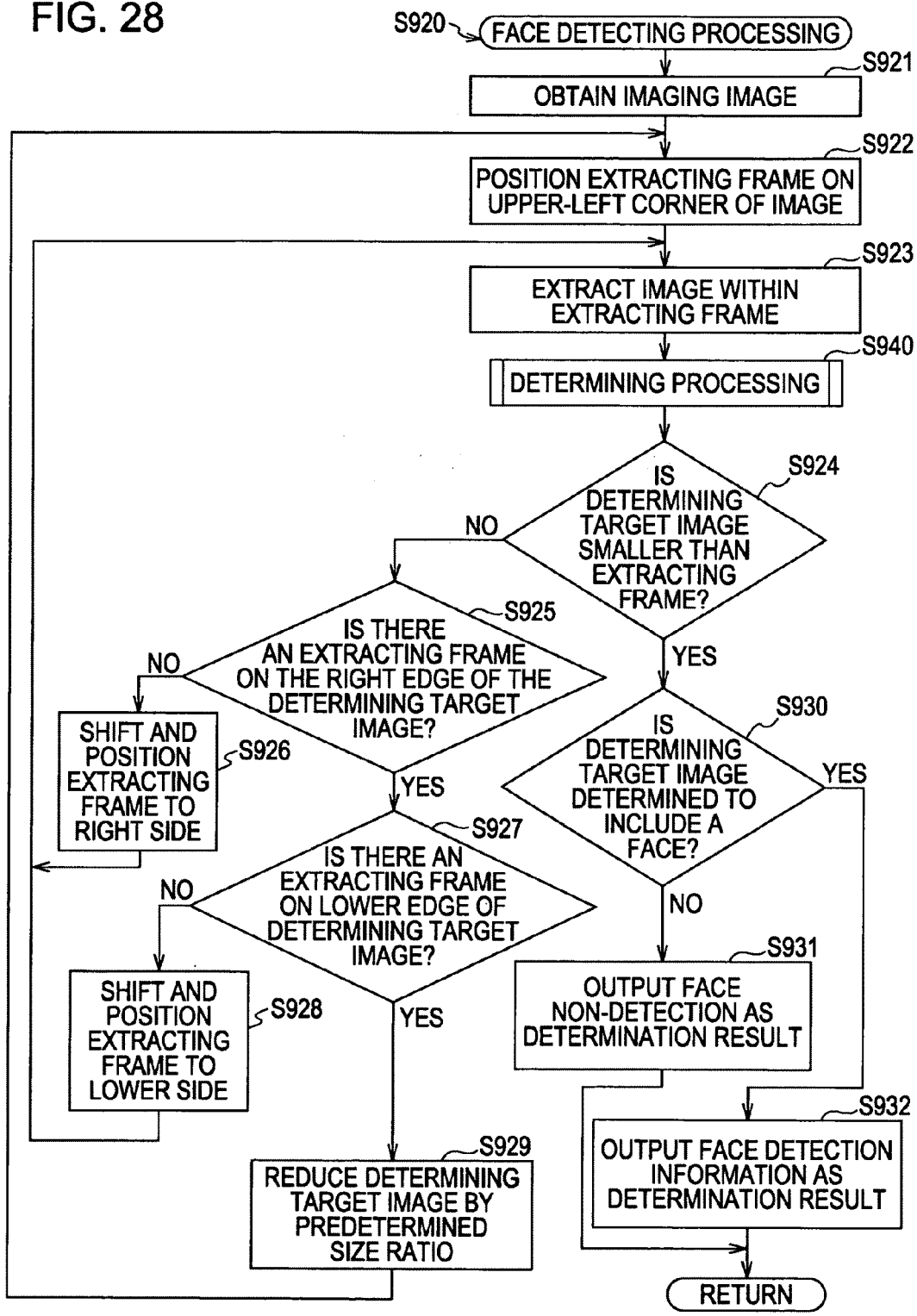
FIG. 28 is a flowchart describing the face detecting processing sequence out of the processing sequences of the imaging image recording processing by the imaging device, according to the first embodiment of the present invention.

FIG. 28 is a flowchart showing face detecting processing procedures (the processing procedures in step S920 shown in FIG. 27) out of the processing procedures of the imaging image recording processing by the imaging device 100 according to the first embodiment of the present invention.

First, the current imaging image stored in the storage device unit 130 is obtained (step S921). Next, an extracting frame if disposed on the upper left corner of the obtained imaging image (step S922), and the image within the extracting frame is extracted (step S923). Next, determining processing is executed for the image (determining object image) extracted from within the extracting frame (step S940). Note that the determining processing will be described in detail with reference to FIG. 29.

Next, determination is made as to whether or not the determining object image is smaller than the extracting frame (step S924). In the case that the determining object image is not smaller than the extracting frame (step S924), determination is made as to whether or not an extracting frame exists on the right edge of the determining object image (step S925). In the case that an extracting frame does not exist on the right edge of the determining object image (step S925), the extracting frame is shifted on the determining object image by one pixel to the right and positioned (step S926), and the flow is returned to step S923. On the other hand, in the case that an extracting frame exists on the right edge of the determining object image (step S925), determination is made as to whether or not an extracting frame exists on the lower edge of the determining object image (step S927). In the case that an extracting frame does not exist on the lower edge of the determining object image (step S927), the extracting frame is shifted on the determining object image by one pixel downwards and positioned (step S928), and the flow is returned to step S923. In the case that the extracting frame exists on the lower edge of the determining object image (step S927), the determining object image is subjected to reduction processing (step S929), and the extracting frame is positioned on the upper left corner of the image after the reduction processing (step S922).

On the other hand, in the case that the determining object image is smaller than the extracting frame (step S924), determination is made as to whether or not a face is included in the determining object image (step S930). In the case determination is made that a face is included in the determining object image (step S930), face detecting information showing that a face has been detected is output as the determination results (step S932). Now, in the case determination is made that multiple faces are included in the determining object image, face detecting information relation to multiple faces is output. Also, in the case that, for overlapping regions, determination is made multiple times that a face is included, face detecting information is output based on the position and size of the extracting frame having the greatest score (evaluation value) computed using the face determining dictionary in the determining processing in step S940, for example. On the other hand, in the case determination is not made that a face is included in the determining object image (step S930), face non-determining information showing that a face is not detected is output as the determination results (step S931).

Note that in this example, an example is described wherein even in the case that determination is made once that a face is included in the determining object image, the determining processing is repeatedly performed until the determining object image becomes smaller than the extracting frame, and based on this determination result determination is made as to whether or not a face is detected from the current imaging image. However, an arrangement may be made wherein, in the case that determination is made once that a face is included in the determining object image, other determining object images are not subjected to determining processing, and the face detecting information showing that a face has been detected from the current imaging image can by output.

Figure 29:
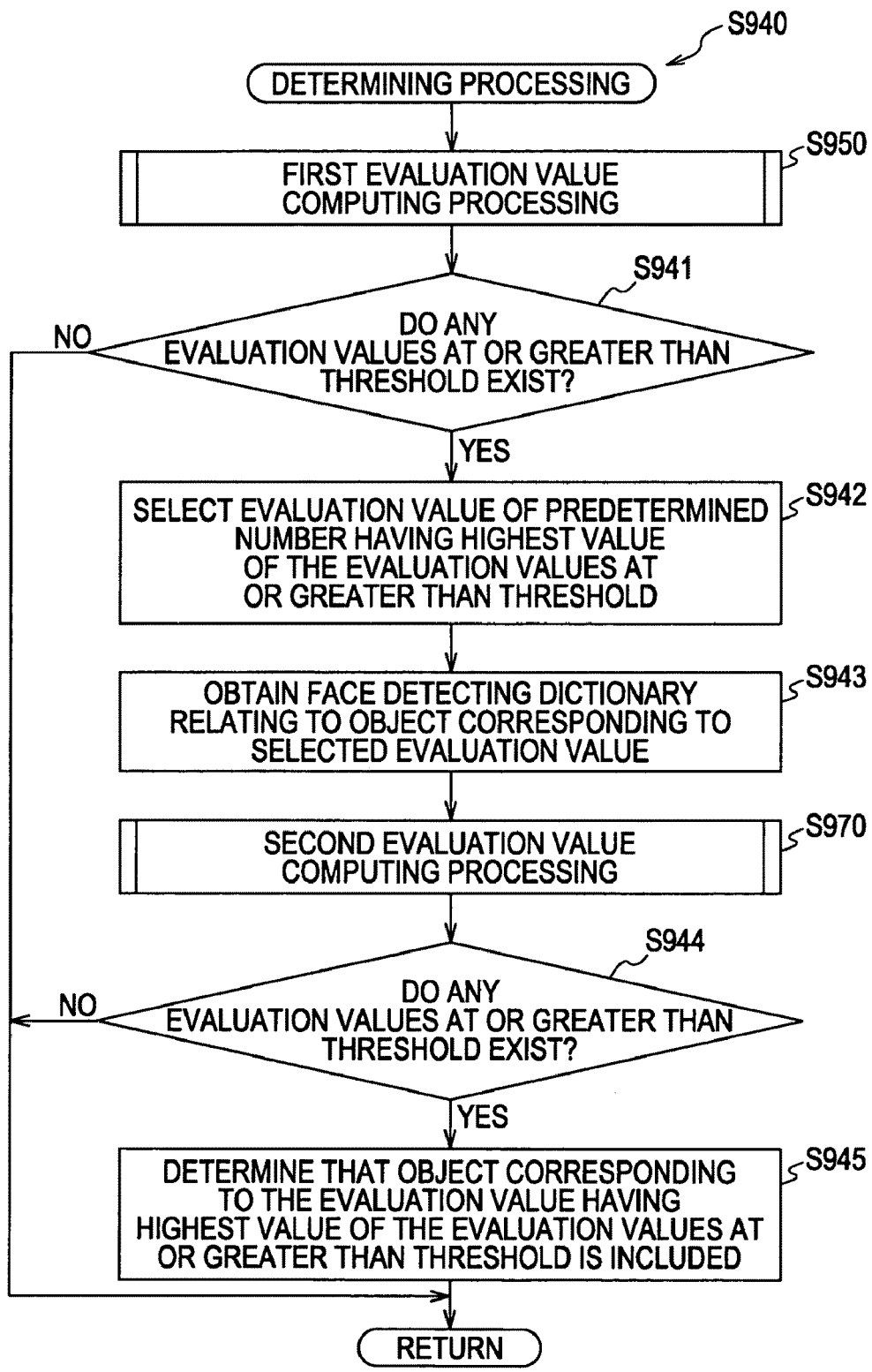
FIG. 29 is a flowchart describing the determining processing sequence out of the processing sequences of the face detecting processing by the imaging device, according to the first embodiment of the present invention.

FIG. 29 is a flowchart showing determining processing procedures (processing procedures in step S940 shown in FIG. 28) out of the processing procedures of the face detecting processing by the imaging device 100 according to the first embodiment of the present invention.

First, the evaluation value computing unit 235 performs first evaluation value computing processing (step S950). The first evaluation value computing processing will be described in detail with reference to FIG. 30. Next, the selecting unit 236 determines whether or not, of the multiple evaluation values computed by the evaluation value computing unit 236, any evaluation values exist at or above the threshold value (step S941). In the case that an evaluation value at or above the threshold value exists (step S941), the selecting unit 236 selects a predetermined number of evaluation values having high values from the evaluation values that are at or above the threshold (step S942). For example, in the case that the evaluation value computed by the evaluation value computing unit 235 is 9, at most three evaluation values are selected in the order of the highest values.

Next, the face determining unit 237 obtains the face determining dictionary relating to an object corresponding to the selected evaluation values from the face determining dictionary storage unit 310, and holds this in the face determining dictionary memory 239 (step S943). Next, the face determining unit 237 uses the face determining dictionary held in the face determining dictionary memory 239 to perform second evaluation value computing processing (step S970). The second evaluation value computing processing will be described in detail with reference to FIG. 31.

Next, the face determining unit 237 determines whether or not any evaluation values at or greater than the threshold exist out of the computed one or multiple evaluation values (step S944). In the case that an evaluation value at or greater than the threshold exists out of the computed one or multiple evaluation values (step S944), the face determining unit 237 selects the evaluation value having the highest value from the evaluation values at or greater than the threshold. The object corresponding to the evaluation value is determined to be included in the determining object image (step S945).

Note that in the case that an evaluation values at or greater than the evaluation values computed by the evaluation value computing unit 235 does not exist (step S941), or in the case that an evaluation value at or greater than the threshold does not exist out of the evaluation values computed by the face determining unit 237 (step S944), the operations of the determining processing is ended.

Figure 30:
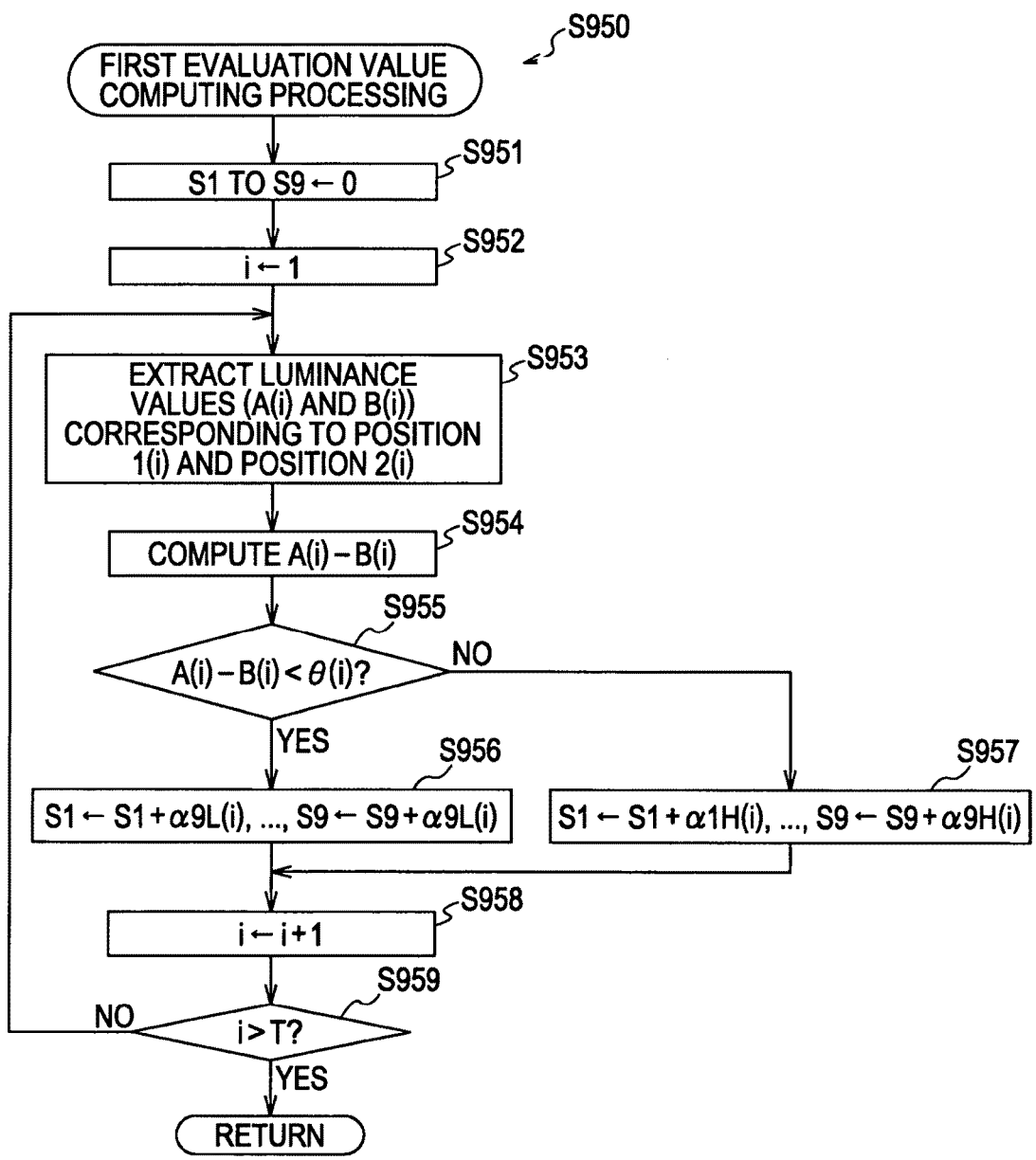
FIG. 30 is a flowchart describing the first evaluating value computing processing sequence out of the processing sequences of the face detecting processing by the imaging device, according to the first embodiment of the present invention.

FIG. 30 is a flowchart showing the first evaluation value computing processing procedures (the processing procedures in step S950 shown in FIG. 29) out of the processing procedures of the face detecting processing by the imaging device 100 according to the first embodiment of the present invention.

First, the scores S1 through S9 are initialized to "0" (step S951), and the variable i is initialized to "1" (step S952). Next, the evaluation value computing unit 235 extracts the luminance values corresponding to the position 1 (u1, v1) and position 2 (u2, v2) stored in the i'th row of the evaluation value computing dictionary 301 (step S953). In this example, let us say that the luminance value corresponding to the position 1 (u1, v1) is A(i), and the luminance value corresponding to the position 2 (u2, v2) is B(i). Next, the evaluation value computing unit 235 computes the difference value of the two extracted luminance values (A(i)–B(i)) (step S954). Note that steps S953 and 5954 are an example of comparing procedures referred to in the Summary of the Invention.

Next, the evaluation value computing unit 235 determines whether or not the computed difference value (A(i)–B(i)) is smaller than the threshold value θ(i) stored in the i'th row of the evaluation value computing dictionary 301 (step S955). In the case that the computed difference value (A(i)–B(i)) is smaller than the threshold value θ(i) (step S955), the evaluation value computing unit 235 sequentially adds α1L(i) through α9L(i) which are stored in the i'th row of the evaluation value computing dictionary to the scores S1 through S9 (step S956). On the other hand, in the case that the computed difference value (A(i)–B(i)) is not smaller than the threshold value θ(i) (step S955), the evaluation value computing unit 235 sequentially adds α1H(i) through α9H(i) which are stored in the i'th row to the scores S1 through S9 (step S957). Note that steps S955 through S957 are an example of the computing procedures referred to in the Summary of the Invention.

Next, "1" is added to the variable i (step S958), and determination is made as to whether or not the variable i is greater than T (step S959). In the case that the variable i is not greater than T (step S959), the flow is returned to step S953, and the evaluation value computing processing is repeated (steps S953 through S958). On the other hand, in the case that the variable i is greater than T (step S959), the operations of the first evaluation value computing processing are ended.

Figure 31:
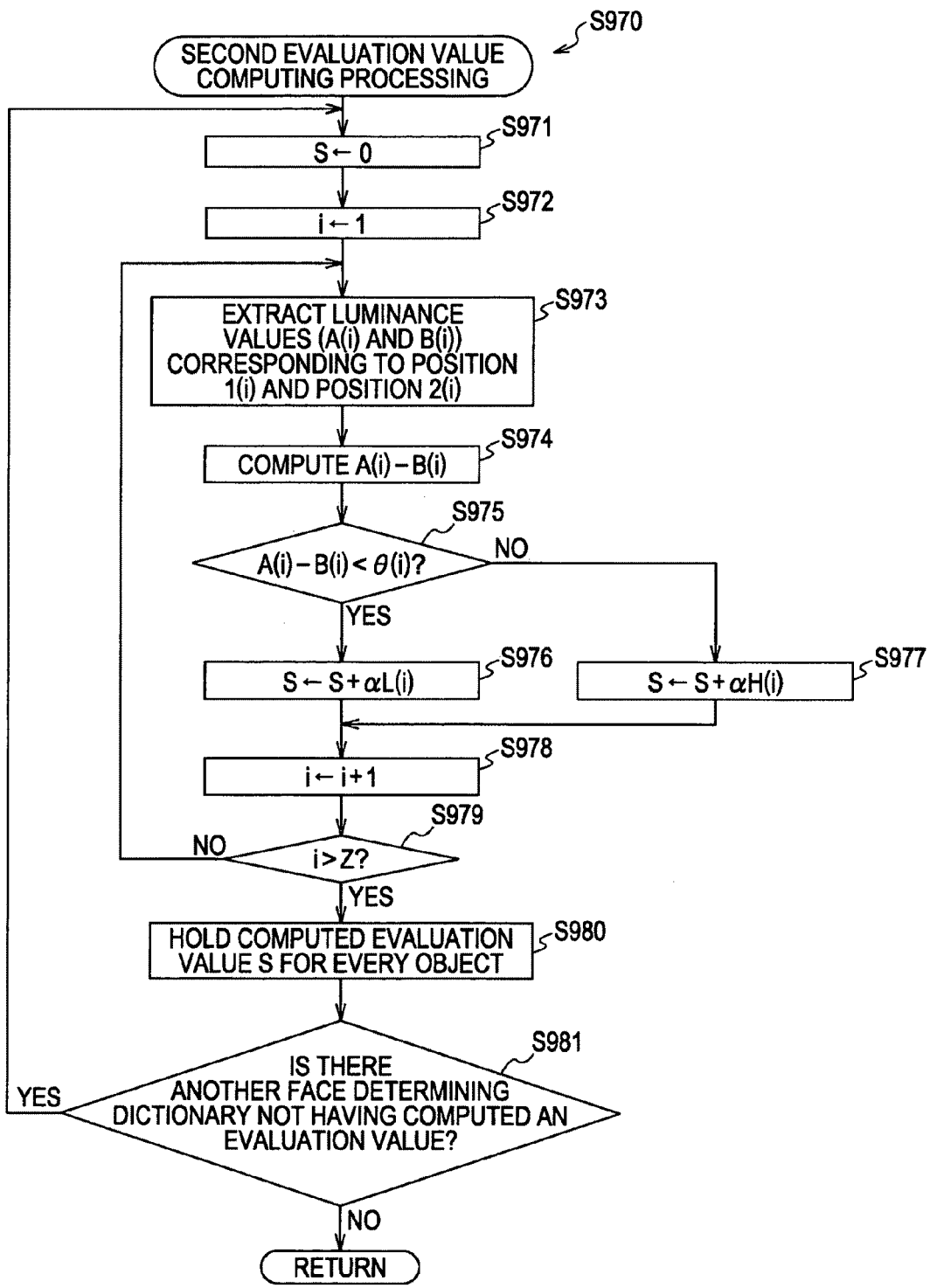
FIG. 31 is a flowchart describing the second evaluating value computing processing sequence out of the processing sequences of the face detecting processing by the imaging device, according to the first embodiment of the present invention.

FIG. 31 is a flowchart showing the second evaluation value computing processing procedures (processing procedures in step S970 shown in FIG. 29) out of the processing procedures of the face detecting processing by the imaging device 100 according to the first embodiment of the present invention.

First, the scores S is initialized to "0" (step S971), and variable i is initialized to "1" (step S972). Next, the face determining unit 237 extracts the luminance values corresponding to the position 1 (u1, v1) and position 2 (u2, v2) stored in the i'th row of the face determining dictionary from the determining object image (step S973). In this example, let us say that the luminance value corresponding to the position 1 (u1, v1) is A(i), and the luminance value corresponding to the position 2 (u2, v2) is B(i). Next, the face determining unit 237 computes the difference value of the two extracted luminance values (A(i)–B(i)) (step S974). Note that steps S973 and S974 are an example of comparing procedures referred to in the Summary of the Invention.

Next, the face determining unit 237 determines whether or not the computed difference value (A(i)–B(i)) is smaller than the threshold value θ(i) stored in the i'th row of the face determining dictionary (step S975). In the case that the computed difference value (A(i)–B(i)) is smaller than the threshold value θ(i) (step S975), the face determining unit 237 adds αL(i) which is stored in the i'th row of the face determining dictionary to the score S (step S976). On the other hand, in the case that the computed difference value (A(i)–B(i)) is not smaller than the threshold value θ(i) (step S975), the face determining unit 237 adds αH(i) which is stored in the i'th row of the current face determining dictionary to the score S (step S977). Note that steps S975 through S977 are an example of the computing procedures referred to in the Summary of the Invention.

Next, "1" is added to the variable i (step S978), and determination is made as to whether or not the variable i is greater than Z (step S979). In the case that the variable is not greater than Z (step S979), the flow is returned to step S973, and the evaluation value computing processing using the current face determining dictionary is repeated (steps S973 through S978). On the other hand, in the case that the variable i is greater than Z (step S979), the face determining unit 237 correlates this to the object corresponding in the face determining dictionary, and holds the computed evaluation value S (step S980).

Next, the face determining unit 237 determines whether or not another face determining dictionary exists which has not computed the evaluation values, out of the face determining dictionaries held in the face determining dictionary memory 239 (step S981). In the case that another face determining dictionary exists which has not computed the evaluation values (step S981), the flow is returned to step S971, and the evaluation value computing processing is repeated until the evaluation value computing for all of the face determining dictionaries held in the face determining dictionary memory 239 has ended. On the other hand, in the case that another face determining dictionary does not exist which has not computed the evaluation values (step S981), the operations of the second evaluation value computing processing are ended.

Also, with this example, an example is described that uses the various values from the first row to the Z'th row of each face determining dictionary to compute the score S. However, for example, the values are corresponded to each record of each face determining dictionary and a cut-off threshold is stored, and in the case that the score S found in steps S976 or S977 fall below the cut-off threshold of the current record, the evaluation value computing processing using the current face determining dictionary can be cut off. Thus, the face detecting processing can be further sped up.

As shown above, according to the first embodiment of the present invention, since face detecting is performed with the two-level evaluation value computing processing, the detecting processing can be performed quickly with less weak hypothesis, and detection accuracy can be improved. Also, in the case of the face detecting processing, the weightings to multiply the score are modified and calculated depending on the a case of being smaller than the threshold in each dictionary and a case of being greater, whereby detection accuracy can be further improved.

Second Embodiment

Configuration Example of Imaging Image

With the first embodiment of the present invention, an example to simultaneously compute evaluation values relating to multiple objects using one evaluation value computing dictionary is shown. With the second embodiment of the present invention, an example is shown to compute evaluation values relating to four times the number of objects of the objects that can be computed using the evaluation value computing dictionary, by transforming the positions of two points of which the luminance difference values stored in one evaluation value computing dictionary are to be computed. Note that the imaging device according to the second embodiment of the present invention differs in that with the imaging device 100 according to the first embodiment of the present invention a face detecting unit 250 is provided instead of a face detecting unit 230. Thus, hereafter the description of the portions that are common with the first embodiment of the present invention will be omitted, and primarily the differing portions will be described.

Figure 32:
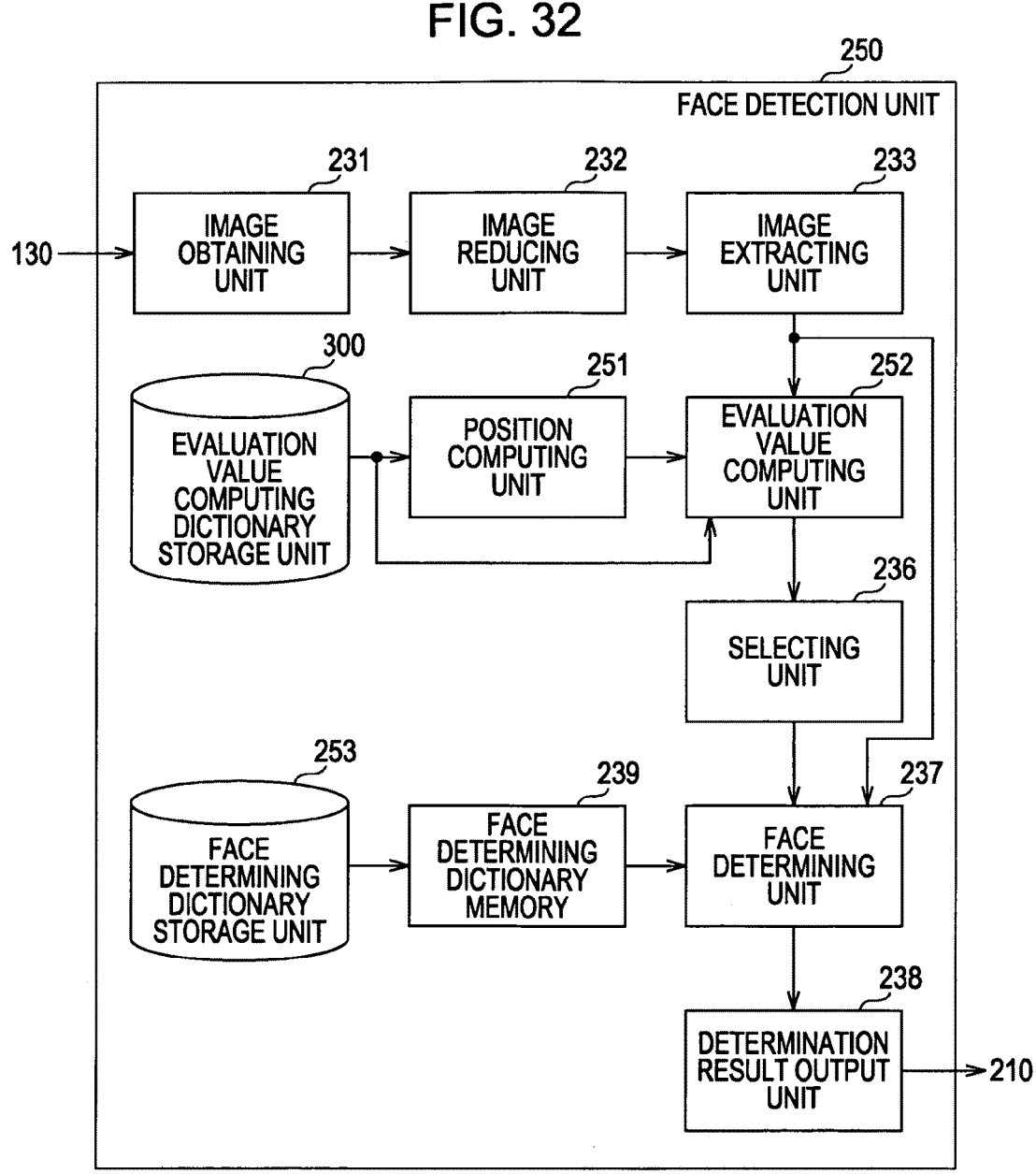
FIG. 32 is a block drawing illustrating a functional configuration example of a face detecting unit according to a second embodiment of the present invention.

FIG. 32 is a block drawing showing a functional configuration example of the face detecting unit 250 according to the second embodiment of the present invention. The face detecting unit 250 is a modified example of the face detecting unit 230 shown in FIG. 3, and has a position computing unit 251, evaluation value computing unit 252, and face determining dictionary storage unit 253. Note that the portions that are common with the face detecting unit 230 shown in FIG. 3 will be appended the same reference numerals, and the description thereof will be omitted.

The position computing unit 251 transforms the values of the position 1 (u1, v1) 302 and position 2 (u2, v2) 303 stored in the evaluation value computing dictionary 301 stored in the evaluation value computing dictionary storage unit 300, and computes the positions of two new points. The position computing unit 251 then outputs the positions of the two points after transforming, the threshold (θ) that is correlated to the positions of the two points before transforming and stored in the evaluation value computing dictionary 301, and each value of the weightings (α1 through α9) 305, to the evaluation value computing unit 252. For example, the position computing unit 251 uses the center position of the determining object image as a standard, subjects the values of the position 1 (u1, v1) 302 and position 2 (u2, v2) 303 to affine transform, and computes the positions of two new points. With the affine transformation, for example a transformation that rotates 90 degrees in a clockwise direction, a transformation that rotates 90 degrees in the opposite direction from the clockwise direction, and a transformation that rotates 180 degrees are performed. Note that this position computing method will be described in detail with reference to FIGS. 33A through 34D.

The evaluation value computing unit 252 uses the various values of the evaluation value computing dictionary 301 stored in the evaluation value computing dictionary storage unit 300 and the positions of the two points computed by the position computing unit 251 and the various values corresponding thereto, to compute the evaluation values for each object. Now, cases wherein each of the 90-degree rotation in the clockwise direction, the 90-degree rotation in the opposite direction from the clockwise direction, and the 180-degree rotation will be assumed. In this case, the evaluation values computed by the evaluation value computing unit 252 becomes four times the number of evaluation values computed using only the evaluation value computing dictionary 301. The evaluation values for each object thus computed are output to the selecting unit 236. Note that the computing method of the evaluation values for each object is similar to the first embodiment of the present invention, whereby the description here will be omitted.

The face determining dictionary storage unit 253 correlates, for each object, the face determining dictionary for determining whether or not an identified object is included in the image output from the image extracting unit 233. The stored face determining dictionary is supplied to the face determining dictionary memory 239. Now, a face determining dictionary is stored for each of multiple objects corresponding to the objects for which the evaluation values are computed by the evaluation value computing unit 252. Note that the objects for which a face determining diction is stored in the face determining dictionary storage unit 253 will be described in detail with reference to FIGS. 33A through 33D.

Figure 33A:
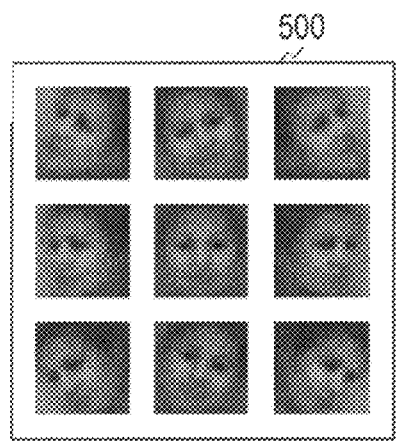
FIGS. 33A through 33D are drawings illustrating an example of an object wherein an evaluation value can be computed by the computing of positions of two new points by a position computing unit according to the second embodiment of the present invention.
Figure 33C:
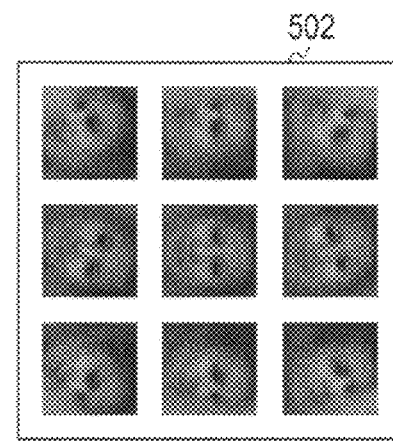
Figure 33B:
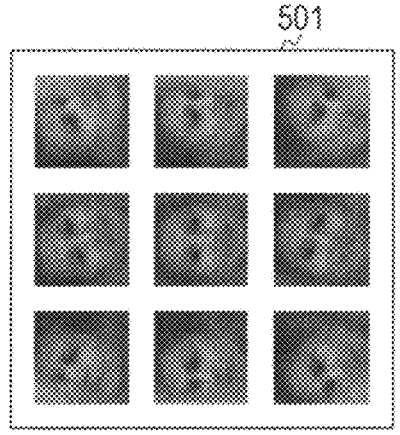
Figure 33D:
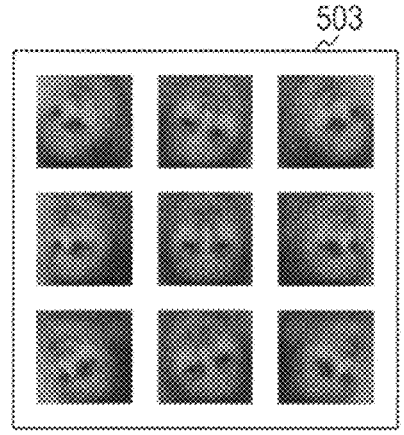

FIGS. 33A through 33D are drawings showing an example of objects for which evaluation value computing can be made by computing the positions of the two new points by the position computing unit 251 according to the second embodiment of the present invention. FIG. 33A shows an object image group 500 including face images that show objects for which the evaluation value can be computed using the evaluation value computing dictionary 301 shown in FIG. 20B. The object image group 500 corresponds to the object image group 600 shown in FIG. 20A. Also, FIGS. 33B through 33D show object image groups 501 through 503 that include face images showing objects for which the evaluation values can be computed by transforming the values of the position 1 (u1, v1) 302 and position 2 (u2, v2) of the evaluation value computing dictionary 301 shown in FIG. 20B.

As shown with the first embodiment of the present invention, the evaluation values relating to nine types of faces facing different directions using the evaluation value computing dictionary 301 shown in FIG. 20B. Now, for example the positions of the two points stored in the position 1 (u1, v1) 302 and position 2 (u2, v2) 303 of the evaluation value computing dictionary 301 are rotated 90 degrees in the opposite direction from the clockwise direction, with the center position of the determining object image as the rotating standard. The positions of the two points after rotating and the threshold (θ) that is correlated to the position of the two points and stored in the evaluation value computing dictionary 301 and the various values of the weighting (α1 through α9) 305 are used to perform the above-described evaluation value computing processing. Thus, for example, the evaluation values relating to the objects corresponding to the face images included in the object image group 501 shown in FIG. 33B can be simultaneously computed.

Similarly, for example, the positions of the two points stored in the position 1 (u1, v1) 302 and position 2 (u2, v2) 303 of the evaluation value computing dictionary 301 are rotated 90 degrees in the clockwise direction, with the center position of the determining object image as the rotating standard. By performing the above-described evaluation value computing processing described above using the positions of two points after rotating, for example the evaluation values relating to the object corresponding to the face images included in the object image group 502 shown in FIG. 33C can be computed.

Similarly, for example, the positions of the two points stored in the position 1 (u1, v1) 302 and position 2 (u2, v2) 303 of the evaluation value computing dictionary 301 are rotated 180 degrees, with the center position of the determining object image as the rotating standard. By performing the above-described evaluation value computing processing described above using the positions of two points after rotating, for example the evaluation values relating to the object corresponding to the face images included in the object image group 502 shown in FIG. 33D can be computed.

The transforming of these positions is performed by the position computing unit 251. Also, as a position transforming method for these, for example a 3×3 matrix (affine matrix) on a two-dimensional grid can be used to use affine transformation which transforms the positions of the two points. Also, face determining dictionaries relating to the objects corresponding to each face image included in the object image groups 500 through 503 shown in FIG. 33A through 33D are each stored in the face determining dictionary storage unit 253. That is to say, face determining dictionaries that are four times the number of the face determining dictionaries stored in the face determining dictionary storage unit 310 according to the first embodiment of the present invention are stored in the face determining dictionary storage unit 253.

FIGS. 34A through 34D are drawings showing a relation example between the position of the two new points computed by the position computing unit 251 according to the second embodiment of the present invention and the evaluation values computed using the positions of the two new points. Note that the evaluation values S1 through S9 that show FIGS. 34A through 34D correspond to the evaluation values S1 through S9 shown in FIG. 23B.

Figure 34A:
FIGS. 34A through 34D are drawings illustrating a relation example of the two new positions computed by the position computing unit and the evaluation value computed using the positions of these two new points according to the second embodiment of the present invention.

FIG. 34A shows an example of the evaluation value computed using the positions of the two points before transforming. Note that FIG. 34A shows the determining object image 470 for which an evaluation value is to be computed, and one combination (positions 471 and 472) of the combinations of positions of two points on the determining object image 470.

Figure 34B:
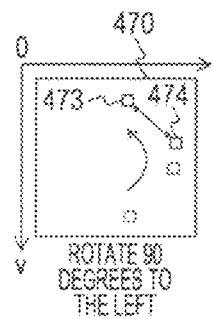

FIG. 34B shows an example of the positions of the two points rotated 90 degrees in the opposite direction from the clockwise direction by the position computing unit 251 and the evaluation values computed using the position of these two points. For example, the positions 471 and 472 are rotated 90 degrees in the opposite direction from the clockwise direction by the position computing unit 251 and transformed into the positions 473 and 474 of two points. The evaluation values shown in FIG. 34B using the various positions of two points thus transformed are computed with the evaluation value computing unit 252.

Figure 34C:
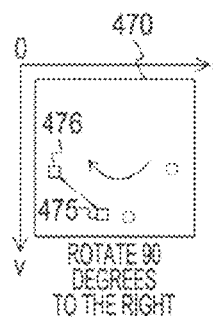

FIG. 34C shows an example of the positions of the two points rotated 90 degrees in the clockwise direction by the position computing unit 251, and the evaluation values that are computed using the positions of the two points. For example, the positions 471 and 472 of the two points shown in FIG. 34A are rotated 90 degrees in the clockwise direction by the position computing unit 251, and transformed into the positions 475 and 476 of the two points. The evaluation values shown in FIG. 34C using the various positions of two points thus transformed are computed by the evaluation value computing unit 252.

Figure 34D:
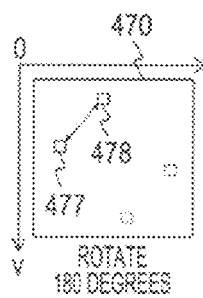

FIG. 34D shows an example of the positions of the two points rotated 180 degrees by the position computing unit 251, and the evaluation values that are computed using the positions of the two points. For example, the positions 471 and 472 of the two points shown in FIG. 34A are rotated 180 degrees by the position computing unit 251, and transformed into the positions 477 and 478 of the two points. The evaluation values shown in FIG. 34D using the various positions of two points thus transformed are computed by the evaluation value computing unit 252.

Thus, the positions of the two points stored in the position 1 (u1, v1) and the position 2 (u2, v2) 303 of the evaluation value computing dictionary 301 can be transformed and the positions of the two points after transforming used to computed the evaluation values. Thus, more evaluation values can be quickly computed using one evaluation value computing dictionary. For example, as shown in FIG. 34, the evaluation value computing dictionary 301 that can simultaneously compute nine evaluation values is used to perform three ways of transforming, whereby 36 evaluation values can be computed. Thus, the storage capacity relating to the evaluation value computing dictionary can be reduced.

Also, the evaluation values S1 through S9 shown in FIGS. 34A through 34D thus computed are output to the selecting unit 236. The selecting unit 236 extracts the evaluation values at or greater than the threshold value 447 of four evaluation values S1 through S9, similar to the first embodiment of the present invention. Of the extracted evaluation values, the three evaluation values having the highest values are selected, and information (selection object information) relating to objects corresponding to the selected evaluation values is output to the face determining unit 237. For example, the evaluation values that are at or greater than the threshold value 447 and that correspond to the images 611 and 614 shown in FIG. 34B and image 631 shown in FIG. 34D are selected as evaluation values having the three highest values. In FIGS. 34A through 34D the bar graphs showing the selected evaluation values are hatched.

FIGS. 35A through 35E are drawings schematically showing a flow in the case of performing face detecting with the face detecting unit 250 according to the second embodiment of the present invention. FIG. 35A shows a determining object image 480 extracted by the image extracting unit 233. FIG. 35B shows the object image groups 500 through 503 that include the images showing the face for which evaluation values are to be computed. Note that similar to FIGS. 34A through 34D, the various evaluation values corresponding to the images 601 through 609, 611 through 619, 621 through 629, 631 through 639 included in the object image group 500 through 503 are computed by the evaluation value computing unit 252. For example, the evaluation values are computed similarly to FIGS. 34A through 34D, and the evaluation values corresponding to the images 611, 614, and 631 shown in FIG. 35B are to be selected.

FIG. 35C shows the relation between the images 611, 614, and 631 showing the faces corresponding to the evaluation values selected by the selecting unit 236 and the evaluation values SS10 through SS12 computed by the face determining unit 237 for the determining object image 480. Note that the face determining by the face determining unit 237 is similar to the first embodiment of the present invention, so the detailed description thereof will be omitted here. For example, the evaluation value having the highest value out of the evaluation values SS10, SS11, and SS12 that correspond to the images 611, 614, and 631 shown in FIG. 35B, and that is at or above the threshold 448 is the evaluation value SS10. Therefore, the face included in the image 611 that corresponds to the evaluation value SS10 is determined has being included in the determining object image 480.

Figure 36:
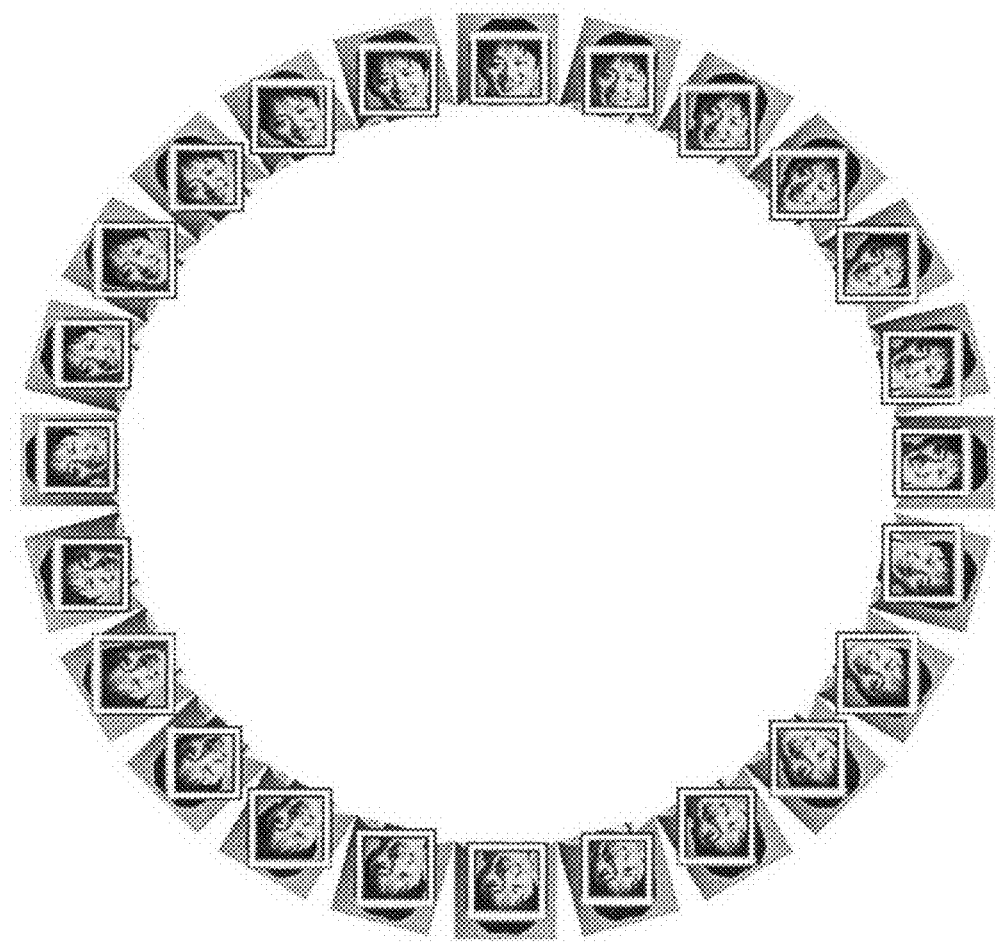
FIG. 36 is a drawing illustrating an example of faces that can be detected by the face detecting unit and the detection results thereof according to the second embodiment of the present invention.

FIG. 36 is a drawing showing an example of faces that can be detected by the face detecting unit 250 according to the second embodiment of the present invention and the detection results thereof. FIG. 36 shows the images including forward-facing faces rotates at predetermined intervals in a range of 360 degrees, and the detection results detected with these images, with frames. As shown in FIG. 36, according to the second embodiment of the present invention, detection can be made even for faces at various angles. Faces at various angles can be detected, such as the face of a person lying on the ground, the face of a person standing on his head, and the face that is photographed while tilting the imaging device 100, for example. Also, in FIG. 36, only the example wherein the direction of a forward-facing face is tilted in a Roll direction is shown, but similarly detection can be made for faces tilted in the Pitch or Yaw directions.

Thus, by transforming only the positions of the two points on the same dictionary, the evaluation values relating to several times the number the objects as the dictionary can be computed quickly using the same dictionary. Therefore, the evaluation values can be computed extremely efficiently, and detection accuracy of the object can be improved.

Note that in the case that photographing with the imaging device 100 in the state of reversing up and down is assumed to be less likely, the 180-degree rotation by the position computing unit 251 may be omitted. Also, only the face determining dictionary corresponding to the objects for which evaluation values can be computed using the evaluation value computing dictionary 301 is stored in the face determining dictionary storage unit 253. Similar to the above-described evaluation value computing processing, the face determining unit 237 can computing the various evaluation values using the values in the face determining dictionary or the values wherein the positions of the two points are transformed.

Operating Example of Imaging Device

Figure 37:
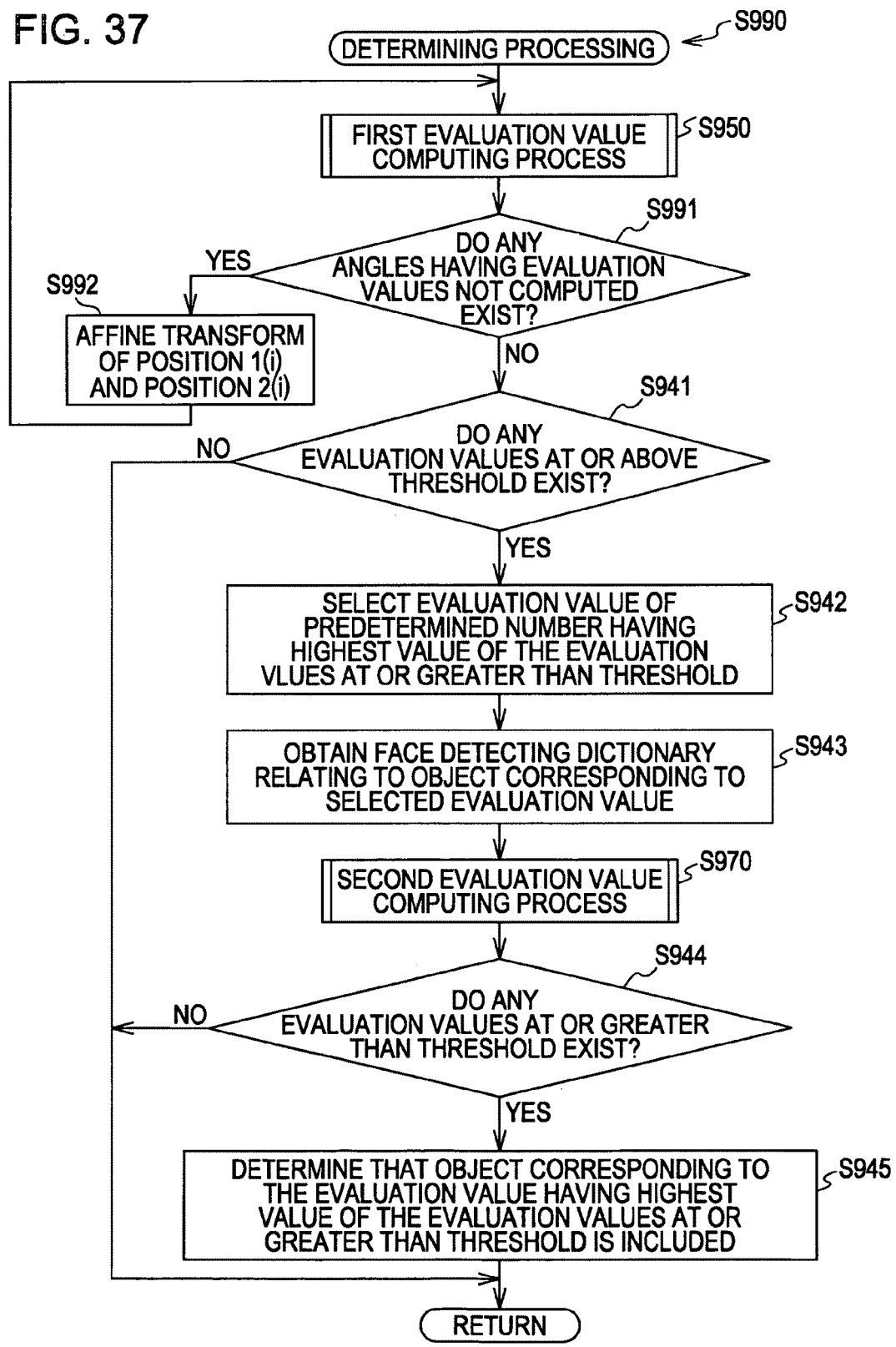
FIG. 37 is a flowchart describing processing procedures of the face detecting processing by the imaging device according to the second embodiment of the present invention.

FIG. 37 is a flowchart showing processing procedures of the face detecting processing by the imaging device 100 according to the second embodiment of the present invention. Note that this example is a modified example of the face detecting processing (processing procedures in step S940 in FIG. 29) according to the first embodiment of the present invention. Therefore, the portions that are the same as the processing procedures shown in FIG. 29 will have the same reference numerals appended thereto, and the description thereof will be omitted.

First, the evaluation value computing unit 252 performs first evaluation value computing processing (step S950). Next, determination is made as to whether or not an angle exists for which an evaluation value is not computed (step S991). For example, in the case of computing an evaluation value for each angle of 90 degrees in the clockwise direction, 90 degrees in the opposite direction from the clockwise direction, and 180 degrees, determination is made as to whether or not an evaluation value is computed for each of these angles. In the case that an angle exists for which an evaluation value is not computed (step S991), the position computing unit 251 transforms the positions of the two points stored in the position 1 (u1, v1) 302 and position 2 (u2, v2) 303 of the evaluation value computing dictionary 301 (step S992). Next, the positions of the two points after transforming, and the various values of the threshold (θ) correlated to the positions of the two points before transforming and stored in the evaluation value computing dictionary 301 and the weightings (α1 through α19) 305 are output to the evaluation value computing unit 252, and the first evaluation value computing processing is performed (step S950).

Note that according to the embodiments of the present invention, examples are shown to detect an object using a difference value between the luminance values of two points on the determining object image, but the embodiments of the present invention can be applied to a detecting method of detecting the object by using the difference value of another physical amount of two regions on the determining object image. For example, a rectangle feature on two regions within the determining object image can be used to compute the evaluation value and apply the embodiments of the present invention of the object detecting method to detect an object. Also, a difference value of predetermined levels of a histogram (frequency distribution) of the luminance in the two regions within the determining object image is used to compute the evaluation value, and the embodiments of the present invention can be applied to an object detecting method to detect objects. For example, a HOG: Histograms of Oriented Gradients, which is one type of luminance histogram, can be used. The oriented gradient history divides the image into multiple regions, computes the gradient direction and gradient strength of the luminance for each region, and is created based on the gradient strength and gradient direction of these luminances.

Also, with the present embodiment, an example of a face facing various directions has been described as multiple objects serving as an object of the object detecting processing, but physical objects other than faces can be applied to the embodiments of the present invention. For example, a case of one or multiple objects such as animals like mammals, insects, fish, and so forth (e.g. pets), automobiles, airplanes, or the like can be applied to the embodiments of the present invention. In this case, modifying the type as to the same physical object (e.g. dogs facing various directions) and mixtures of multiple objects (e.g. dog and cat) can be the multiple objects.

Also, the embodiments of the present invention can be applied to imaging device of various types of cellular phones having an imaging function or digital video camera (e.g. integrated camera-recorder) to image the still pictures and moving pictures. Also, for example, a monitoring camera can be connected to, and the embodiments of the present invention can be applied to the object detecting device such as face detecting device to detect the face of a person.

Note that the embodiments of the present invention illustrate examples to realize the present invention, and have correlations with each of the claimed elements. However, the present invention is not restricted to the embodiments, and various types of modifications may be made within the scope and spirit of the present invention.

Also, the processing procedures described with the embodiments of the present invention can be perceived as a method having procedures for the series of procedures herein, and the series of procedures may be perceived as a recording medium to record programs and cause a computer to execute the series of procedures. As a recording medium, for example a CD (Compact Disc), MD (Mini Disc), DVD (Digital Versatile Disk), memory card, Blu-ray Disk (registered trademark), or the like, can be used.

It should be understood by those skilled in the art that various modifications, combinations, sub-combinations and alterations may occur depending on design requirements and other factors insofar as they are within the scope of the appended claims or the equivalents thereof.

What is claimed is:

1. An object detecting device comprising:
   a comparing unit to extract feature amounts for two regions on a determining object image and compare a feature based on the two feature amounts extracted with a threshold;
   a computing unit to select one of two values having different absolute values according to said comparison result, and compute an evaluation value to determine whether or not an object is included in said determining object image, by performing computation with the selected value; and
   a determining information storage unit to store determining information including a plurality of combinations of two positions on said determining object image, said threshold, and said two values,
   wherein said comparing unit compares the two extracted features amounts for the two regions on said determining object image identified by said two positions, and said threshold, for each of said combinations, and
   wherein said computing unit selects one of said two values according to said comparison results and computes said evaluation values by sequentially performing computations of the selected values, for each of said combinations.

2. An object detecting device comprising:
   a comparing unit to extract feature amounts for two regions on a determining object image and compare a feature based on the two feature amounts extracted with a threshold; and
   a computing unit to select one of two values having different absolute values according to said comparison result, and compute an evaluation value to determine whether or not an object is included in said determining object image, by performing computation with the selected value,
   wherein said computing unit computes said evaluation values for each of said object, in order to select one of said two values correlated to each of a plurality of objects according to said comparison result, for each of said object and perform calculations of the values selected for each object for each of said objects, to determine whether or not one of said plurality of objects is included in said determining object image.

3. The object detecting device according to claim 2, further comprising:
   a determining information storage unit to store determining information including a plurality of combinations of two positions on said determining object image, said threshold, and said two values that are correlated for each of said plurality of objects;
   wherein said comparing unit compares the two extracted features amounts for the two regions on said determining object image identified by said two positions, and said threshold, for each of said combinations;
   and wherein said computing unit computes the selected values for each of said objects of said plurality of combinations for each of said objects, to compute said evaluation values for each of said objects.

4. An object detecting method comprising:
   extracting feature amounts for two regions on a determining object image and comparing the two extracted feature amount with the threshold;
   selecting one of two values having different absolute values and performing computations of the selected value that is selected according to said comparison results, to compute an evaluation value for determining whether or not the object is included in said determining object image; and
   storing determining information including a plurality of combinations of two positions on said determining object image, said threshold, and said two values,
   wherein said comparing compares the two extracted features amounts for the two regions on said determining object image identified by said two positions, and said threshold, for each of said combinations, and
   wherein said selecting and performing selects one of said two values according to said comparison results and computes said evaluation values by sequentially performing computations of the selected values, for each of said combinations.

5. A non-transitory computer readable medium having stored thereon a program causing a computer to execute the steps of:
   extracting feature amounts for two regions on a determining object image and comparing the two extracted feature amount with the threshold;
   selecting one of two values having different absolute values and performing computations of the selected value that is selected according to said comparison results, to compute an evaluation value for determining whether or not the object is included in said determining object image; and
   storing determining information including a plurality of combinations of two positions on said determining object image, said threshold, and said two values, wherein said comparing step compares the two extracted features amounts for the two regions on said determining object image identified by said two positions, and said threshold, for each of said combinations, and wherein said selecting and performing steps select one of said two values according to said comparison results and compute said evaluation values by sequentially performing computations of the selected values, for each of said combinations.

* * * * *